United States Patent
Song et al.

(10) Patent No.: US 9,467,848 B1
(45) Date of Patent: Oct. 11, 2016

(54) MOBILE TERMINAL

(71) Applicant: LG Electronics Inc., Seoul (KR)

(72) Inventors: Yoomee Song, Seoul (KR); Arim Kwon, Seoul (KR); Kyunghye Seo, Seoul (KR); Cheongha Park, Seoul (KR); Jaehwa Lee, Seoul (KR); Minkyoung Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/809,597

(22) Filed: Jul. 27, 2015

(30) Foreign Application Priority Data

Apr. 14, 2015 (KR) ........................ 10-2015-0052515

(51) Int. Cl.
| | | |
|---|---|---|
| H04W 12/02 | (2009.01) | |
| G06F 3/0484 | (2013.01) | |
| G06F 3/0488 | (2013.01) | |
| G06F 21/62 | (2013.01) | |
| G06F 3/0486 | (2013.01) | |
| G09G 5/14 | (2006.01) | |
| G06F 3/0481 | (2013.01) | |
| H04L 29/06 | (2006.01) | |
| G06F 3/16 | (2006.01) | |
| G06F 21/32 | (2013.01) | |

(52) U.S. Cl.
CPC ............ *H04W 12/02* (2013.01); *G06F 3/0481* (2013.01); *G06F 3/0486* (2013.01); *G06F 3/04817* (2013.01); *G06F 3/04845* (2013.01); *G06F 3/04883* (2013.01); *G06F 3/04886* (2013.01); *G06F 3/167* (2013.01); *G06F 21/32* (2013.01); *G06F 21/62* (2013.01); *G09G 5/14* (2013.01); *H04L 63/0861* (2013.01); *G09G 2354/00* (2013.01); *G09G 2358/00* (2013.01)

(58) Field of Classification Search
CPC .............. H04W 12/02; G06F 3/04845; G06F 3/04883; G06F 21/62; G06F 3/0486; G06F 3/0481; G06F 3/04817; G06F 3/167; G06F 3/0488; G06F 21/32; G06F 3/04886; G06F 3/0482; G09G 5/14; G09G 2354/00; G09G 2358/00; H04L 63/0861

See application file for complete search history.

(56) References Cited

U.S. PATENT DOCUMENTS

| | | | | |
|---|---|---|---|---|
| 9,165,128 | B1* | 10/2015 | Daniel | G06F 21/6218 |
| 9,304,624 | B2* | 4/2016 | Fadell | G06F 21/316 |
| 2013/0342483 | A1* | 12/2013 | Seo | G06F 3/0488 345/173 |
| 2015/0089666 | A1* | 3/2015 | Lee | G06F 21/6245 726/27 |
| 2015/0269409 | A1* | 9/2015 | Weber | G06F 3/044 382/125 |
| 2016/0042166 | A1* | 2/2016 | Kang | G06F 21/32 726/7 |

* cited by examiner

*Primary Examiner* — Nam Huynh
(74) *Attorney, Agent, or Firm* — Birch, Stewart, Kolasch & Birch, LLP

(57) ABSTRACT

A mobile terminal including a terminal body including a front surface and a rear surface; a display unit disposed on the front surface and including a first region and a second region extended from the first region, the first and second regions configured to be independently converted from one of an active state and an inactive state to another; a rear input unit disposed on the rear surface and configured to sense a fingerprint input; and a controller configured to convert the second region into the active state while maintaining the inactive state of the first region and display preset first screen information on the second region, in response to a preset input being received in the inactive state of the first and second regions, and convert the first screen information displayed on the second region into second screen information corresponding to an execution of a secret mode while maintaining the inactive state of the first region, in response to the preset input being received and the fingerprint input being sensed by the rear input unit corresponding a preset fingerprint.

23 Claims, 52 Drawing Sheets

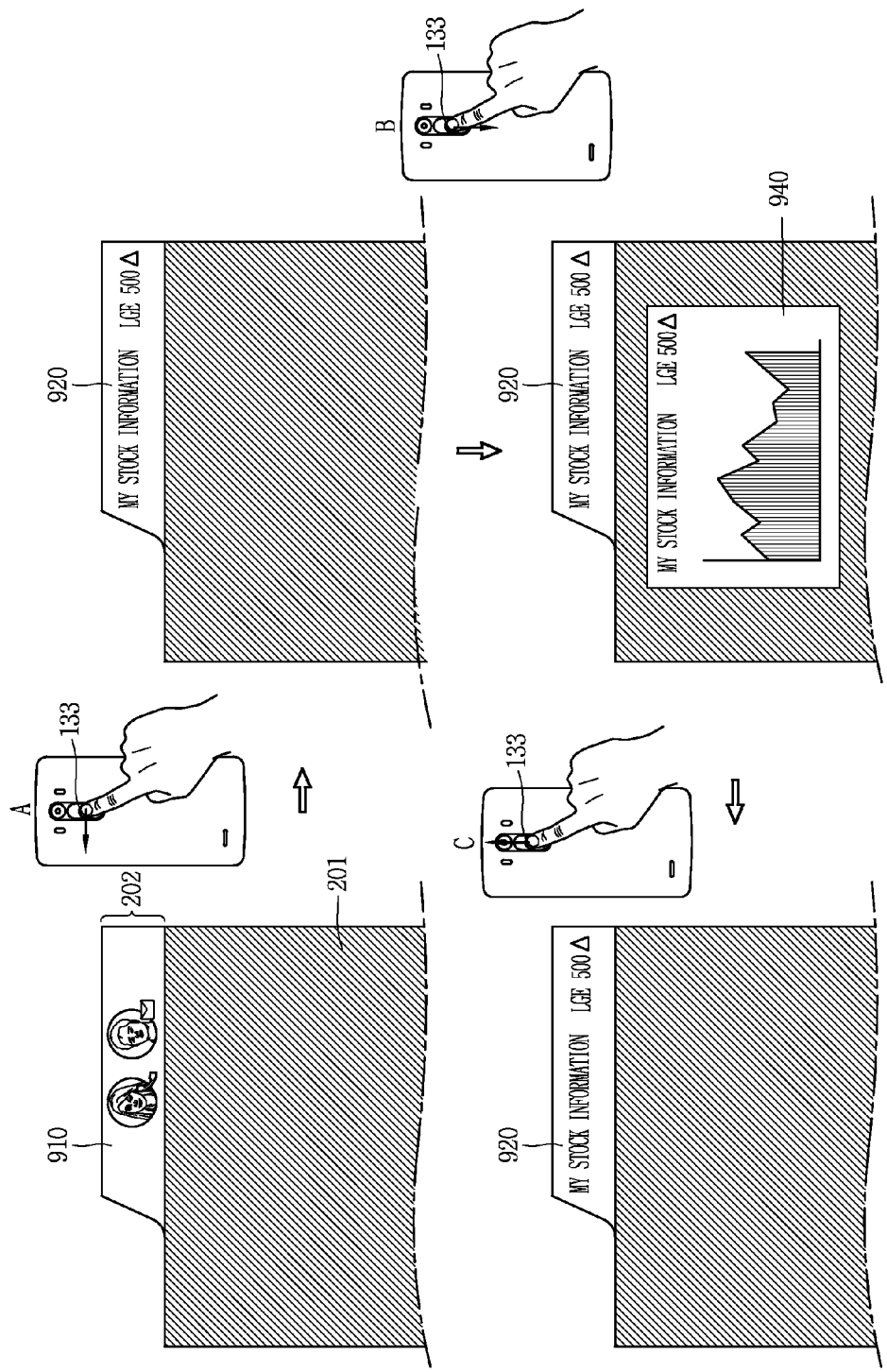

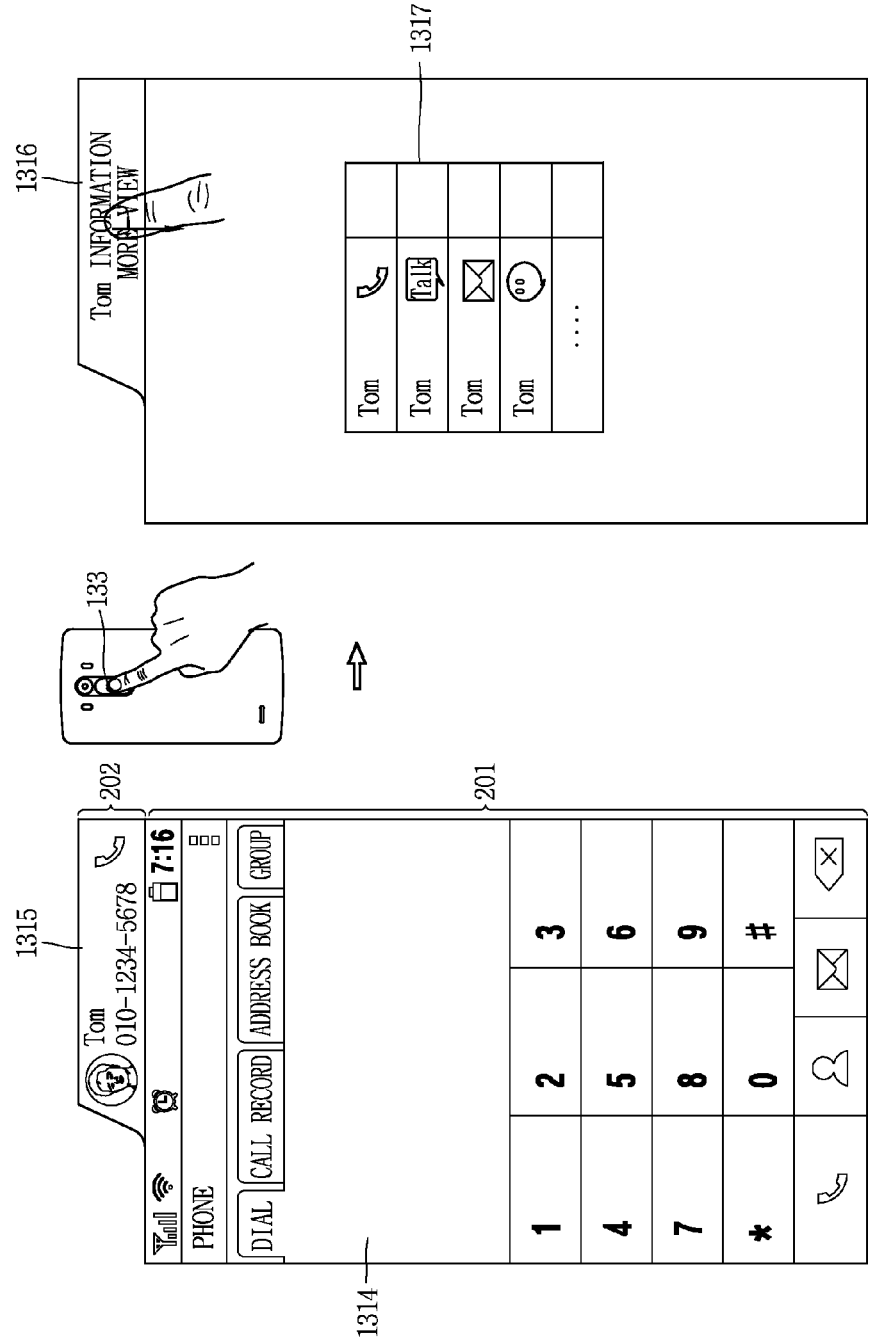

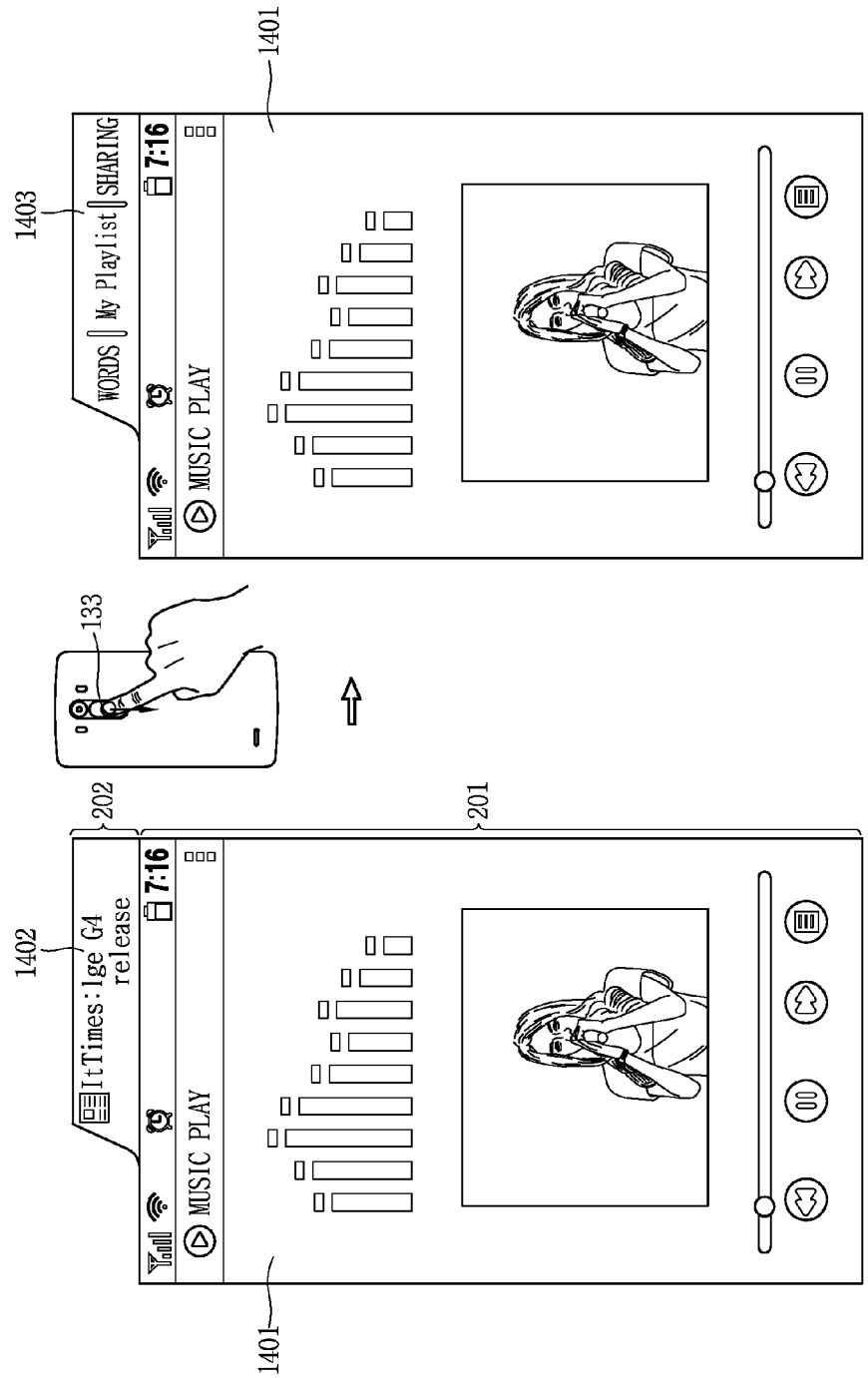

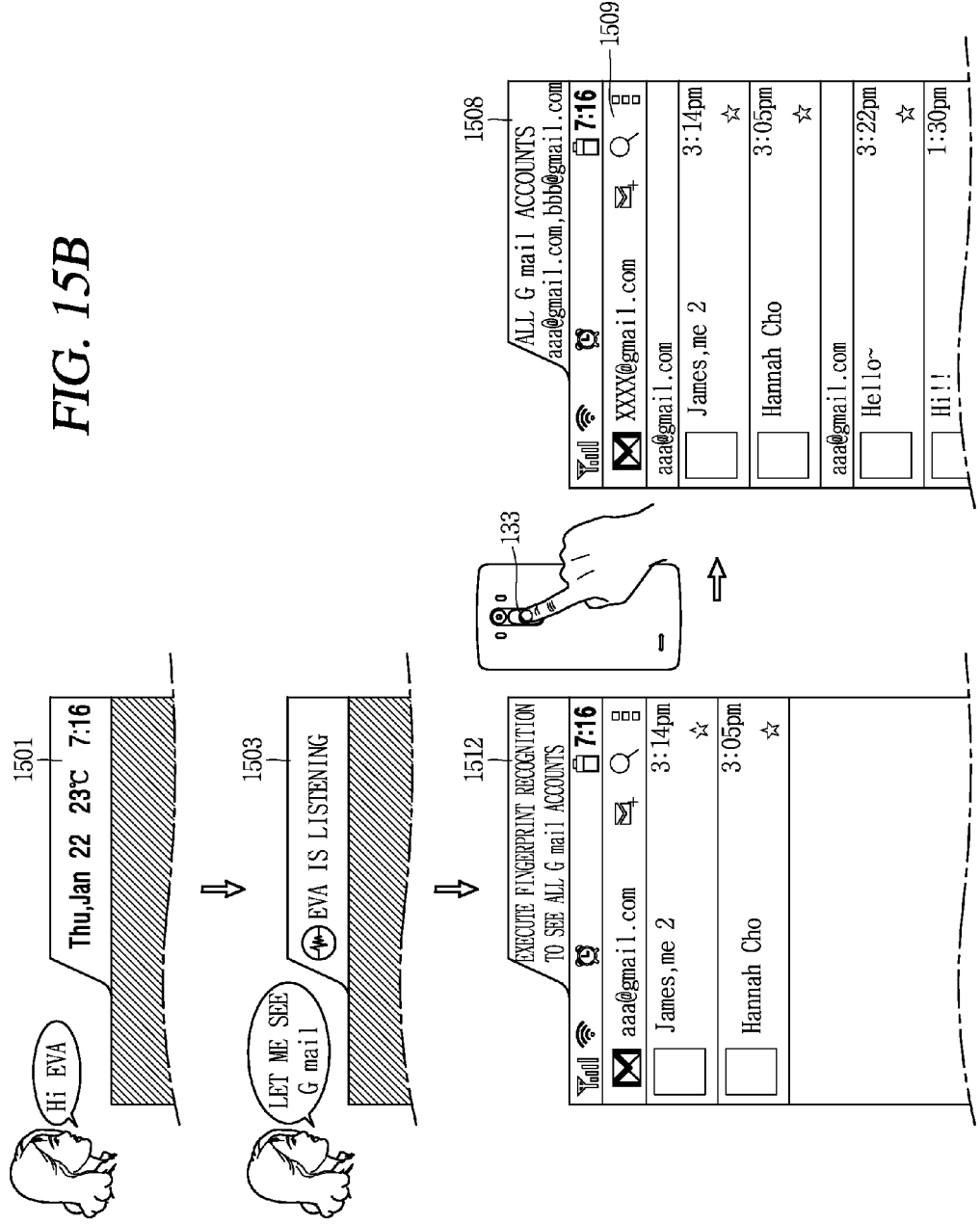

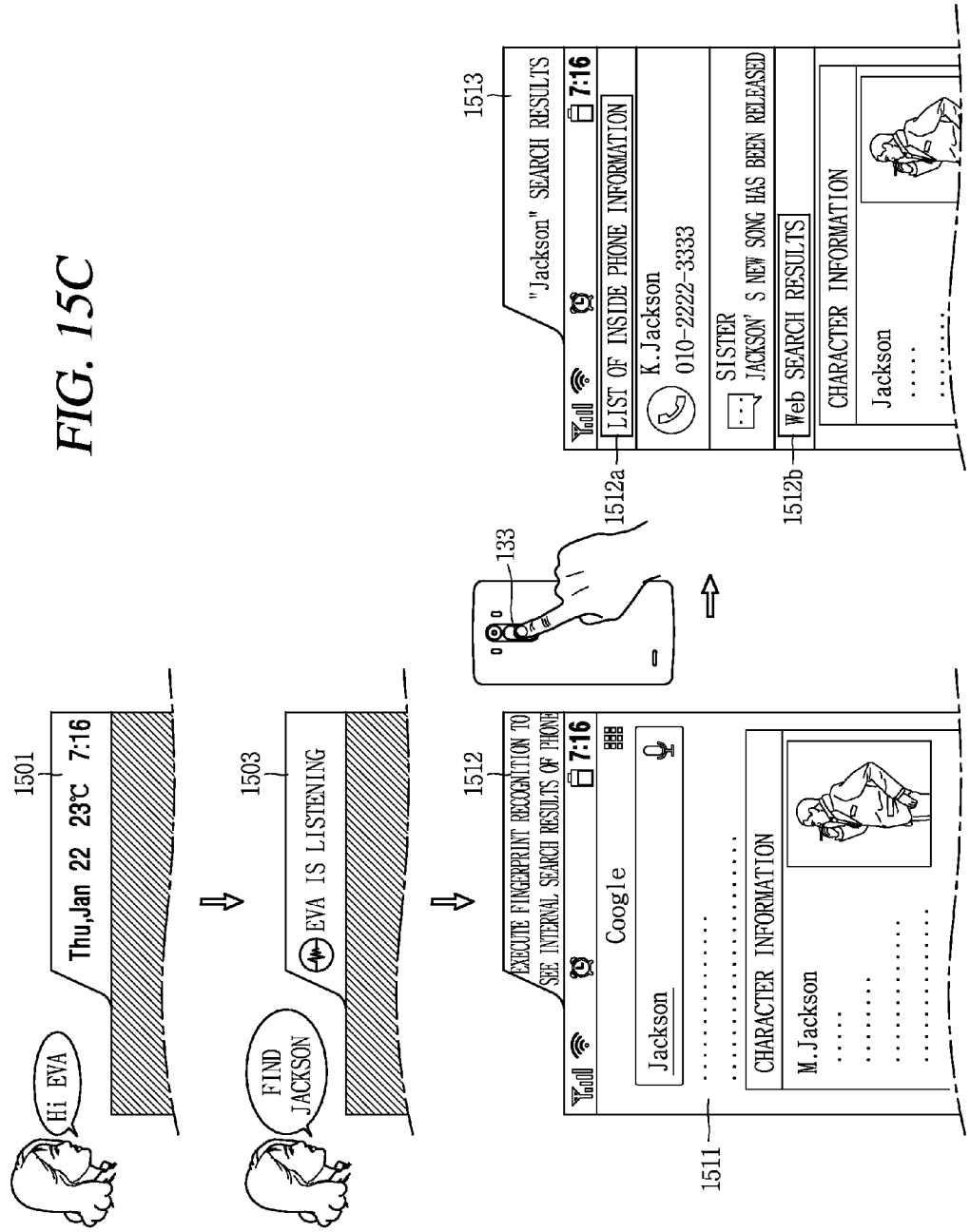

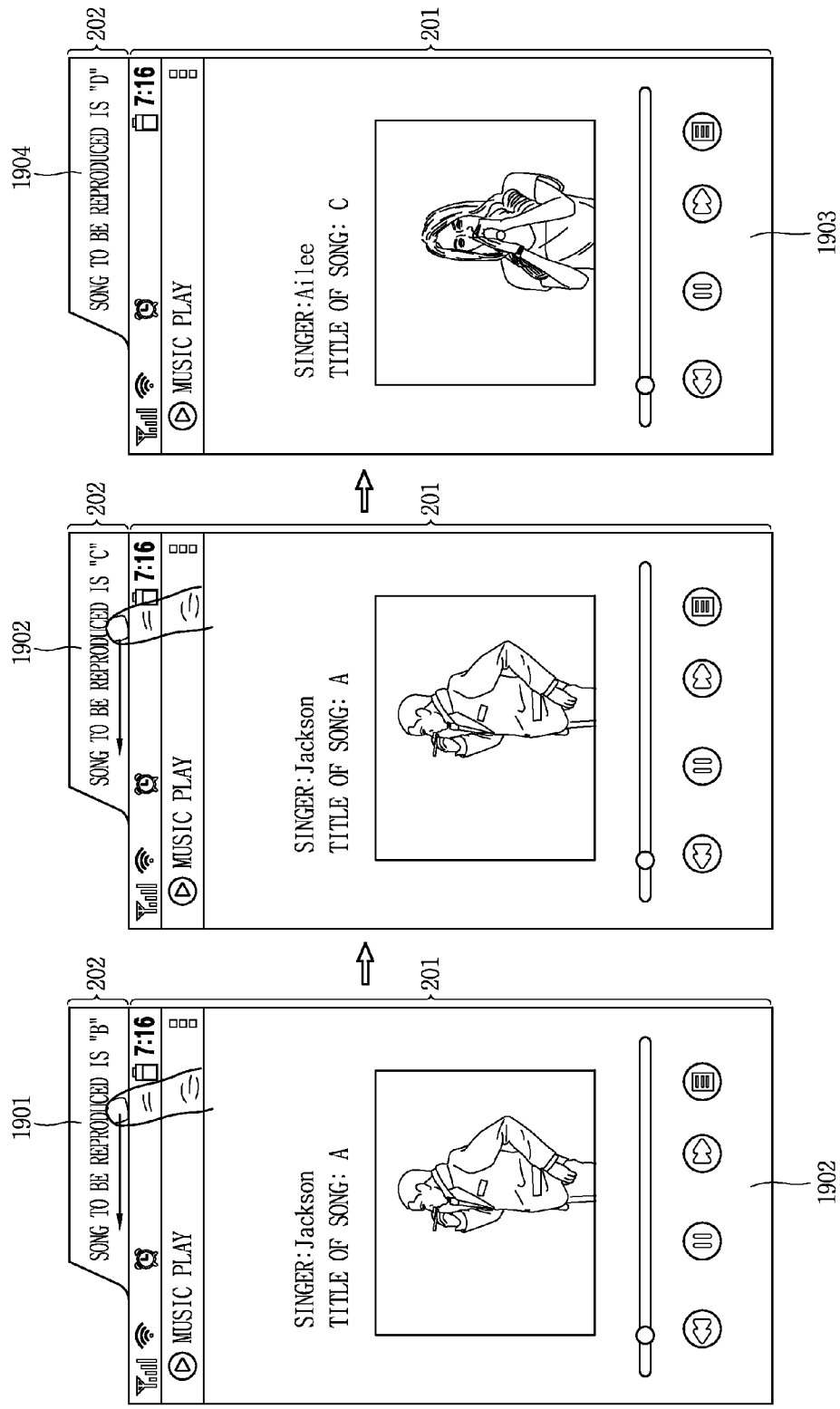

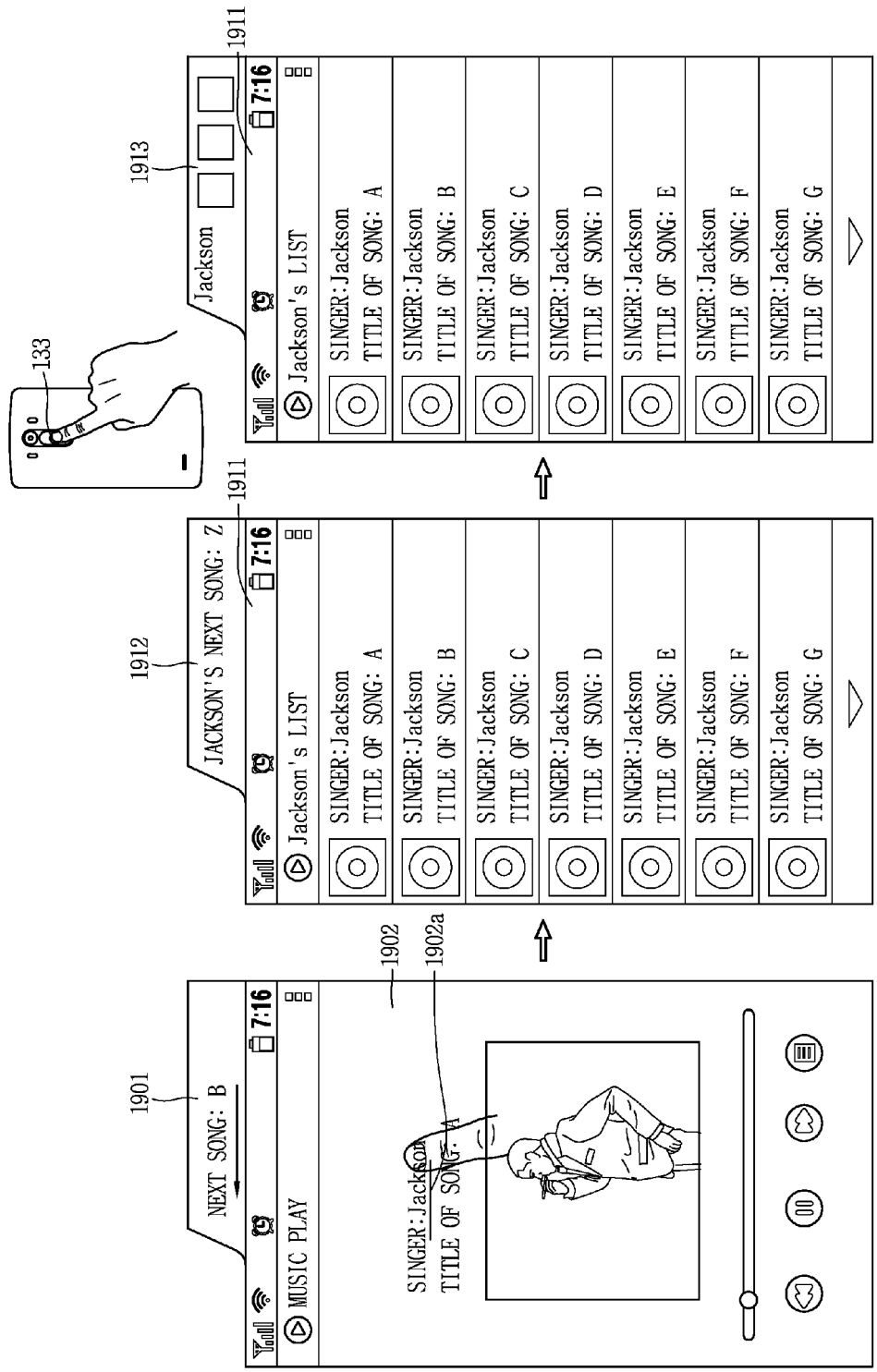

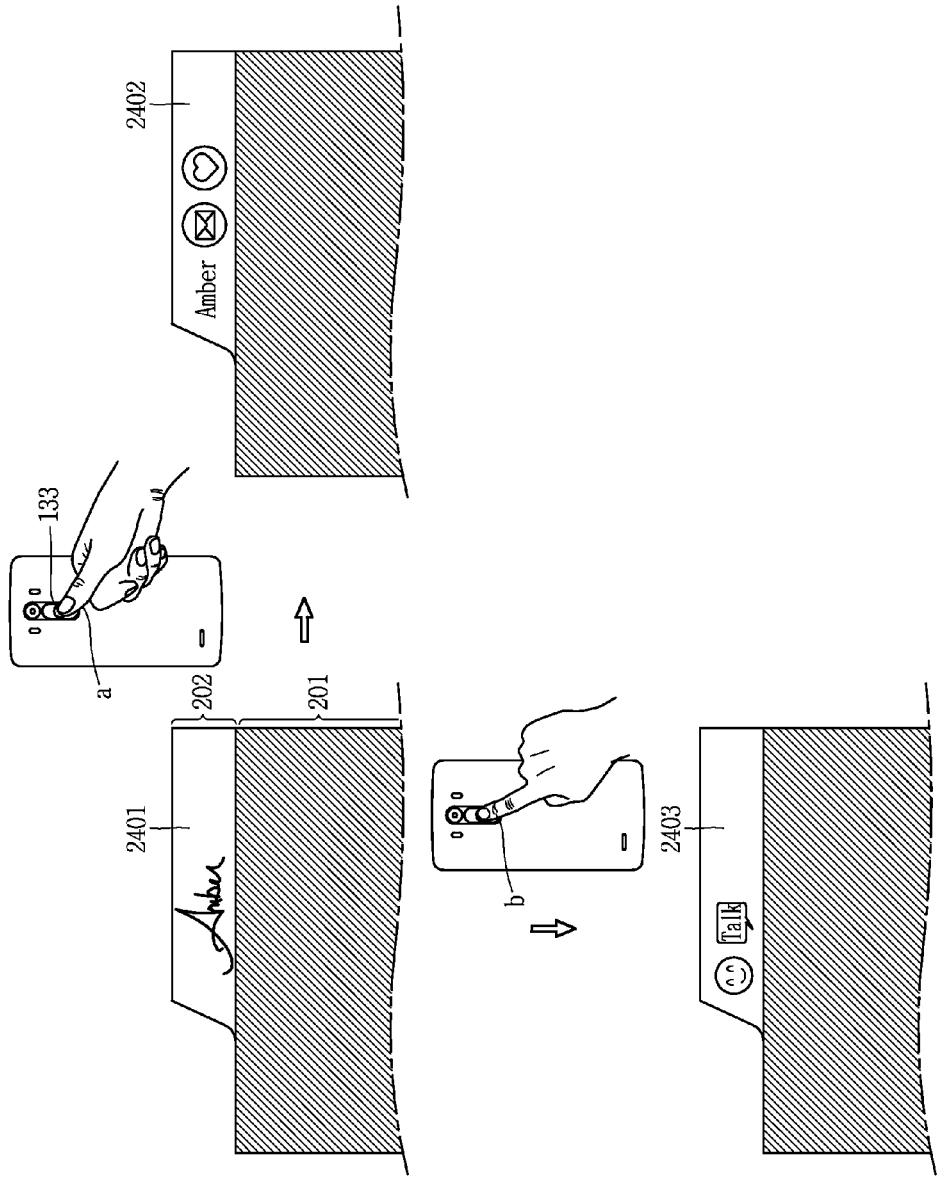

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2015-0052515, filed on Apr. 14, 2015, the contents of which is incorporated by reference herein in its entirety.

BACKGROUND OF THE INVENTION

1. Field of the Invention

The present invention relates to a mobile terminal for outputting visual information by activating part of a display unit.

2. Description of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player. In order to implement such functions of the multimedia player, the size of a display unit of the mobile terminal becomes larger and the picture quality becomes higher, such that high power consumption is required to drive the display unit. Further, as the size of the display unit becomes larger, there has been a problem that information output to the display unit is easily exposed to others.

SUMMARY OF THE INVENTION

Accordingly, it is an object of the present invention to provide a mobile terminal which is capable of outputting required visual information by independently activating part of a display unit.

It is another object of the present invention to provide a mobile terminal which is capable of controlling a screen which has been output to another portion of a display unit, or quickly accessing desired information, using visual information which has been output to one portion of the display unit.

It is still another object of the present invention to provide a mobile terminal which is capable of checking secret information related to a screen which has been output to another portion of a display unit, on one portion of the display unit.

To achieve these and other advantages and objects of the present invention, there is provided a mobile terminal including a terminal body having a front surface and a rear surface; a display unit disposed on the front surface and including a first region and a second region extended from the first region, the regions configured to be independently converted from one of an active state and an inactive state to another; a rear input unit disposed on the rear surface and configured to recognize a user's fingerprint input; and a controller configured to, when a preset input is received in an inactive state of the first and second regions, convert the second region into an active state while maintaining the inactive state of the first region and to display preset first screen information on the second region, wherein the controller is configured to, when the preset input is received and a fingerprint input which has been stored in the rear input unit is sensed, convert the first screen information displayed on the second region into second screen information corresponding to execution of a secret mode, while maintaining the inactive state of the first region.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings, which are given by illustration only, and thus are not limitative of the present invention, and wherein:

FIGS. 9A and 9B are schematic views illustrating a method to control information output to part of a display unit using a touch input to a rear input unit in a mobile terminal according to an embodiment of the present invention;

FIGS. 12A and 12B, 13A through 13F, and 14A and 14B are views illustrating a method to output related information to part of a display unit, based on screen information which has been output to a main region of the display unit and a fingerprint input sensed at a rear input unit in a mobile terminal according to an embodiment of the present invention;

FIGS. 15A through 15C are views illustrating a method to output feedback information corresponding to a user's voice input to part of a display unit in a mobile terminal according to an embodiment of the present invention;

FIGS. 17, 18 and 19A and 19B are views illustrating a method to output information guiding a next executable operation to part of a display unit based on screen information which has been output to a main region of the display unit in a mobile terminal according to an embodiment of the present invention;

FIGS. 24A and 24B are views illustrating a method to output different information to part of a display unit according to a type, a position, an input method, and the like of a fingerprint sensed at a rear input unit in a mobile terminal according to an embodiment of the present invention;

DETAILED DESCRIPTION OF THE PREFERRED EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), an electronic book (E-book), a navigation device, etc.

Figure 1:
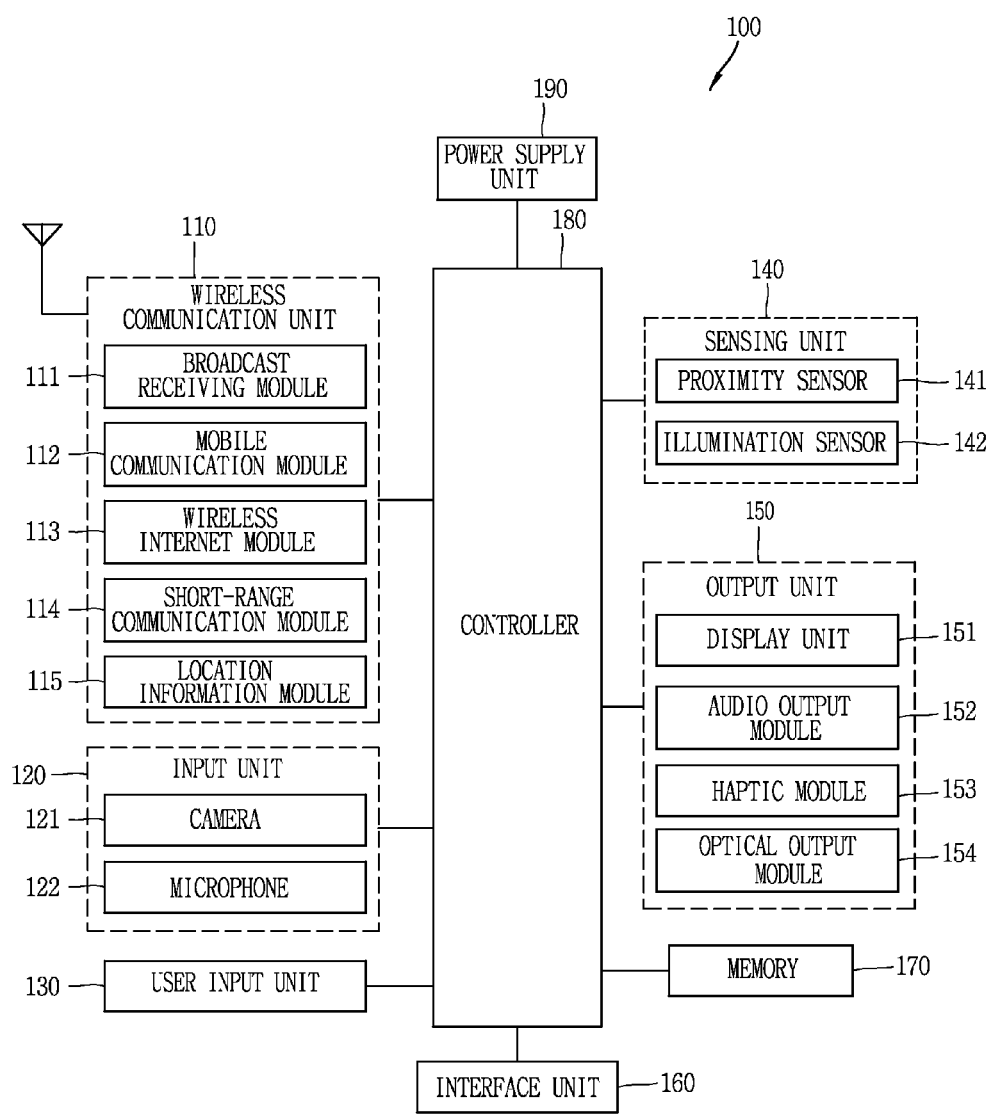
FIG. 1 is a block diagram illustrating a schematic configuration of a mobile terminal according to an embodiment of the present invention.

FIG. 1 is a block diagram of a mobile terminal 100 according to an embodiment of the present invention. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1 is not a requirement, and that greater or fewer components may alternatively be implemented.

Referring now to FIG. 1, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like.

The broadcast receiving module 111 may receive digital broadcast signals using digital broadcast systems such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), etc. The broadcast receiving module 111 may be configured to be suitable for other broadcast system, as well as the aforementioned digital broadcast systems. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Worldwide Interoperability for Microwave Access (WiMAX), High Speed Downlink Packet Access (HSDPA), etc.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, etc.

The location information module 115 is generally configured to detect, calculate, derive or otherwise identify a position of the mobile terminal. As an example, the location information module 115 includes a Global Position System (GPS) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames can be displayed on a display unit 151. The image frames processed by the camera 121 may be stored in the memory 170 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 160 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video mode or a capturing mode, the display unit 151 displays a captured image or UI, GUI.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit and an internal display unit. The touch screen may be configured to detect a touch input pressure as well as a touch input location and a touch input area.

Referring to FIG. 1, the proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 170 can store a program for the processing and control of the controller 180. Alternatively, the memory 170 may temporarily store input/output data (e.g., phonebook data, messages, still images, video and the like). Also, the memory 170 may store data relating to various patterns of vibrations and audio output upon the touch input on the touch screen.

The memory 170 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 170 on the Internet.

The interface unit 160 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

Here, the identification module may be a memory chip that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms.

The interface unit 160 may be used to receive inputs (e.g., data, information, power, etc.) from an external device and transfer the received inputs to one or more elements within the mobile terminal 100 or may be used to transfer data between the mobile terminal and an external device. When the mobile terminal 100 is connected with an external cradle, the interface unit 160 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may operate as signals for recognizing when the mobile terminal is properly mounted on the cradle.

The controller 180 typically controls the overall operations of the mobile terminal 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image. The power supply unit 190 serves to supply power to each component by receiving external power or internal power under control of the controller 180.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 170 and executed by the controller 180. Thus, the components shown in FIG. 1 have sufficient structure to implement the appropriate algorithms for performing the described functions.

The user input unit 130 is arranged on a rear surface of the mobile terminal, resulting in a larger screen of a front display. Hereinafter, a detailed structure of the user input unit 130 and an operation thereof will be explained.

Figure 2A:
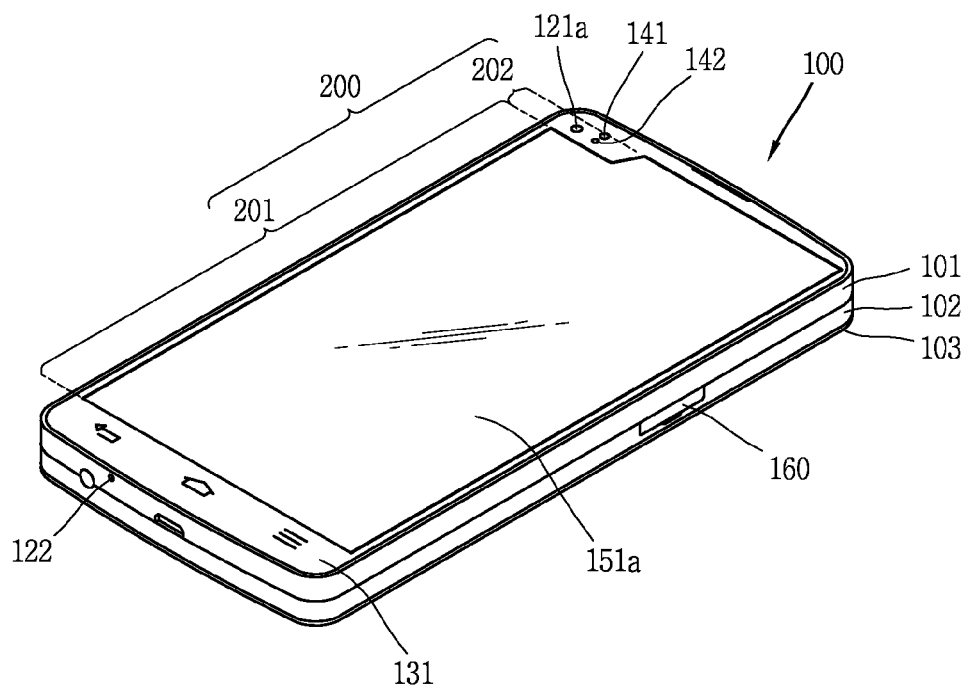
FIGS. 2A and 2B are perspective views illustrating a mobile terminal according to an embodiment of the present invention, which are viewed from different directions.
Figure 2B:
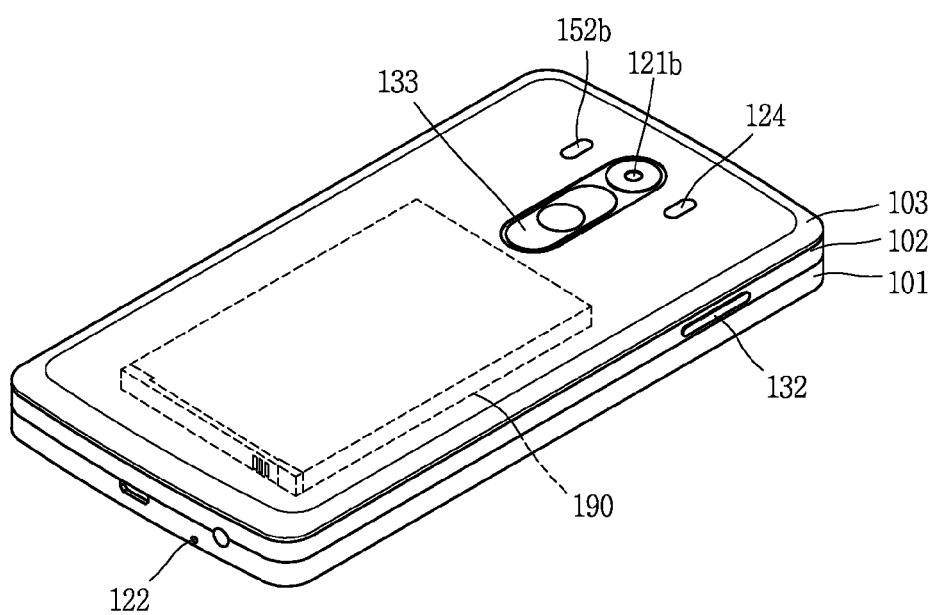

FIGS. 2A and 2B are perspective views of the mobile terminal 100, which are viewed from different directions. As shown in FIG. 2A, the mobile terminal 200 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101, a rear case 102, and a battery cover 103. A space formed by the front case 101 and the rear case 102 may accommodate various components therein. At least one intermediate case may further be disposed between the front case 101 and the rear case 102. Such cases may be formed by injection-molded synthetic resin, or may be formed using a metallic material such as stainless steel (STS) or titanium (Ti).

At the front case 101, may be disposed a display unit 200, an audio output module 152a, a camera module 121, etc. may be arranged. The microphone 122, a side input unit 132, the interface unit 160, etc. may be arranged on a side surface of the front case 101 and the rear case 102.

The display unit 200 occupies most regions of the front case 101. That is, the display unit 200 is disposed on a front surface of the terminal body to output visual information. An audio output module and a camera module 121a may be arranged at a region adjacent to one end of the display unit 200, and a front input unit 131 may be arranged at a region adjacent to another end of the display unit 200.

The front input unit 131, an example of the user input unit 130 (refer to FIG. 1) may include a plurality of manipulation units. The manipulation units may be called manipulating portions, which may adopt any tactile manner. In this embodiment, the front input unit 131 is configured as a touch key. However, the present invention is not limited to this. That is, a push key may be added to the front input unit 131. The side input unit 132, another example of the user input unit 130, may receive a command for controlling a level of a sound output from the audio output module, or a command for converting a mode of the display unit 200 into a touch recognition mode.

The display unit 200 may also form a touch screen together with the touch sensor. Here, the touch screen may serve as the user input unit 130. Therefore, the front input unit 131 may not be formed on the front surface of the mobile terminal. In this instance, the mobile terminal 100 may be configured such that an input to the terminal body may be executed through the display unit 200 and a rear input unit 133 to be explained later.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The window 151a of the display unit 200 will typically include an aperture to permit audio generated by the first audio output module to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

An optical output module, configured to output light for indicating an event generation, may be further provided at one side of the display unit 200. Examples of such events include a message reception, a call signal reception, a missed call, an alarm, a schedule notice, an email reception, information reception through an application, and the like. When a user has checked a generated event, the controller can control the optical output unit to stop the light output.

In an embodiment of the present invention, the display unit 200 may be divided into two regions parallel to each other in one direction. In this instance, the independent display regions 201, 202 may be independently controlled. If necessary, only one of the two regions is selectively activated to lower power consumption. For example, the first region 201 of the display unit 200 may occupy a majority of the front surface of the mobile terminal 100 as a main screen that outputs general video information. Further, the second region 202 of the display unit 200 may be disposed in parallel with the first region 201 at an upper portion as a supplementary screen that displays status information and the like of the mobile terminal 100.

The first and second regions 201 and 202 may independently exhibit an active state and an inactive state, respectively. For instance, even when the mobile terminal 100 is not used when the first region 201 is in an off-state and the second region 202 is in an on-state, it is possible to check a state of the mobile terminal 100 or basic information (for instance, date, time, and the like) at all times.

Further, though the second region 202 is shown in FIG. 2A to be located at an upper side of the first region 201, it is not limited thereto, but the second region 202 may be positioned at a lower side of the first region 201, or may also be positioned at both the upper and lower sides as well. In still another embodiment, the second region 202 may be positioned at one side or both sides of the first region 201.

Referring to FIG. 2B, a camera module 121b may be additionally mounted to the rear surface of the terminal body, i.e., the rear case 102. The camera module 121b has an opposite capturing direction to the camera 121a (refer to FIG. 2A), which may have a different pixel from the camera module 121a. For instance, the camera module 121a may operate with relatively lower pixels (lower resolution). Thus, the camera module 121a may be useful when a user can capture his face and send it to another party during a video call or the like. Further, the camera module 121b may operate with a relatively higher pixels (higher resolution) such that it can be useful for a user to obtain higher quality pictures for later use. The camera modules 121a and 121b may be installed at the terminal body so as to rotate or pop-up.

A flash and a mirror may be additionally disposed close to the camera module 121b. The flash operates in conjunction with the camera module 121b when taking a picture using the camera module 121b. The mirror can cooperate with the camera module 121b to allow a user to photograph himself in a self-portrait mode.

An audio output module 152b may be additionally arranged on a rear surface of the terminal body. The audio output module 152b may cooperate with the audio output module disposed on a front surface of the terminal body so as to implement a stereo function. Also, the audio output module may be configured to operate as a speakerphone. A power supply unit 190 for supplying power to the mobile terminal 100 is mounted to the body. The power supply unit 190 may be mounted in the body, or may be detachably mounted to the body.

A rear input unit 133 may be disposed on a rear surface of the terminal body. The rear input unit 133 may be positioned near the camera module 121b. The rear input unit 133 is configured to receive various commands for controlling the mobile terminal 100. For instance, the rear input unit 133 may be configured to receive commands such as START, END, SCROLL or the like, a command for controlling a level of sound output from the audio output modules 152a, 152b, or a command for converting the current mode of the display unit 200 to a touch recognition mode.

As another embodiment, a sensor for sensing a user's fingerprint by receiving a user's touch input may be provided at one region of the rear input unit 133. More specifically, a touch sensor and a finger scan sensor may be layered on the rear input unit 133, thereby recognizing a user's fingerprint applied to the one region in a touch or push manner. The finger scan sensor may be mounted in the display unit 200 or the user input unit 131 or 132.

Meanwhile, the fingerprint recognition sensor can be activated or inactivated according to a state of the display unit 200. In such a case, as described above, the fingerprint recognition sensor may be limited to be activated in a condition that at least one of the first region 201 and the second region 202 is in an active state in the structure that the display unit 200 is divided in plural regions.

The finger scan sensor may be configured to sense a user's fingerprint using a different method, in an activated or deactivated state of the display unit 200. The different method may be related to an activation period of the finger scan sensor. More specifically, the finger scan sensor may be activated at a different period according to whether the display unit 200 has been activated or not, and may sense a user's fingerprint input applied thereto. For instance, in a deactivated state of the display unit 200, the finger scan sensor may be activated with a preset period. In this instance, the preset period may be a time period more than 0. Further, in an activated state of the display unit 200, the finger scan sensor may be always operated in an activated state. In this instance, an activation period of the finger scan sensor may be '0' or a value very close to '0'.

The rear input unit 133 may be formed to be rotated, and may be formed such that a proximity touch may be applied thereto. The rear input unit 133 may include a plurality of keys. In this instance, the plurality of keys may be formed to have different shapes so that they may be easily recognized by a user's tactile sense using his or her finger, without rotating the terminal body.

The rear input unit 133 may include a frame, and a wheel key, a window, etc. mounted to the frame. In this instance, the frame may be mounted to the case of the terminal body, e.g., the rear case 102. The wheel key may be mounted to the frame, and may be exposed to a rear outside via a predetermined through hole. The rear input unit 133 may be applied to a terminal having a display unit and a touch panel on two surfaces of a terminal body. The display unit may be implemented as a transparent display, a stereoscopic display, a flexible display, or a combination thereof.

Figure 3A:
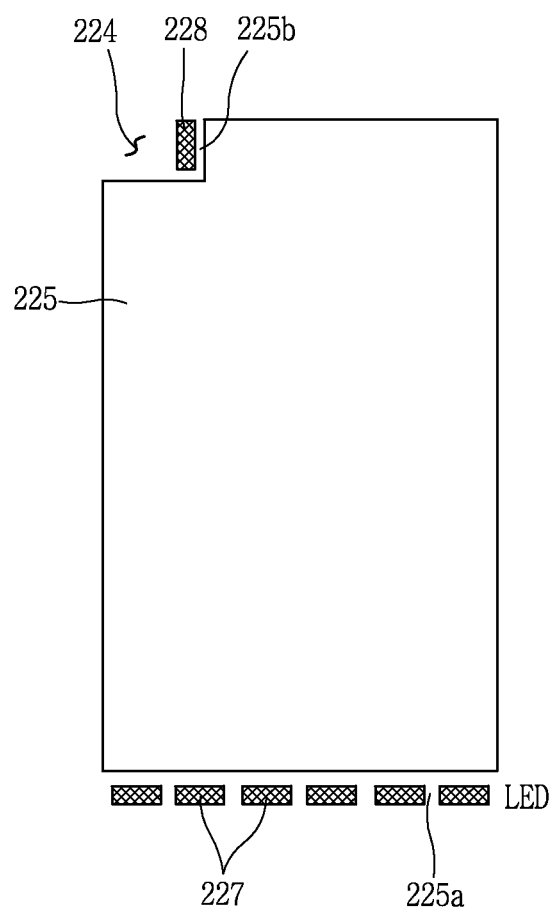
FIGS. 3A and 3B are front views illustrating a display panel of a mobile terminal according to an embodiment of the present invention.
Figure 3B:
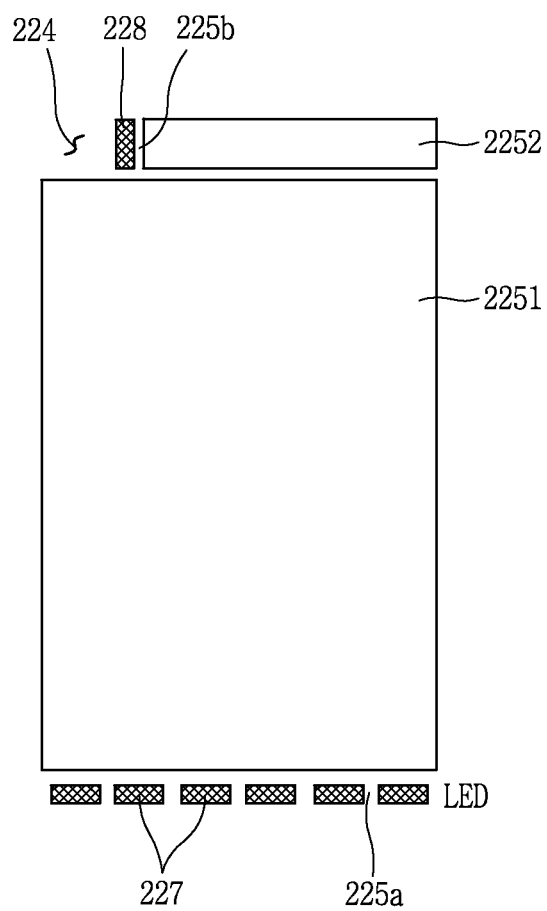

Next, FIGS. 3A and 3B are front views illustrating a display panel of the mobile terminal according to an embodiment of the present invention. As shown, the display panel 200 includes a light guide plate 225, light sources 227 and 228, i.e., a main light source 227 and a subsidiary light source 228. Here, the backlight unit may include light sources which supply light in two different directions, respectively, differently from the conventional one.

Specifically, the main light source 227 disposed in parallel with a first side surface 225a of the light guide plate 225 evenly supplies light on the whole part of the light guide plate 225. The main light source 227 is spaced apart from the first side surface 225a and may be provided in plural. A second side surface 225b of the light guide plate 225 is disposed perpendicular to the first side plate 225a and the subsidiary light source 228 provides light to an opposite end of the first side surface 225a where the main light source 227 is disposed.

The light guide plate 225 is formed in a rectangular shape, but includes a dent 224 that has a recessed portion at its one corner, as shown in FIGS. 3A and 3B. And at the second side surface 225b which is perpendicular to the first side surface 225a among the side surfaces forming the dent, light discharged from the subsidiary light source 228 is incident.

The main light source 227 and the subsidiary light source 228 are independently driven, such that the controller 180 of the mobile terminal 100 controls the subsidiary light source 228 to be turned on when the main light source 227 is turned off. The main light source 227 is disposed in parallel with and adjacent to the first side surface 225a in plural and provides light to an entire surface of the light guide plate 225. In contrast, the subsidiary light source 228 is provided in a smaller number than that of the main light source 227, that is, one or two, such that it provides light to part of the light guide plate 225.

Further, the light guide plate 225 is formed in a lump, as shown in FIG. 3A, such that it can receive not only light from the main light source 227, but light from the subsidiary light source 228 (in an integral type). In such an integral type, since the main light source 227 can provide light not only to the first region 201, but to the second region 202, there is an advantage in that it is not necessary to turn on the subsidiary light source 228 when the main light source 227 is turned on. Further, it is possible to output an image connected between the second region 202 and the first region 201.

Alternatively, the light guide plate 225 includes a first light guide plate 2251 that radiates light from the main light source 227 to an entire surface of the display panel 200 and a second light guide plate 2252 that radiates light from the subsidiary light source 228 to part of the display panel 200 (in a separate type), as shown in FIG. 3B. In such a separate type, light from the main light source 227 is provided only to the first region 201 through the first light guide plate 2251 and light from the subsidiary light source 228 is provided only to the second region 202 through the second light guide plate 2252. In this instance, though the subsidiary light source 228 has to be separately driven to output information to the second region 202 even when the main light source 227 is turned on, it is possible to provide an image of more high brightness using a less number of light sources (LED lamps) with the subsidiary light source 228 turned on in case of displaying information only on the second region 202.

The main light source 227 and the subsidiary light source 228 may be connected to a main substrate integrally into one piece, or separately connected to the main substrate, respectively. The controller 180 of the mobile terminal 100 can independently control the main light source 227 and the subsidiary light source.

Meanwhile, since the subsidiary light source 228 is positioned at the second side surface 225b, the bezel of the second side surface 225b can be increased. In this instance, a size of the bezel due to the subsidiary light source 228 may not be an important factor to determine the whole size of a product though the size of the display unit is large, but may be an important factor to determine the size of the product when the size of the display unit is relatively small.

In order to prevent a size of the bezel in a lateral direction from being increased, a first corner at another side of the second side surface 225*b* where the subsidiary light source 228 is positioned can be formed into a dent 224 in a recessed form. By placing the subsidiary light source 228 at the dent 224, it is possible to prevent the size of the bezel in a lateral direction from being increased.

Referring to FIG. 3B, when a width of the first region 201 and that of the second region 202 of the display unit 200 are the same, the second light guide plate 2252 can be formed to have the same width as the first light guide plate 2251. In this instance, when the dent 224 is provided at a first corner of the light guide plate 225, the second light guide plate 2252 can be formed to have a width smaller than that of the first light guide plate 2251.

Figure 4A:
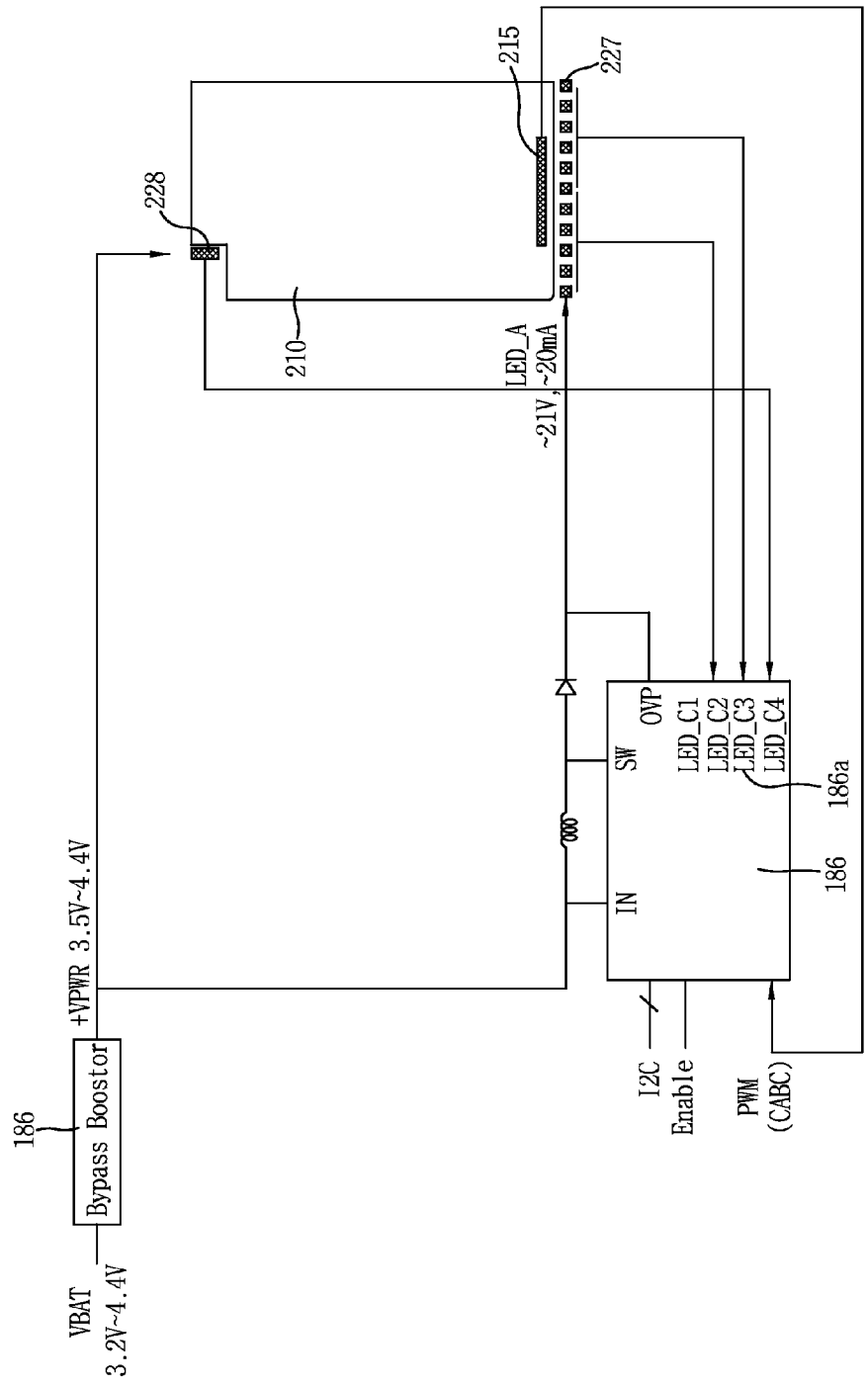
FIGS. 4A and 4B are circuit diagrams illustrating controlling a light guiding plate and a light source of a display panel of a mobile terminal according to an embodiment of the present invention.
Figure 4B:
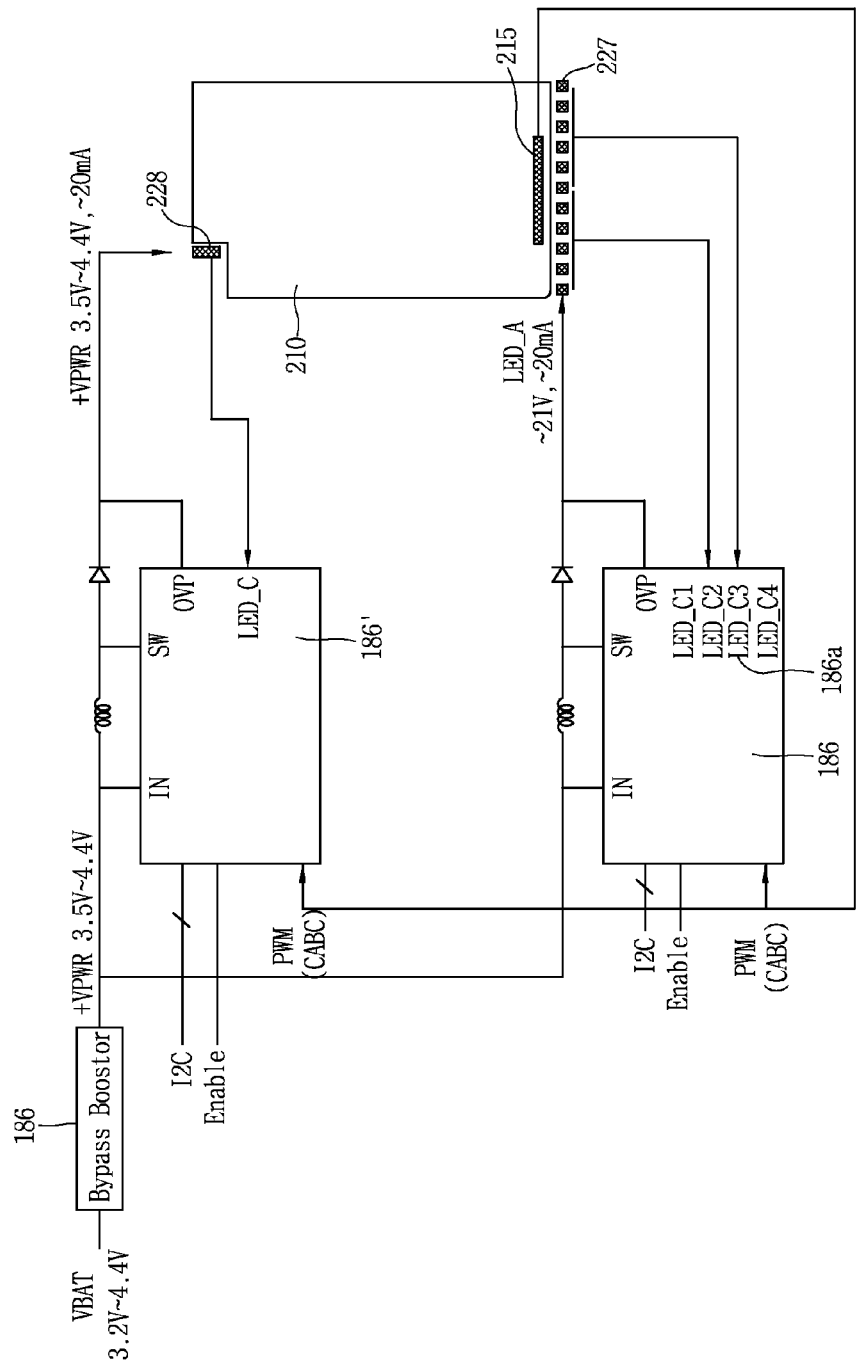

FIGS. 4A and 4B are circuit diagrams illustrating controlling a light guiding plate and light source of a display panel of the mobile terminal according to one embodiment of the present invention. In the IC circuit of FIG. 4A, a single backlight IC 186 controls the main light source 227 and the subsidiary light source 228, and in the IC circuit of FIG. 4B, two backlight ICs 186 control the main light source 227 and the subsidiary light source 228.

First, power is supplied from the power supply unit 190 to the main light source 227 and the subsidiary light source 228, respectively. Then, it is possible to provide a power stably by removing a noise via a bypass booster 187. When a signal is applied to the light sources 227 and 228 from the backlight IC 186, light is emitted from the light sources 227 and 228 and the backlight IC 186 controls a brightness of respective LEDs at more than 2,000 levels. Further, it is possible to obtain an optimal brightness of the backlight to see a corresponding image based on information of a raw data of an image received from a drive IC 215 of an LCD panel 210 (CABC: Content Adaptive Brightness Control).

Meanwhile, when a single backlight IC 186 is used, as shown in FIG. 4A, it is possible to control the subsidiary light source 228 by using an additional LED channel 186*a* instead of using the existing backlight IC 186, as shown in FIG. 4A. Alternatively, as shown in FIG. 4B, it is possible to separately control the subsidiary light source 228 by providing an additional backlight IC 186'.

Figure 5A:
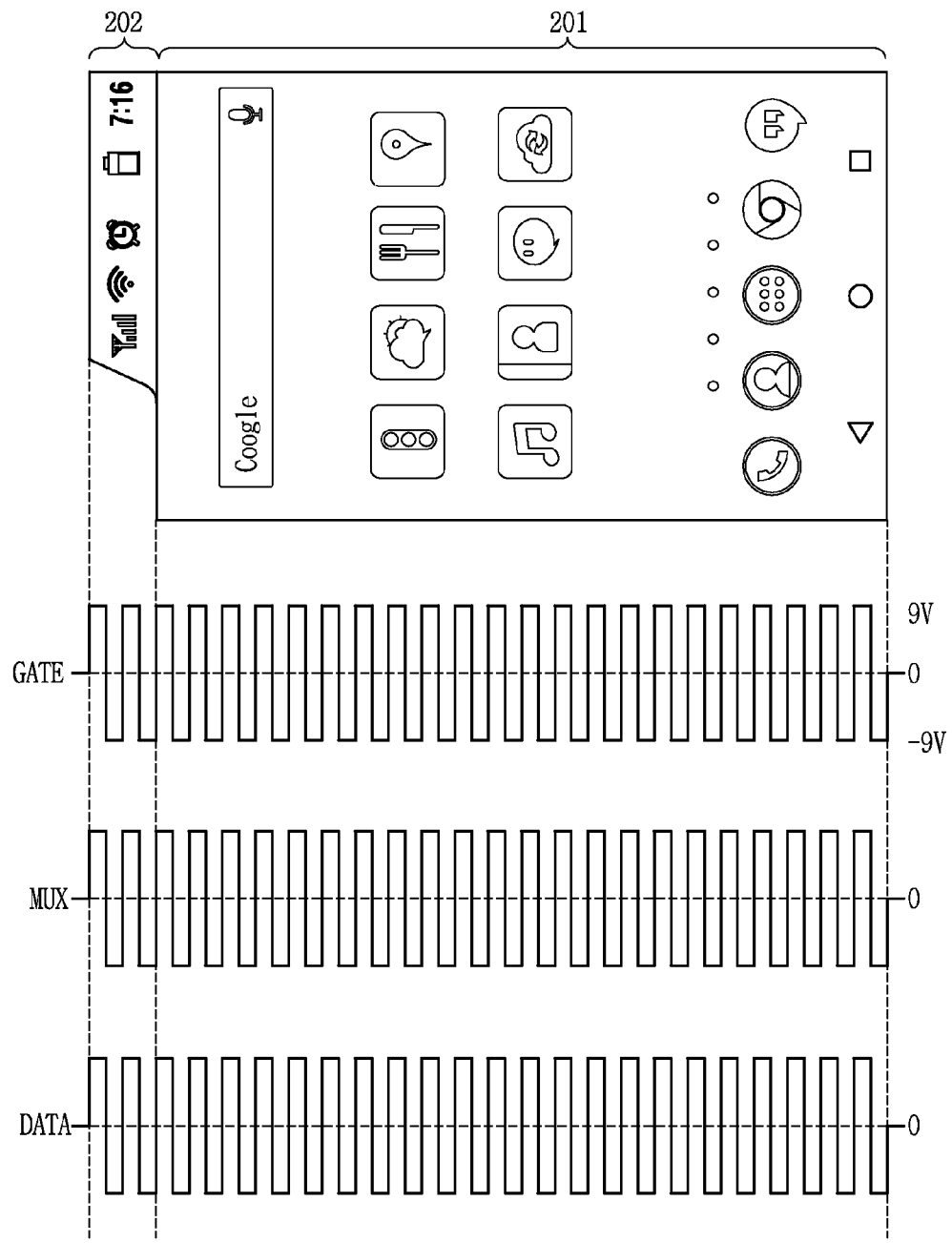
FIGS. 5A and 5B are graphs illustrating an amplitude of signals applied to a display panel of a mobile terminal according to an embodiment of the present invention.
Figure 5B:
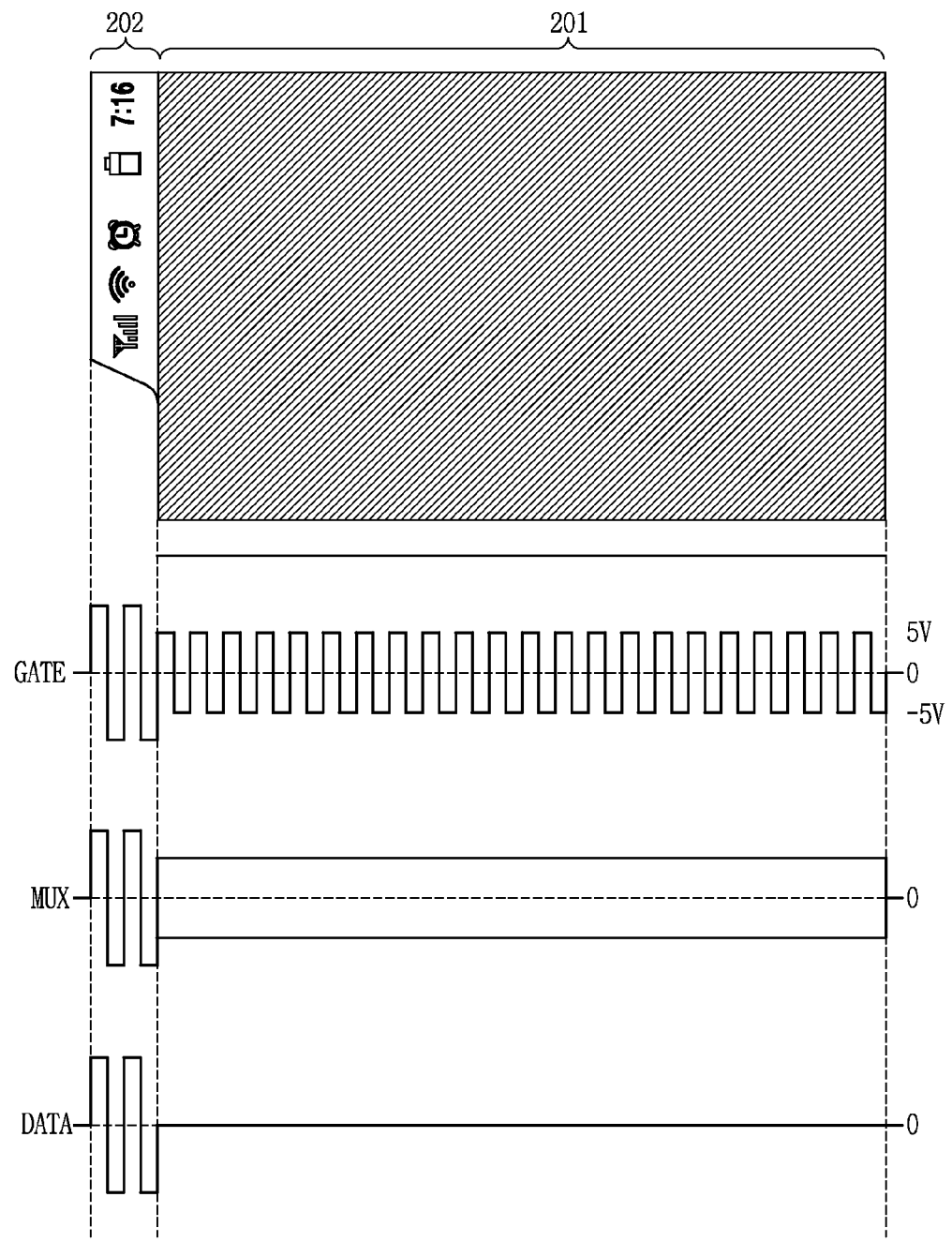

FIGS. 5A and 5B are graphs illustrating a magnitude of signals applied to a display panel of the mobile terminal according to one embodiment of the present invention. Specifically, FIG. 5A is a graph showing the voltage of a Gate signal, a Multiplexer signal and a data signal in a first mode, and FIG. 5B is a graph showing the Gate signal, the Multiplexer signal and the data signal in a second mode.

Referring to FIG. 5A, since the entire screen is used in the first mode, the gate, multiplexer and data signals have to be transmitted to both the first region 201 and the second region 202. The gate signal plays a role to determine a threshold voltage of each thin film transistor. Only when a data voltage over the voltage applied to the gate is applied, an image can be output by changing an arrangement of liquid crystal. Further, since the multiplexer is disposed between the drive IC and each transistor and gate signals and data signals to be transmitted to plural transistors may be transmitted through a single multiplexer, it is possible to reduce the number of signal lines. Signals transmitted from the drive IC through the multiplexer are sequentially redistributed and provided to each transistor. The gate signal includes a Gate Clock and a Shift-Resistor, and the Shift-Resistor receives a clock and conveys data to a next gate. The data signal, a signal to drive a liquid crystal panel according to color information by each pixel, may have light supplied from a backlight unit to pass through a front surface of a terminal body, by being applied with a larger voltage than the gate signal at a portion where alignment of liquid crystals should be changed.

Referring to FIG. 5B, since it is not necessary to transmit a data signal corresponding to the first region 201 in the second mode, the data signal has a value of 0V in the first region 201. Further, since the multiplexer does not output an image signal since the data signal does not exist, it is not necessary to distribute a signal so that any clocking is required and it can be controlled to be 0V without applying a voltage.

Meanwhile, since a gate clock of the gate signal is calculated in order to be synchronized with a position of each thin film transistor, it is necessary to execute a clocking at the first region 201 at a predetermined period. However, since a data signal is not substantially applied to the first region 201, a voltage of the gate signal is not important, so that a magnitude of a gate signal can be set to be small. For instance, in the second region 202 where alignment of liquid crystal is changed according to the data signal, a voltage of the gate signal should be ±9V, but may be lowered to about ±5V in the first region where data is not output.

The controller 180 controlling a display unit according to an embodiment of the present invention as described hereinbefore, can output preset screen information to the second region after converting the second region into an active state, while maintaining an inactive state of the first region. Here, the screen information being output to the second region includes visual information having information such as time, weather and date, or various visual information set by a user, for instance, one of a specific image, a signature and a text, or one of various information received from a preset application.

Meanwhile, when a preset input as aforementioned is received and a fingerprint input of a user is sensed via the rear input unit 133 of the mobile terminal 100, the controller 180 can convert the screen information being output to the second region into screen information corresponding to execution of a secret mode, while maintaining an inactive state of the first region. That is, the controller 180 can control information which can be checked in the secret mode to be output only on part of the display unit, when a user's fingerprint information is sensed at the rear input unit 133. As a result, it is possible to prevent secret information that is to be checked from being easily exposed to others, while reducing a power consumed in driving the display unit.

Figure 6:
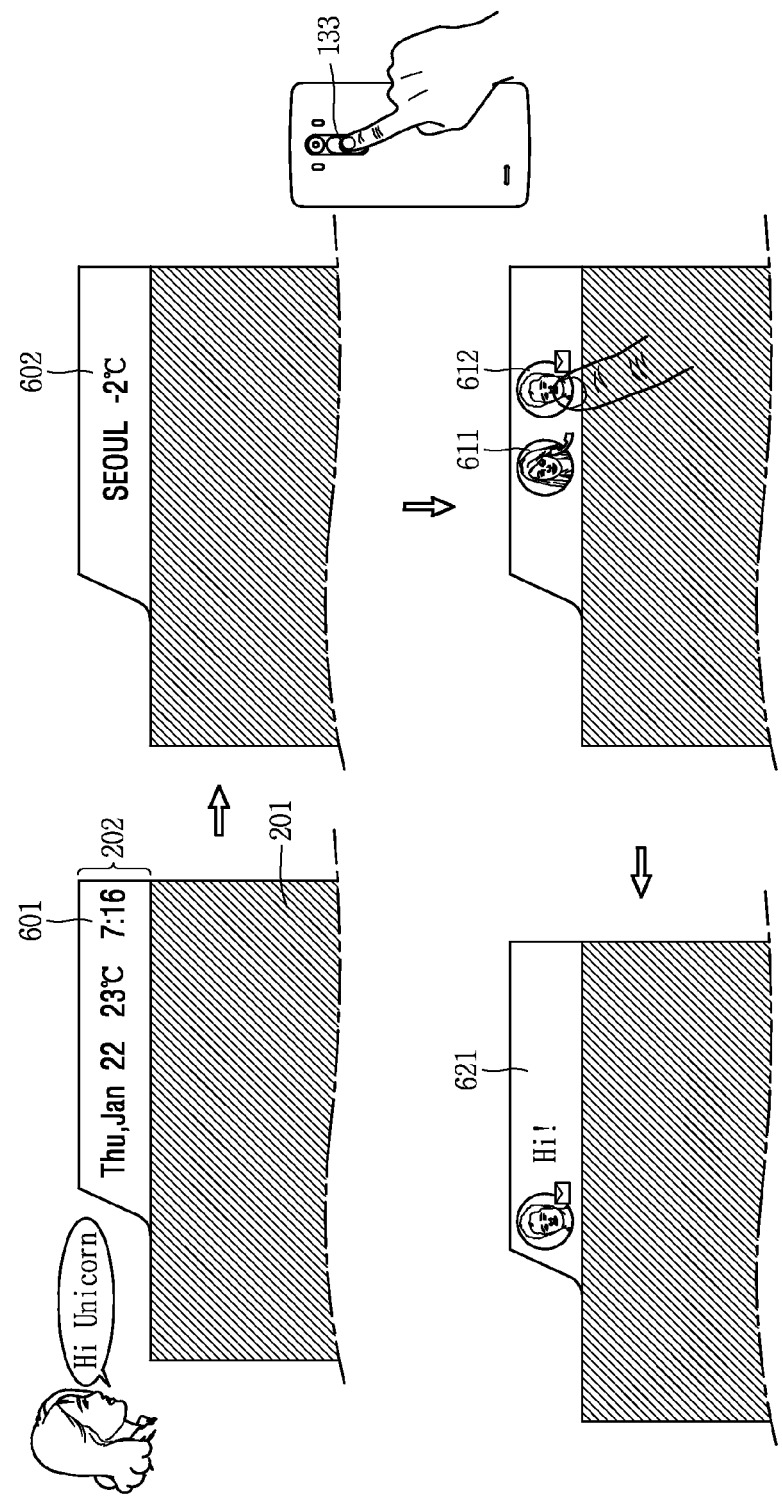
FIG. 6 is a schematic view illustrating a method to output different screen information by activating part of a display unit in a mobile terminal according to an embodiment of the present invention.

FIG. 6 is a schematic view illustrating a method to output different screen information by activating part of a display unit in the mobile terminal according to one embodiment of the present invention. As shown in FIG. 6, the display unit according to an embodiment of the present invention can be configured to have two regions divided in parallel. In such a case, the two separate regions 201 and 202 can be independently activated, or one region can be separately activated when the other is inactivated, or vice versa. Thus, according to an embodiment of the present invention, it is possible to reduce a power consumption to drive the display unit 200 by selectively activating only one of the two regions as necessary.

Referring to FIG. 6, the first region 201 occupies a majority of the display unit 200, and when the first region 201 is activated, a main image can be output. The second region 202 which is extended from and disposed in parallel with the first region 201 occupies part of the display unit 200 and other information than the main image may be output therefrom.

In FIG. 6, though both the first region 201 and the second region 202 are in an inactivated state, basic information 601 such as time, date and weather may be continuously displayed. In such a case, the controller 180 of the mobile terminal 100 may drive the subsidiary light source 228 of the light guide plate 225, as shown in FIGS. 3A and 3B, to be turned on (at a minimum power mode) so that light discharged from the subsidiary light source 228 may be incident to the second region 202, thereby making it possible for a user to check the basic information 601 displayed on the second region 202.

When a preset input, for instance, a voice input such as 'Hi Unicorn' is received through a microphone 122 when basic information 601 is output to the second region 202 which is in an inactive state, the controller 180 can convert the basic information 601 being output to the second region 202 into screen information set by a user, for instance, an image 602 including weather information of a preset area. In this instance, the controller 180 can control the main light source 227 of the light guide plate 225 to be turned off so that an inactive state of the first region 201 can be continuously maintained.

Thereafter, when a user's fingerprint input is sensed at the rear input unit 133 of the mobile terminal 100 while the image 602 is displayed on the second region 202, the controller 180 can convert the image 602 being displayed on the second region 202 into second screen information corresponding to execution of the secret mode, for instance, icons 611 and 612 indicating an event received from a contact list which is set at the secret mode. At this time, the controller 180 can control the first region 201 to be continuously maintained in an inactive state.

Here, the 'secret mode' corresponds to a state that the mobile terminal is accessed into a region where content, information, contact list, an event received from a preset application, and the like that a user does not want to expose to others, are stored. In this instance, the controller 180 can change a background image and color so that an outsider can recognize that the terminal enters into a secret mode, or indicate a graphic object, for instance, a lock image, indicating that the object included in the second screen image displayed on the second region 202 is secret information.

The icons 611 and 612 displayed on the second region 202 may include other party's information (for instance, picture images and the like) corresponding to a contact list set in the secret mode and information on an application corresponding to received events (for instance, an icon of a message application, an icon of a phone application). But, the icons 611 and 612 do not include information related to the received event.

When a touch input is applied to one of the displayed icons 611 and 612, the controller 180 can output information related to an event received from an application relevant to a corresponding icon 612, for instance, the received message 621 to the second region 202. The output message 621 can also disappear when a predetermined time has passed, and in this case the icons 611 and 612 can be displayed on the second region 202.

Further, the controller 180 can output the second screen information corresponding to execution of the secret mode or information related to received event to the second region 202 only when the fingerprint input sensed at the rear input unit 133 is maintained. That is, when the fingerprint input applied to the rear input unit 133 is released, the controller 180 can terminate execution of the secret mode and re-output the preset first screen information to the second region 202. As described hereinbefore, according to an embodiment of the present invention, it is possible to check secret information on part of the display unit through a combination of a voice input and a fingerprint input.

Figure 7:
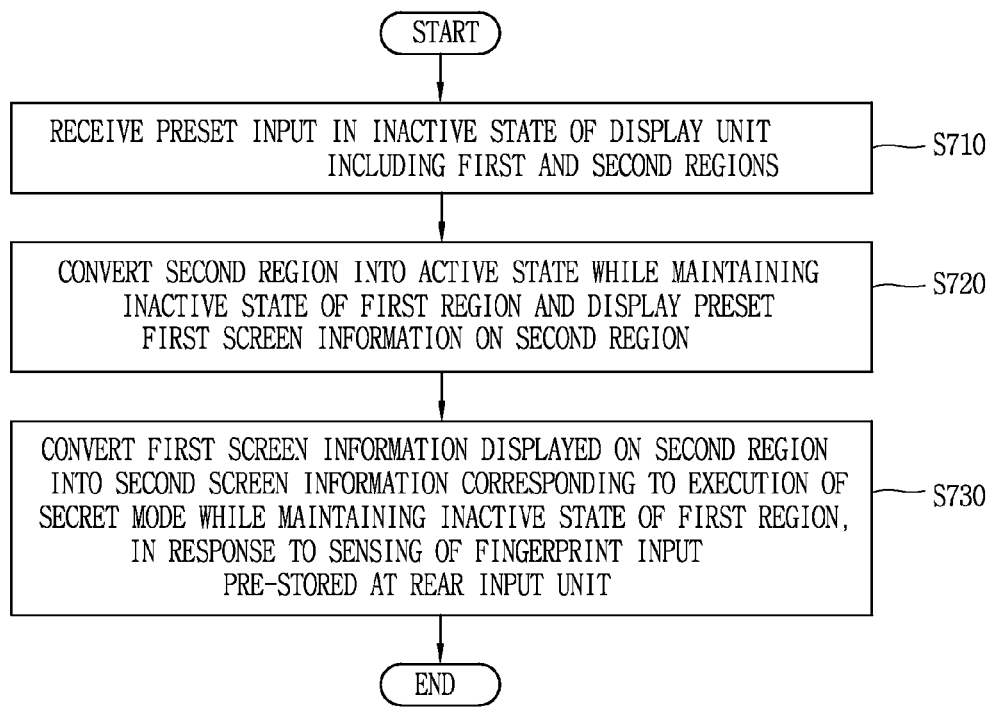
FIG. 7 is a flowchart illustrating a method to control a mobile terminal according to an embodiment of the present invention.

Next, FIG. 7 is a flowchart illustrating a method to output information to part of the display unit in the mobile terminal according to one embodiment of the present invention. First, the mobile terminal 100 according to an embodiment of the present invention can sense a preset input when both the first region 201 and the second region 202 of the display unit 200 are inactivated (S710).

Here, the preset input is an input of a control command to convert the second region 202 into an active state, and may be one of a preset key input, a touch input with respect to the second region 202, a preset voice input, a preset fingerprint input, and a preset gesture input. For instance, when a voice input is received, the controller 180 can distinguish whether either the received voice input is a control command to convert the first region 201 into an active state, a control command to convert the second region 202 into an active state, or a control command to convert both the first region 201 and the second region 202 into an active state, simultaneously.

Thus, when a user's voice input is input through a microphone 122 when the first region 201 and the second region 202 are in an inactive state, the controller 180 can maintain the voice recognition function in an ON-state all the time. When the received voice input corresponds to the aforementioned preset input, the controller 180 can convert the subsidiary power source 228 into an ON-state, while maintaining the main power source 227 of the light guide plate 225 in an OFF-state.

Meanwhile, the second region 202 can display basic information, such as the date, weather, time, and battery information in an inactive state, as described above. Thus, the controller 180 can control the subsidiary light source 228 radiating light to the second region 202 to be maintained in an ON-state with a minimum power so that a user can check the basic information of the terminal through the second region 202.

When the preset input is received as described above, the controller 180 can convert the second region 202 into an active state while maintaining the first region 201 in an inactive state, and can display preset first screen information on the second region 202 which has been converted into an active state (S720). Here, the first screen information is an initial screen that is displayed when the second region 202 is converted into an active state, and may be one of, for instance, weather information or time information of an area designated by a user, or content (image, photograph, video, text, and the like) or signature set by a user, or information received from a preset application.

When the basic information is displayed when the second region 202 is in an inactive state, the controller 180 can display a different background image from before when outputting the first screen information, so that a user can recognize that the second region 202 is converted into an active state.

Next, when a fingerprint input matching with one preset in the rear input unit 133 of the mobile terminal 100 is sensed, the controller 180 can convert the first screen information displayed on the second region 202 into the second screen information corresponding to execution of the secret mode (S730). That is, the controller 180 can change the type of information being output to the second region 202 using the fingerprint input to the rear input unit 133. In this instance, the inactive state of the first region 201 is continuously maintained, as described above.

Here, the second screen information is an initial screen that is displayed as the terminal enters into a secret mode, and may include content (image, photograph, video, text, and the like) or information set or stored by a user in a secret mode, an event (for instance, phone, message, SNS message, and the like) received from a preset contact list, or an event received from the preset application. Further, the controller 180 can display the second screen information when the secret information is filtered at an initial stage, thereafter, control the secret information corresponding to the second screen information to be displayed on the second region 202 when a touch input is applied either to the second region 202 or to the rear input region 133.

Meanwhile, the controller 180 can provide different secret information according to the type of the fingerprint input applied to the rear input unit 133. For instance, when the accessible secret mode is plural or has a different security level, the controller 180 can provide different secret information to the second region 202 according to the time that a fingerprint input is applied to the rear input unit 133, an intensity of a fingerprint input, or as to whether an additional gesture input or a touch input is sensed.

Further, the controller 180 can control the second screen information to output to the second region 202 only while a fingerprint input matching with the one preset to the rear input unit 133 is sensed. In this instance, when the fingerprint input applied to the rear input unit 133 is released, the controller 180 can convert the second screen information into the first screen information.

Further, according to an embodiment of the present invention, it is possible to control the second screen information corresponding to execution of the secret mode to be output to the second region 202 when a fingerprint input is first sensed at the rear input unit 133 when the second region 202 is in an inactivated state and at the same time or consecutively, when the aforementioned preset input is received. In this instance, the controller 180 can directly enter into a secret mode while converting the second region 202 into an active state, and the first screen information is not output to the second region 202. Thus, the controller 180 can control the fingerprint input sensor provided in the rear input sensor 133 to be maintained in an ON-state at all times irrespective of whether or not the display unit 200 is activated.

Meanwhile, when only part of the second screen information corresponding to execution of the secret mode is output to the second region 202, the controller 180 can output the other part of the second screen information to the second region 202, based on a left and right or upper and lower drag touch input applied to the second region 202 or the rear input unit 133.

When the second screen information corresponding to execution of the secret mode is displayed on the second region 202 and a touch input is applied to one of the objects included in the second screen information, the controller 180 can output secret information corresponding to an object to which the touch input is applied. As described above, according to the mobile terminal of an embodiment of the present invention, since the secret information can be checked by activating part of the display unit, it is possible to reduce a power consumed to drive the display unit and to prevent the secret information from being easily exposed to others.

Figure 8A:
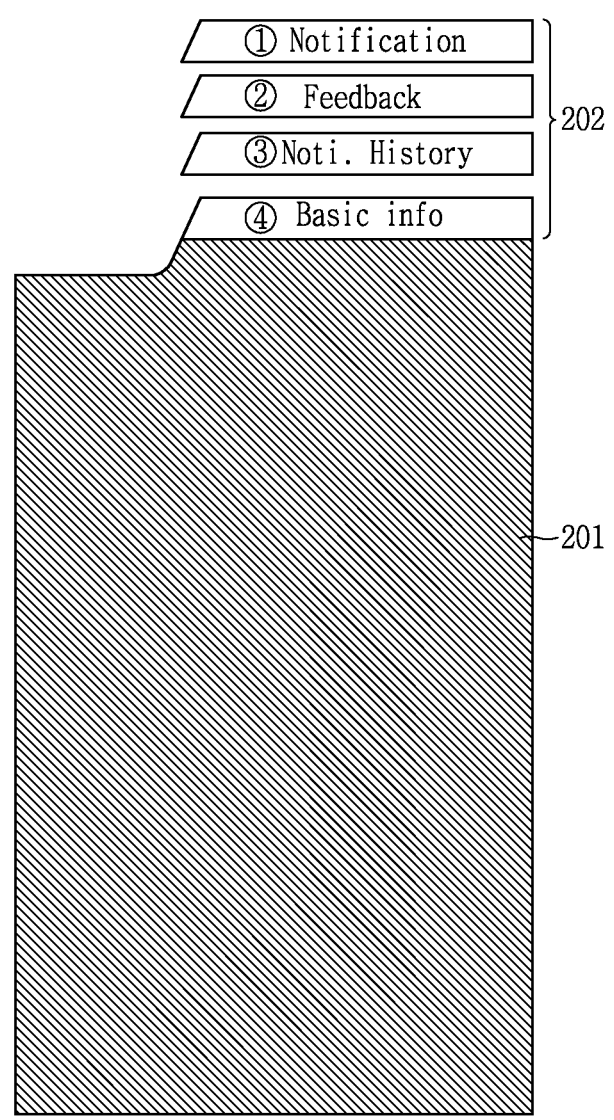
FIGS. 8A through 8D are schematic views illustrating types of screen which can be output to part of a display unit in a mobile terminal according to an embodiment of the present invention.

FIGS. 8A through 8D are schematic views illustrating types of screen which can be output to part of the display unit in the mobile terminal according to one embodiment of the present invention. FIG. 8A illustrates an order of priority to display information when information to be displayed on the second region 202 is plural.

As shown in FIG. 8A, when information to be displayed on the second region 202 is plural, information can be displayed on the second region 202 in the order of information (①) indicating an event generated from at least one application, feedback information (②) corresponding to a user input, information (③) indicating an unchecked event, basic information (④) such as a date, weather, time, battery information, and the like.

Figure 8B:
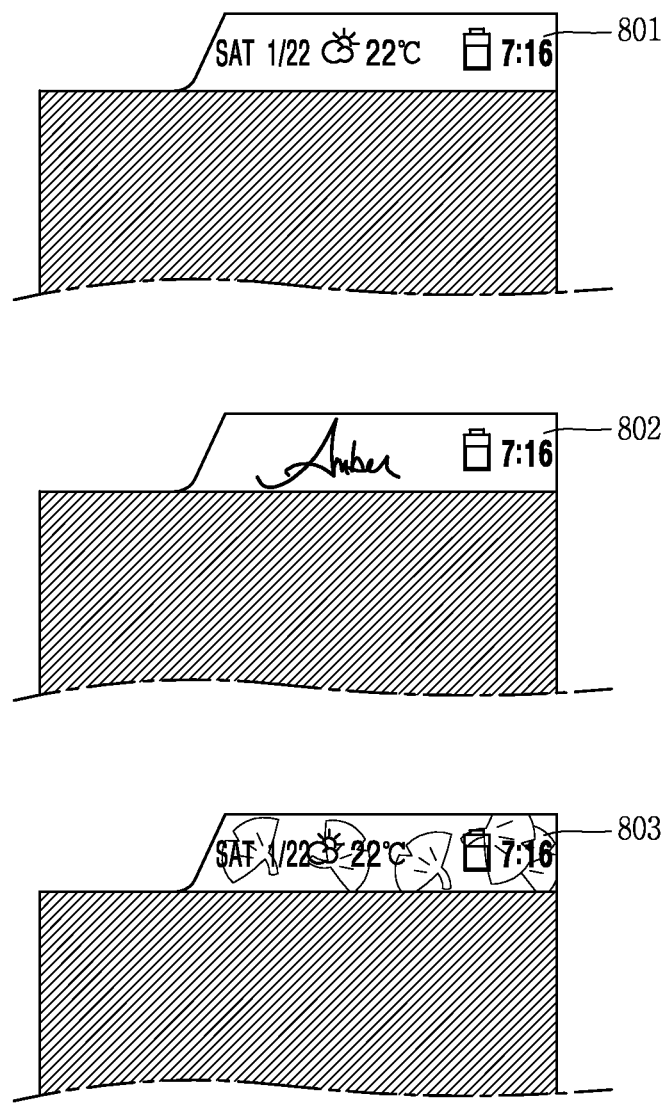

FIG. 8B illustrates an example of basic information to be displayed on the second region 202 when the first region 201 and the second region 202 are inactivated. As shown in FIG. 8B, the second region 202 can be displayed in at least one screen mode in an inactive state among a first screen mode (801) in which date, weather, an amount of battery, and time information are displayed, a second screen mode (802) in which a signature set by a user, an amount of battery, and time information, and a third screen mode (803) in which a background image set to the first screen mode by a user, and can change or add the preset screen mode through a user input.

Figure 8C:
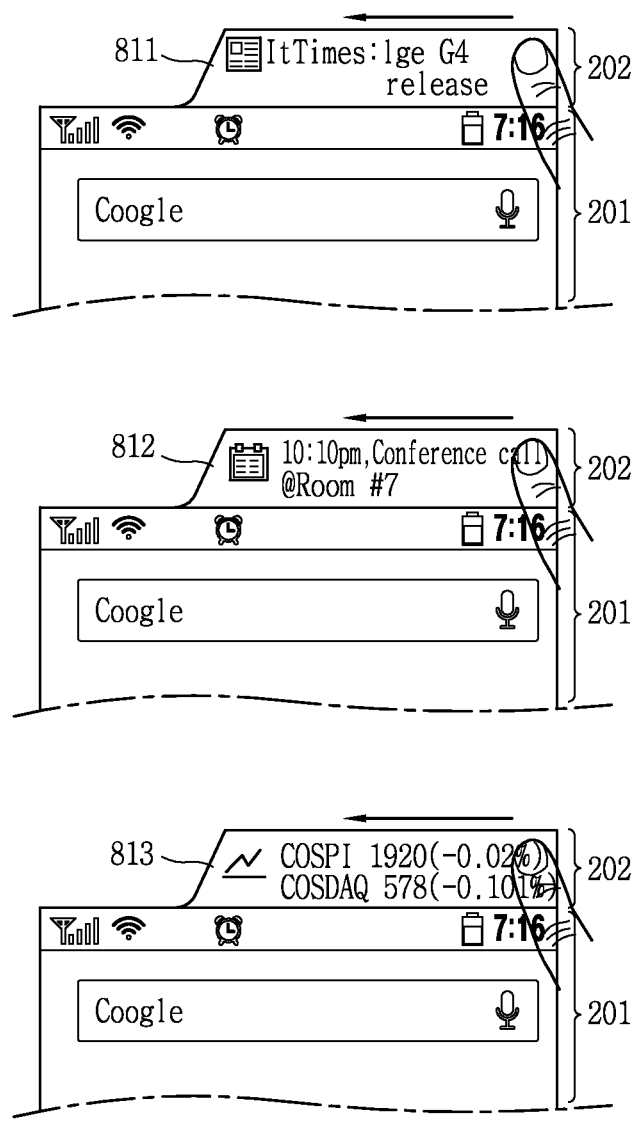

FIG. 8C illustrates that user interest information is displayed on the second region 202 when the second region 202 is activated. In this instance, the first region 201 is in an inactivated state, or in an activated state in which a home screen, a lock screen or an application of at least one execution screen is displayed. In this instance, interest information set by a user can be displayed on the second region 202.

When the interest information set by a user is plural, and when a drag touch input in one direction is applied to the second region 202, the controller 180 can push out interest information previously displayed along the dragged direction and display next interest information after dragging the same. As a result, for instance, as a swipe input on the left is applied to the second region 202, as shown in FIG. 8C, news information, schedule information, stock information can be displayed in order.

Figure 8D:
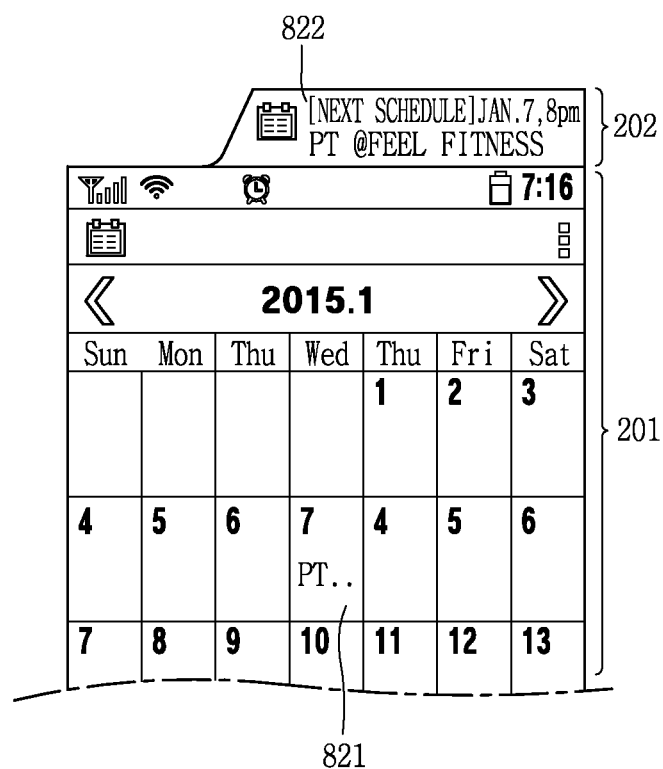

FIG. 8D illustrates an example in which information related to an execution screen of an application is output to the second region 202 when both the first region 201 and the second region 202 are activated. As shown in FIG. 8D, when a calendar image corresponding to execution of a calendar application is displayed on the first region 201 and schedule information (821) is displayed on a specific date, detailed information (822) of the schedule information (821) displayed on the first region 201 can be displayed on the second region 202. As a result, it is possible to immediately check corresponding detailed information through the second region 202 while maintaining a display state of the first region 201, though a touch is not applied to a region where the schedule information is displayed in order to check the detailed information of the schedule information (821).

Figure 9A:
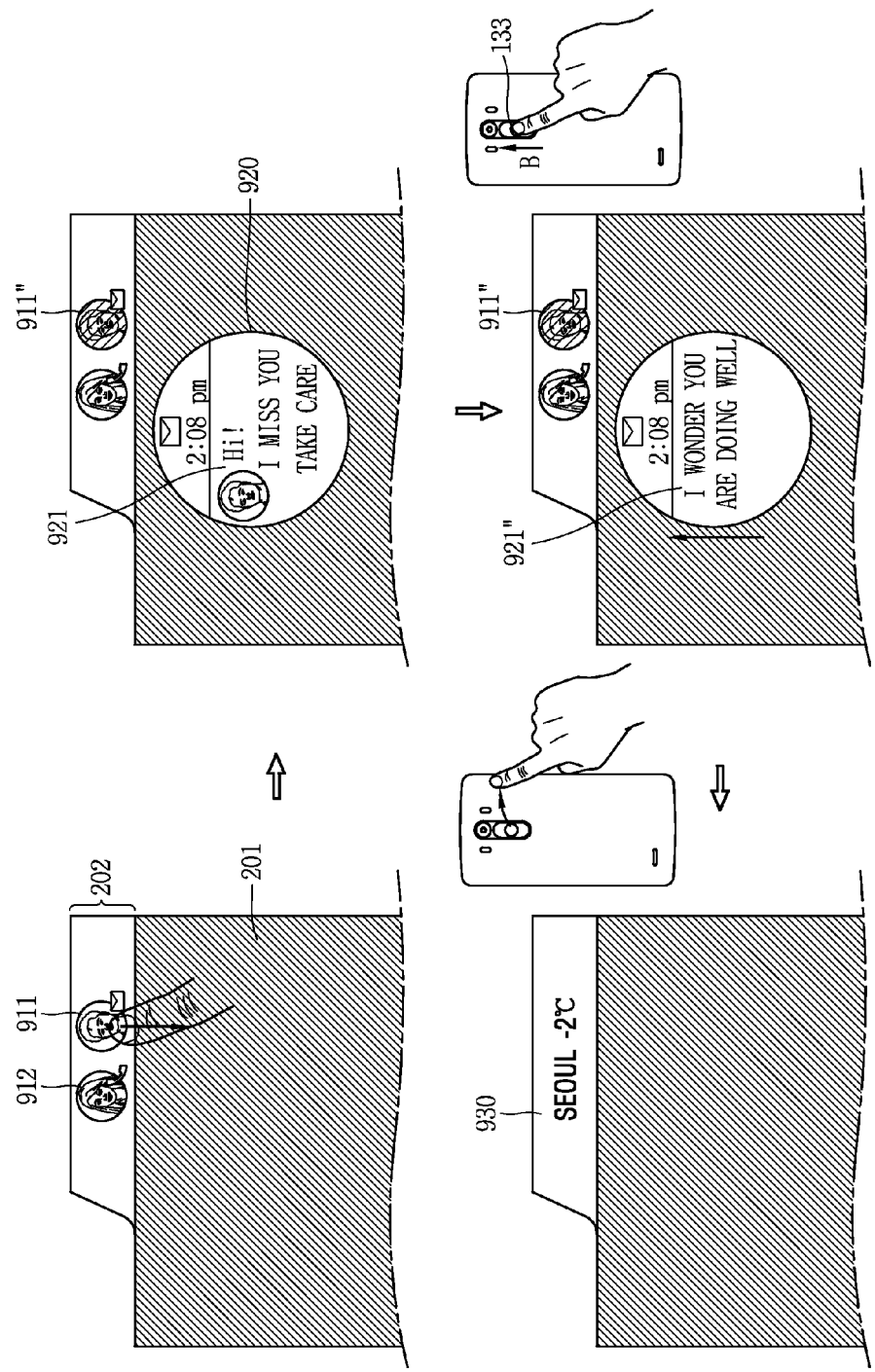

FIGS. 9A and 9B are schematic views illustrating a method to control information output to part of the display unit using a touch input to a rear input unit in the mobile terminal according to one embodiment of the present invention. FIG. 9A shows that information displayed on the second region 202 is controlled using a touch input to the display unit 200 and the rear input unit 133, and FIG. 9B shows that information displayed on the second region 202 is controlled using a touch input to the rear input unit 133.

When a preset input is received and a fingerprint input matching with fingerprint information preset in the rear input unit 133 is received when the second region 202 is inactivated, the controller 180 of the mobile terminal 100 can enter into a preset secret mode. Then, the controller 180 can output screen information corresponding to the secret mode, for instance, icons 911 and 912 indicating an event received from a contact list which has been set in the secret mode, to the second region 202, while maintaining an inactive state of the first region 201, as shown in FIG. 9A. In this instance, information related to the received event is not displayed on the icons 911 and 912 which are output to the second region 202.

When icons 911 and 912 indicating an event which is checkable in a secret mode are output to the second region 202, the controller 180 can sense that a drag touch input from the second region 202 toward the first region 201 is applied to a specific icon 911. Then, the controller 180 can output a selection indication (for instance, shadow effect) 911" to a specific icon 911, and display information related to an event received from an application corresponding to the selected icon 911, for instance, part of the received message on the first region 201.

Meanwhile, when part 921 of the received message is displayed on a specific region (for instance, center) of the first region 201, the message can be displayed within a popped up window screen 920. In this instance, the controller 180 can turn on only a light source (for instance, LCD) corresponding to a specific region, while maintaining an inactivated state of the first region 201. In FIGS. 9A and 9B, the window screen is shown in a circle type, but is not limited thereto and may be configured as a tetragon, a pentagon, or any other shape that can display information therein.

Information displayed on a popped up window screen 920 can exclude important or secret information among information related to the event. That is, when a received message is displayed on the second region 202, the controller 180 can display an entirety of the received message, while when the received message is displayed on a specific region of the first region 201, the controller 180 can display partial information among the received message after filtering. In this instance, the filtered important information or secret information may include, for instance, a specific word or specific type of content (for instance, image) set by a user, besides recipient information (image stored in an address book, contact list information, and the like), a type of an application in which an event is generated. When an input to convert the first region 201 into an active state is received and a fingerprint input is applied to the rear input unit 133, the filtered information can be checked in the first region 201.

Further, when a drag touch input toward the first region 201 is applied to the other icon 912 which is displayed on the second region 202 when the first window screen 920 is popped up, the controller 180 can output the second window screen to the other portion of the first region 201.

Meanwhile, when the rear input unit 133 is configured to sense a touch input, the controller 180 can control a position of a window popped up on the first region 201 or display of the filtered information according to a direction of a drag touch input applied to the rear input unit 133. For instance, as shown in FIG. 9A, when an upward drag touch input is applied to the rear input unit 133 (B), another portion 921" of the received message may be output when a position of the window screen 920 is fixed. That is, the controller 180 can move the information displayed on the window screen 920 in the left and right directions when left and right drag touch inputs are applied to the rear input unit 133, and move the information displayed on the window screen 920 in upper and lower directions when a drag touch input in upper and lower directions is applied to the rear input unit 133.

Further, the controller 180 can limit screen information corresponding to execution of the secret mode to be output only when a fingerprint input is sensed at the rear input unit 133 so that the screen information corresponding to execution of the secret mode is not exposed to others. That is, in FIG. 9A, when a fingerprint input applied to the rear input unit 133 is released when a window screen 920 is displayed on a specific region of the first region 201 and icons 911 and 912 are displayed on the second region 202, the controller 180 can stop displaying the window screen 920 and icons 911 and 912 and re-display the first screen information preset in the second region 202, for instance, weather information of an area which has been designated by a user. That is, when a fingerprint input applied to the rear input unit 133 is released, execution of the secret mode is terminated.

Referring to FIG. 9B, when a left and right drag touch input is applied to the rear input unit 133 (A) when the first information is set in the secret mode, for instance, event information 910 received from a secret address book, is displayed on the second region 202, second information which is different from the first information, for instance, stock information 920 can be displayed on the second region 202, while the event information 910 is turned over in a dragged direction.

Further, when a drag touch input in upper and lower directions is applied to the rear input unit 133 (B or C) when the second information set in the secret mode is displayed on the second region 202, information displayed on the second region 202 can be moved to a specific region of the first region 201 and displayed on the popped up window screen 940, or information displayed on the first region 201 can be brought again to the second region 202. In this instance, inactive state of the first region 201 is maintained, when information displayed on the second region 202 is displayed on the first region 201, detailed information that is difficult to display on a small screen (for instance, drawings, graphs, images, and the like) may be further included. As described hereinbefore, it is possible to control information displayed on the second region 202 while maintaining an inactive state of the first region 201 only with a touch input applied to the display unit and the rear input unit.

Figure 10:
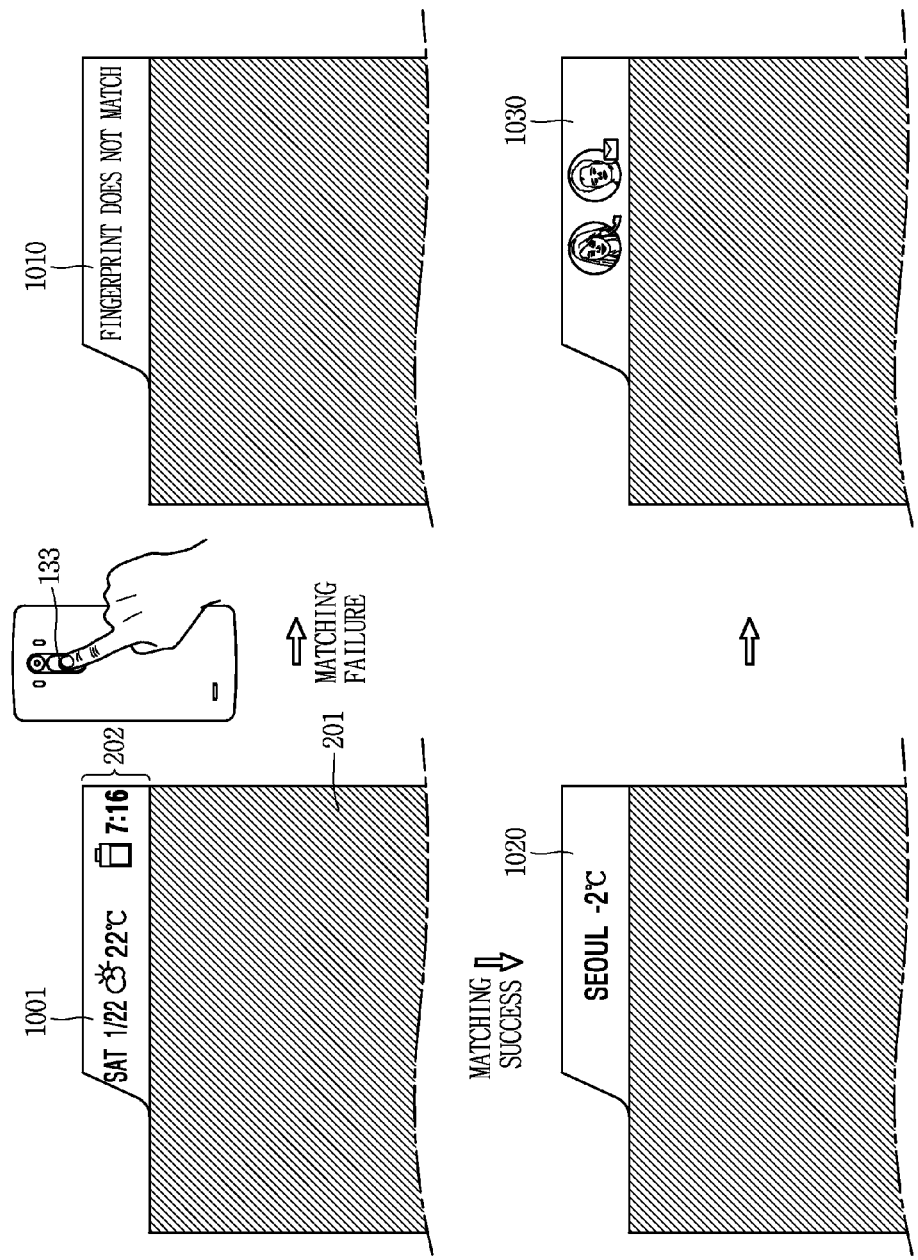
FIG. 10 is a view illustrating a method to display feedback information corresponding to a fingerprint input sensed at a rear input unit in a mobile terminal according to an embodiment of the present invention.

FIG. 10 is a view illustrating a method to display feedback information corresponding to a fingerprint input sensed at a rear input unit in the mobile terminal according to one embodiment of the present invention. According to an embodiment of the present invention, the fingerprint recognition sensor provided in the rear input unit can be maintained in an ON-state even when both the first region 201 and the second region 202 are in an inactive state. When a fingerprint input is sensed at the rear input unit 133, the controller 180 can display feedback information corresponding to the comparison results of the sensed fingerprint information with the preset fingerprint information on the second region 202 which is in an active or inactive state.

As shown in FIG. 10, when basic information (for instance, date, weather, battery amount, time information, and the like) is displayed when the second region 202 is inactivated and a fingerprint input is sensed at the rear input unit 133, the controller 180 can match the sensed fingerprint input with the fingerprint information stored in the terminal, output a text and/or an image corresponding to the matching results to the second region 202.

When the match fails, text information 1010 such as 'The fingerprint does not match', or an image corresponding to the matching failure can be displayed on the second region 202. When the match succeeds, a text and/or an image indicating the success is output to the second region 202, or an initial screen which is displayed according to conversion into an active state, for instance, weather information 1020 of an area that has been set by a user can be immediately displayed.

When the matching is successful, the controller 180 can change differently information being displayed on the second region 202 according to the time that the fingerprint input is applied to the rear input unit 133. Thus, the controller 180 can execute a counting operation when the fingerprint input is successful. For instance, when a preset time (for instance, 2 seconds) has passed after the matching success, the controller 180 can convert the displayed weather information 1020 into screen information corresponding to execution of a secret mode, for instance, information 1030 corresponding to an event which is received from a secret address book.

Meanwhile, when a security level is set to the secret information corresponding to the secret mode, the controller 180 can control such that a user accesses to information corresponding to a security level which is increased in proportion to the time that the fingerprint is sensed at the rear input unit 133. In this instance, when a fingerprint input sensed at the rear input unit 133 is released, it is converted into information corresponding to a lowest security level, or converted into an initial screen which is displayed as the second region 202 is converted into an active state. Hereinbefore, described are various embodiments of a method to control information displayed on the second region 202 while maintaining an inactive state of the first region 201.

Hereinafter, various examples will be described with reference to FIGS. 11A through 11C, to explain a method to output information related to the second region 202, when screen information corresponding to execution of at least one application is output to the first region 201.

The controller 180 disclosed in the present invention can output a main image with a full screen using the first region 201 as an entire window mode when both the above mentioned first and second regions 201 and 202 are converted into an active mode, and can display different information from the main information, for instance, interest information set by a user, status information of a terminal, or event information generated by at least one application, on the second region 202. Alternatively, when both the first region 201 and the second region 202 are converted into an active state, the controller 180 can output visual information related to screen information being output to the first region 201, on the second region 202.

Figure 11A:
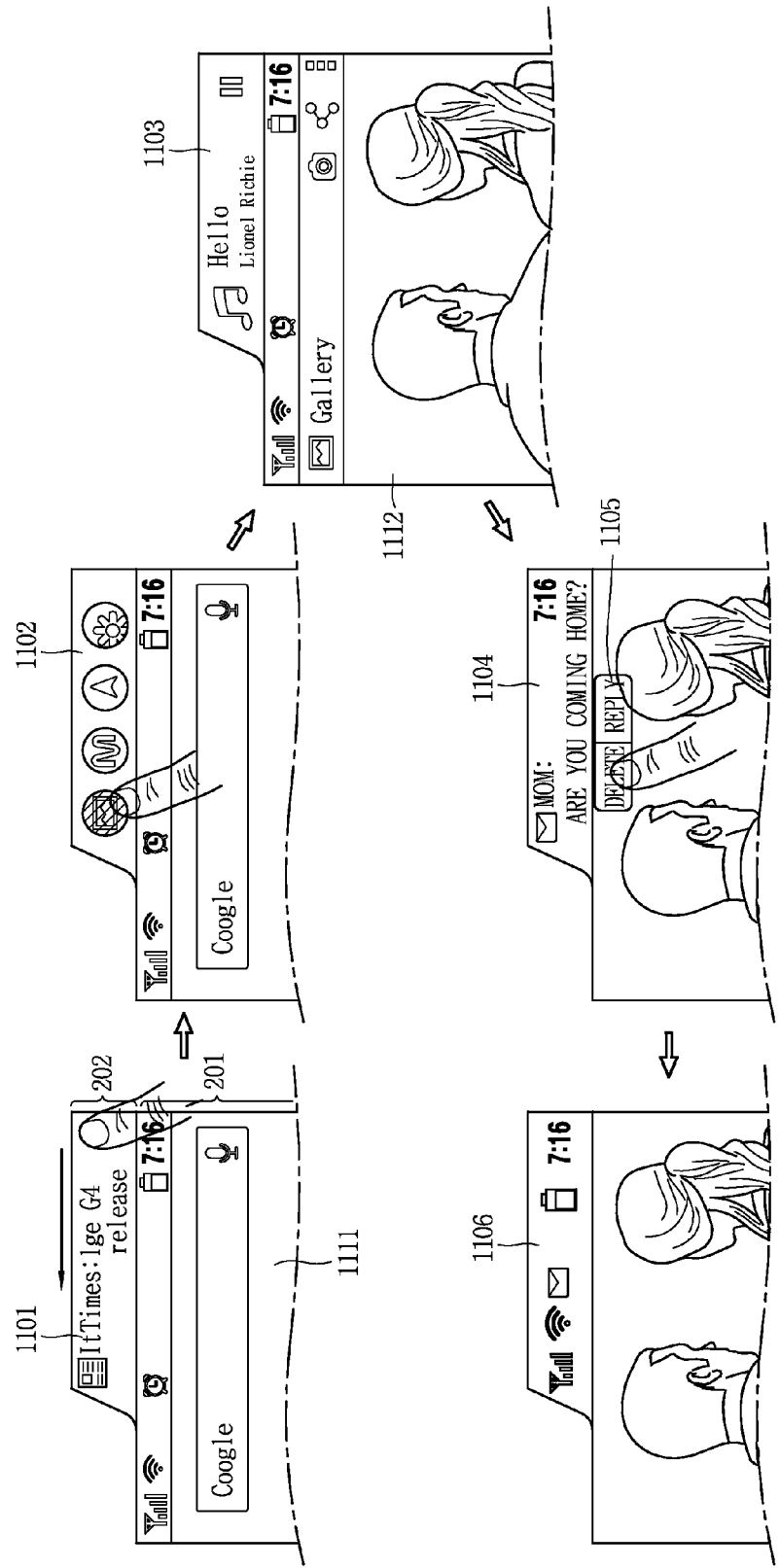
FIGS. 11A through 11C are views illustrating a method to output related information to part of a display unit, based on screen information which has been output to a main region of a display unit in a mobile terminal according to an embodiment of the present invention.

Referring to FIG. 11A, when a webpage screen 1111 corresponding to execution of a web application is output to the first region 201, interest information set by a user, for instance, news information may be output to the second region 202. In this instance, when a drag touch input in one direction (for instance, left) is applied to the second region 202, news information 1101 being output to the second region 202 is converted into an icon 1102 of another application which is currently executed at the first region 201 and may be used as a multitasking panel. A user can directly access another application being currently executed on the background by touching the icon 1102 displayed on the second region 202, without changing the current web page screen 1111.

When an icon of a gallery application is selected at the second region 202, a screen 1112 corresponding to execution of a gallery application is output to the first region 201, and when background music is set to the screen 1112, the set background music is automatically played. In this instance, information 1103 related to the background music (for instance, title of the background music, name of the singer, control key, and the like) which is set to the screen being output to the first region 201 can be displayed on the second region 202.

Meanwhile, when an event (for instance, message reception) is generated while a screen 1112 corresponding to execution of a gallery application is output to the first region 201, the controller 180 can output the event, that is, information 1104 indicating the received message to the second region 202 and continuously maintain the first region 201 in an entire window mode.

In this instance, when a touch input is applied to the second region 202, the controller 180 can pop up a control menu 1105 for executing a function related to a process of the received message. At least part of the control menu 1105 can be displayed on the first region 201, as shown in FIG. 11A. When processing of the event is completed or a predetermined time has passed, an indicator bar indicating status information of the terminal (for instance, Wi-Fi, unchecked event, battery amount, time information) may be redisplayed on the second region 202.

Figure 11B:
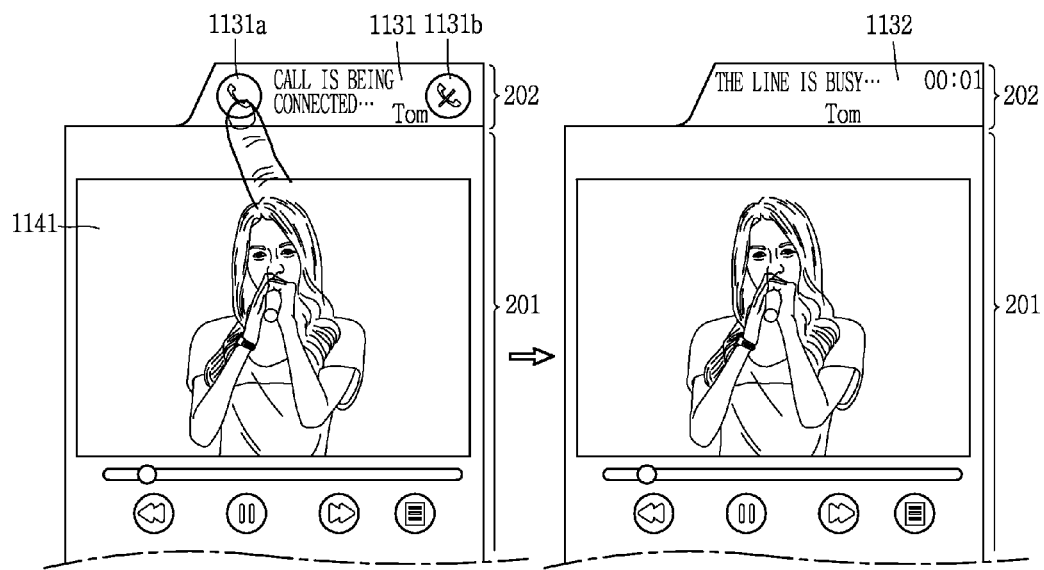

Successively, as shown in FIG. 11B, when an event, for instance, a call signal is received when a video 1141 is displayed on the second region 202 in a full screen, the controller 180 can maintain the entire window mode of the first region 201 and output information 1131 indicating reception of the call signal to the second region 202. In this instance, the information 1131 can include icons 1131a and 1131b for processing the received call signal, and a user may select one of the displayed icons 1131a and 1131b to process (reply or reject) the received call signal. When selecting a reply icon 1131a, a call connection screen 1132 can be displayed only on the second region 202, and on the second region 202, video 1141 is continuously output to the first region 201 (automatic execution of sound elimination), or maintain a temporary stop state.

The controller 180 can display information indicating a function being executed on the second region 202, while at least one function related to screen information being displayed on the first region 201 is executed. Also, when execution of the at least one function is completed, the controller 180 can display the execution result of the function on the second region 202.

Figure 11C:
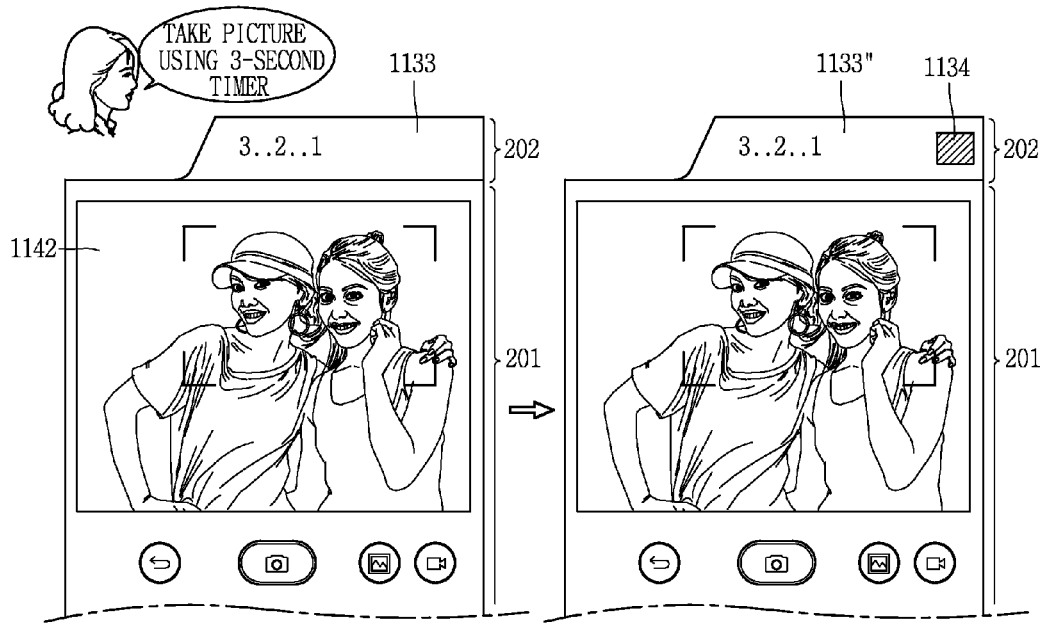

For instance, as shown in FIG. 11C, when a preview screen corresponding to execution of a camera application is output to the first region 201 and a control command related to 'capturing function' is input through a user's voice command, the execution state and result of the selected 'capturing function' are displayed on the second region 202. For instance, when a voice command such as 'capture with a 3-second timer' is input, the controller 180 can recognize the input voice command and transmit a control command for driving a camera 121 at an interval of three seconds. In this instance, timer information (for instance 3 . . . 2 . . . 1) 1133 related to driving of the camera 121 can be displayed on the second region 202, and thumbnails 1134 of the captured image can be displayed in order.

FIGS. 12A and 12B, 13A through 13F, and 14A and 14B are views illustrating a method to output related information on part of a display unit based on screen information which has been output to a main region of the display unit and a fingerprint input sensed in a rear input unit in the mobile terminal according to one embodiment of the present invention.

As aforementioned, when both the first region 201 and the second region 202 are in an active state, information related to a screen which is displayed on the first region 201 can be displayed on the second region 202. In this instance, the controller 180 can determine information to be displayed on the second region 202 according to a type of a screen displayed on the first region 201 and a type of a corresponding application.

Further, when a fingerprint input is sensed at the rear input unit 133 when first visual information related to a screen which is displayed on the first region 201 is output to the second region 202, the controller 180 can convert the first visual information into second visual information related to a screen displayed on the first region 201 and set with security. That is, when the fingerprint input sensed at the rear input unit 133 is matched with preset fingerprint information, the controller 180 can provide secret information set with a lock among information related to screen information displayed on the first region 201 to the second region 202. Thus, the controller 180 can sense a type of an application being executed at the first region 201 and a process of the current screen, and extract secret information required to the current process from the terminal.

Figure 12A:
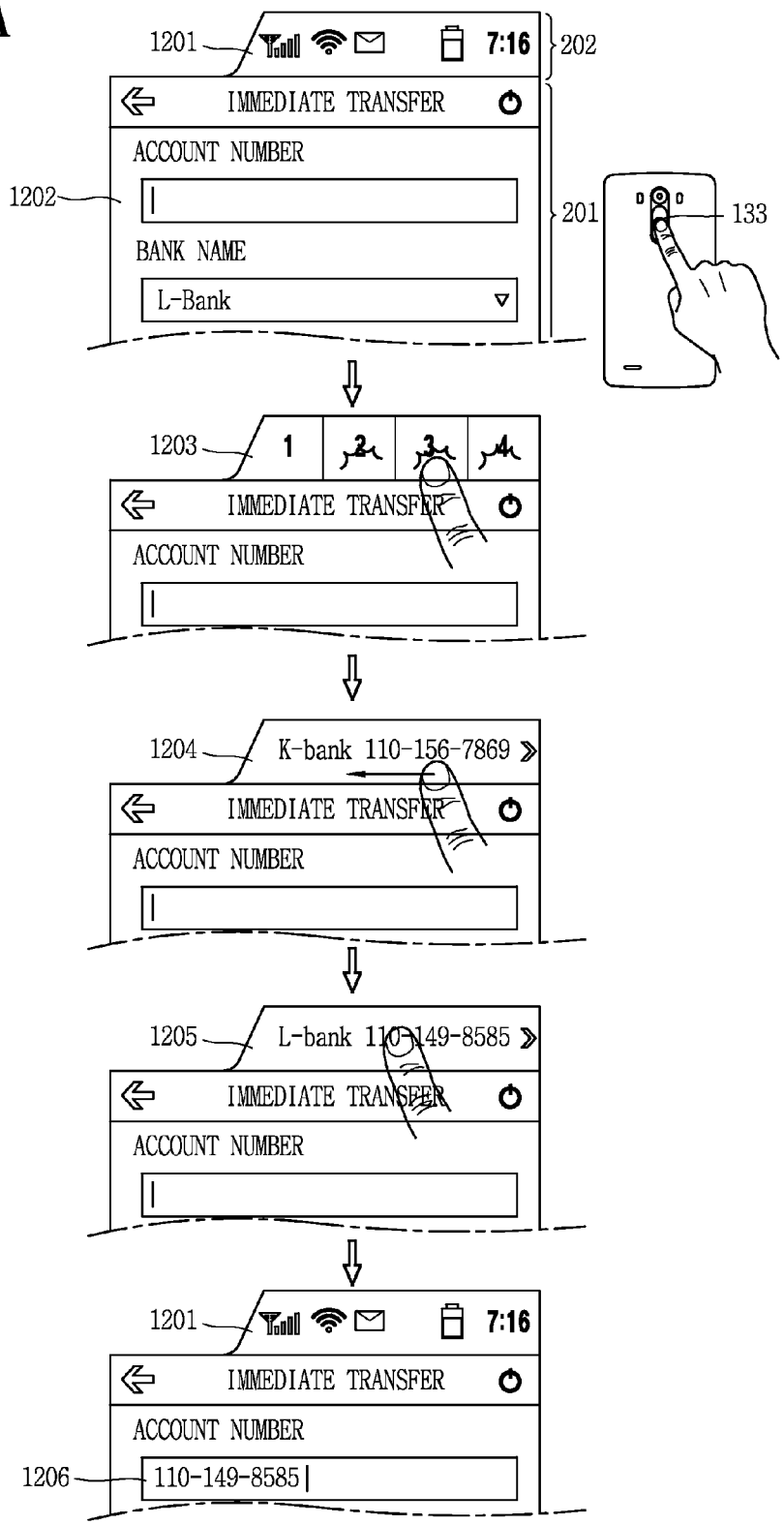

Specifically, referring to FIG. 12A, when a credit transfer screen 1202 corresponding to execution of a finance application is output to the first region 201 and a user's fingerprint input is sensed at the rear input unit 133, the controller 180 can convert a screen of the second region 202 into an input screen 1203 for providing secret information related to a credit transfer screen 1202 and set with a lock.

Thus, the screen 1201 indicating status information of the terminal which has been output to the second region 202 can be converted into an input screen 1203 which is divided into plural (virtual) regions. Here, the screen divided into plural (virtual) regions is a screen that the second region 202 is divided into a quadrant in a horizontal direction, and can be displayed as a black screen as if it is converted into an inactive state, or can be displayed in a screen in which border lines and identification numbers are indicated so that the quadrant may be visually discriminated.

Under the state, when a plurality of touch inputs corresponding to a preset reference are applied to the input screen 1203, the controller 180 can output secret information related to the credit transfer screen 1202 and set with a lock, for instance, a preset account number 1204, a secret number, a digital certification number, security card information, and the like to the second region 202.

Here, the plurality of touch inputs mean taps that consecutively tap a plurality of regions which are divided in the second region 202 within a preset limited time, and also mean that a pattern formed by sequentially connecting positions corresponding to the taps is matched with a pattern which is preregistered for releasing a lock setting. For instance, for the preset pattern is '②④③①', when taps which are sensed at the spots identical to the pattern, the controller 180 can output an account number 1204, which is set with a lock, to the second region 202. Meanwhile, when the sensed taps are not matched with the preregistered pattern, the controller 180 can output feedback information indicating failure of the matching to the second region 202.

When the number of secret information that is set with a lock is plural, a user can check previous/next secret information 1205 by applying a drag touch input in left and right directions. Further, when a touch is applied to the displayed secret information when desired secret information is displayed on the second region 202, the controller 180 can directly input the selected secret information, that is, desired account number 1205 to an input position of the first region 201. Here, the input position of the first region 201 means a region where a graphic object (for instance, a cursor) indicating an input position of a text in the first region 201. When the account number 1205 which is output to the second region 202 is input to the first region 201 by a touch, the controller 180 can control the account number 1205 which is output to the second region 202 to disappear and status information which is previously displayed to re-output.

Figure 12B:
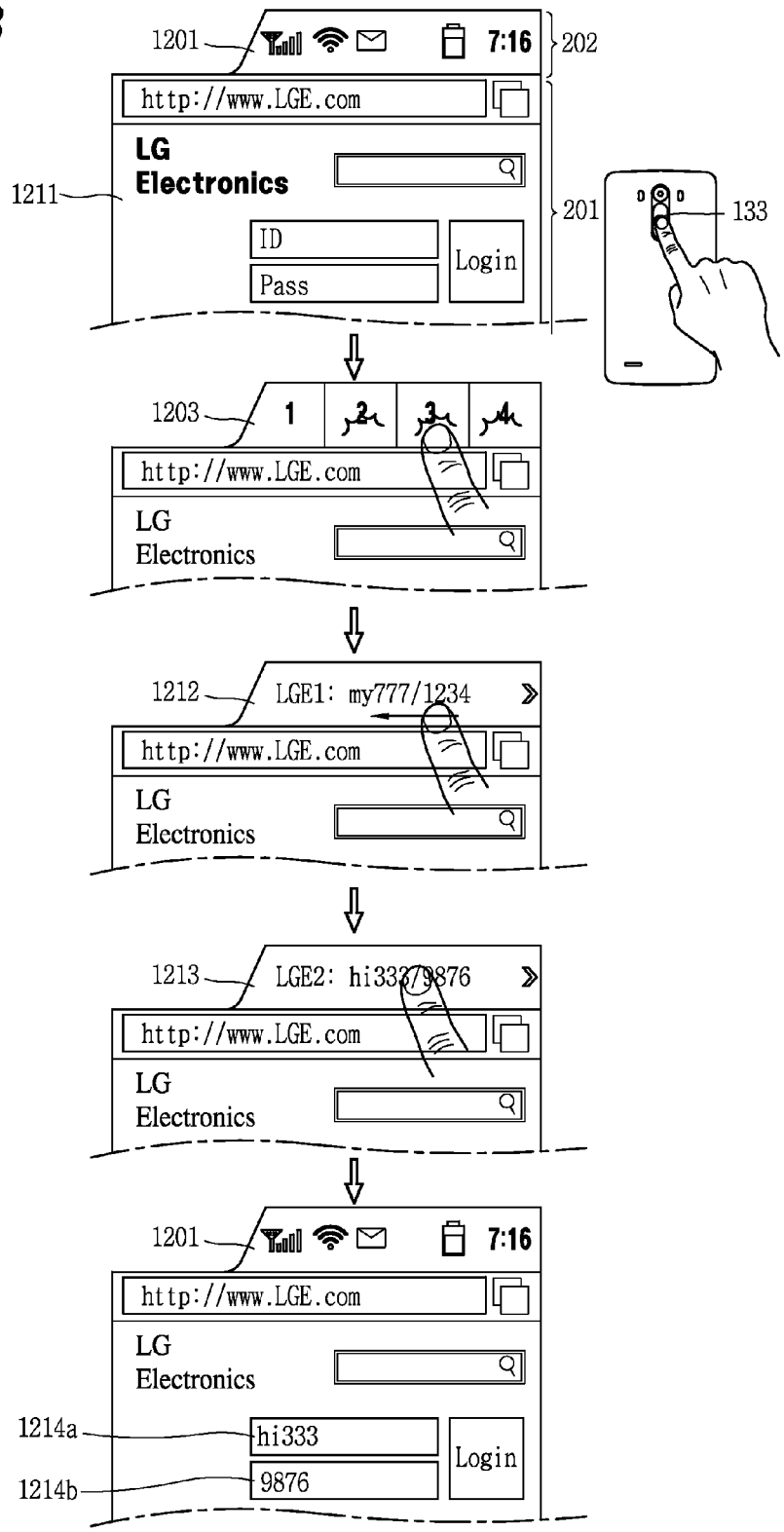

FIG. 12B illustrates a process in which a log-in ID and a password are displayed on the second region 202 based on the plural touch inputs applied to the second region 202, when a fingerprint input is sensed at the rear input unit 133 a web application is executed and the log-in screen 1211 is output to the first region 201. In this instance, when the plural IDs and passwords are stored, a user can select desired ID and password by applying leftward and rightward drag touch inputs (or, swipe inputs or flicking touch inputs) to the second region 202.

FIGS. 13A through 13F illustrate various examples to quickly access a depth information/space information using a fingerprint input to the rear input unit 133. The depth is a method to access a specific lower item in a menu, and may include a method to access through a plurality of steps or a method requiring a certification to access. In the present invention, it is possible to access a depth information/space by applying a fingerprint input to the rear input unit 133. Hereinafter, it is possible to name the depth information/space as lock-set information or space.

As described hereinbefore, when a fingerprint input is applied to the rear input unit 133 when information related to the screen information displayed on the first region 201 is output to the second region 202, the controller 180 controls secret information related to the screen information displayed on the first region 201 and set with security to be displayed on the second region 202.

Under the state, when a drag touch input toward the first region 201 from the second region 202 is applied, the controller 180 can control the secret information which has been output to the second region 202 to be displayed (input) on a position corresponding to the screen information displayed on the first region 201.

Figure 13A:
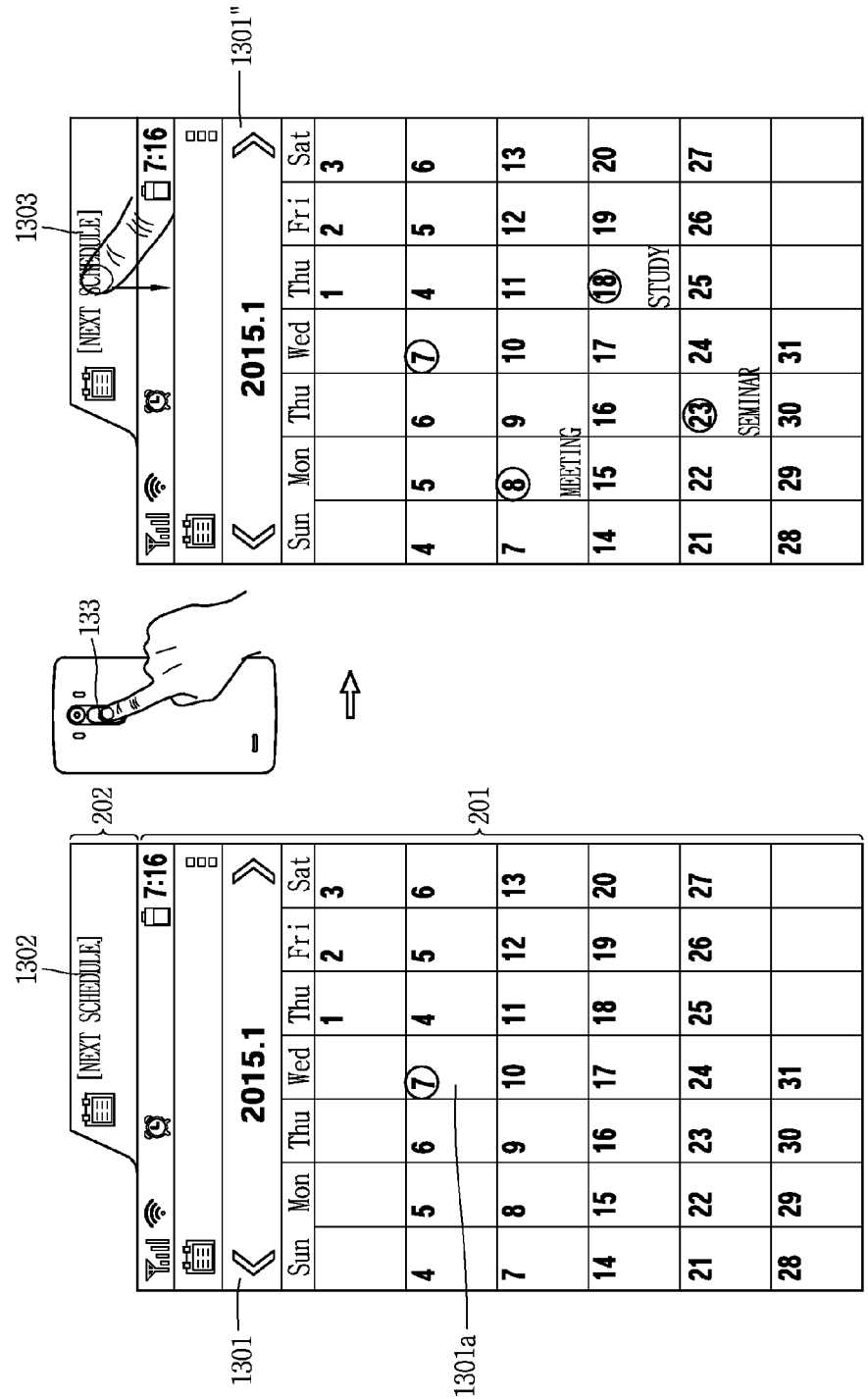

For instance, when the calendar image 1301 corresponding to execution of a calendar application is output to the first region 201, as shown in FIG. 13A, detailed schedule information 1302 corresponding to information 1301a which is displayed on the calendar image 1301 is displayed on the second region 202. Thereafter, when a fingerprint input is applied to the rear input unit 133, the controller 180 can output secret schedule information 1303 to the second region 202. In this instance, when a touch applied to the secret schedule information 1303 is dragged to the calendar image 1301, the controller 180 can display pre-stored secret schedule information on a corresponding date region of the calendar image 1301. When a predetermined time has passed or the fingerprint input applied to the rear input unit 133 is released, the secret schedule which has been displayed on the calendar image 1301" is disappeared.

Figure 13B:
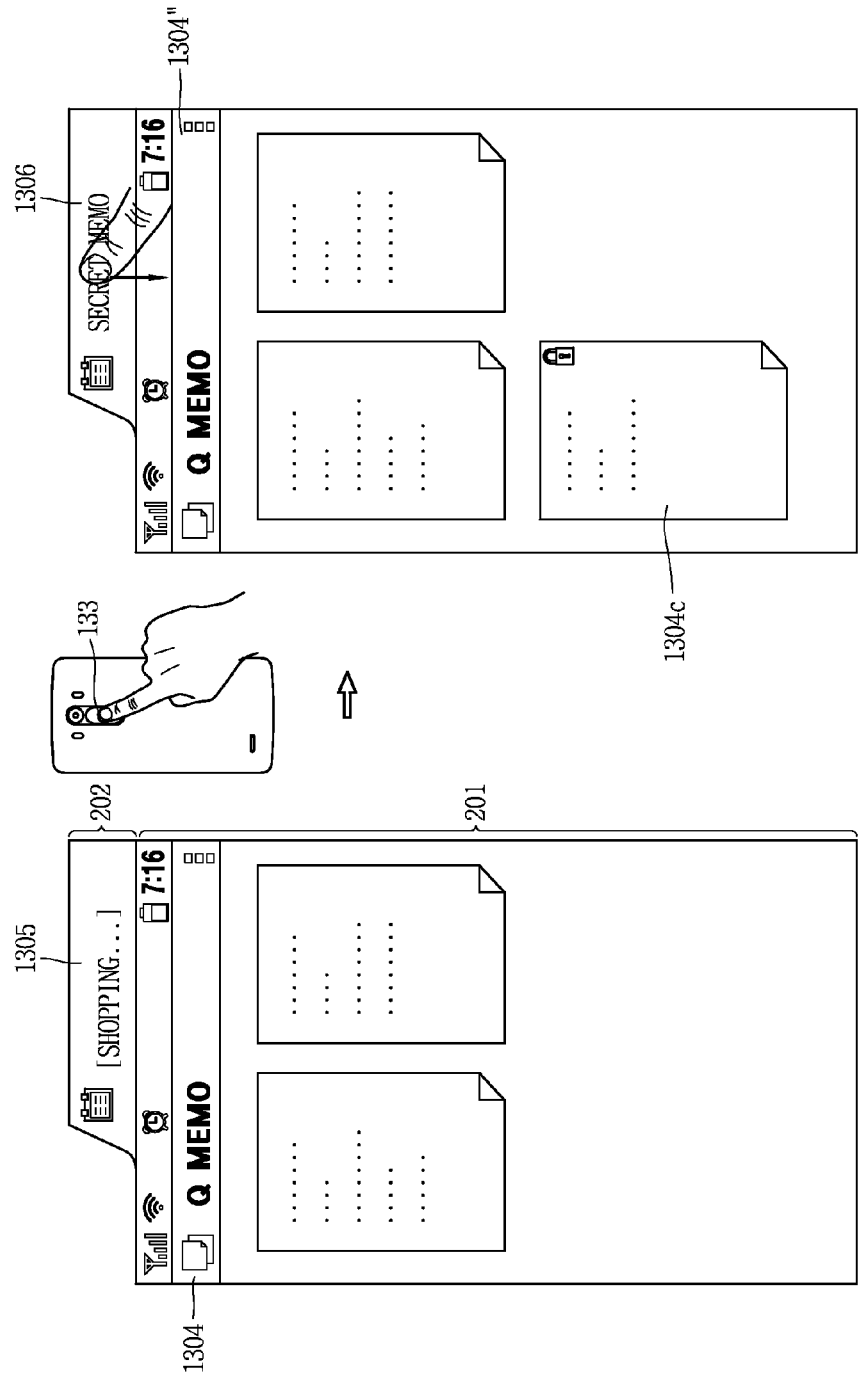

FIG. 13B shows that specific memo content 1305 is displayed on the second region 202 when the memo screen 1304 corresponding to execution of a memo application is output to the first region 201. In this instance, when a fingerprint input is sensed at the rear input region 133, information 1306 indicating that secret memo exists, is displayed on the second region 202. When a touch is applied to the second region 202, the controller 180 can display content of the secret memo corresponding to the second region 202, and when the touch is dragged to the memo screen 1304 of the first region 201, additionally display the secret memo 1304c to the memo screen 1304.

Figure 13C:
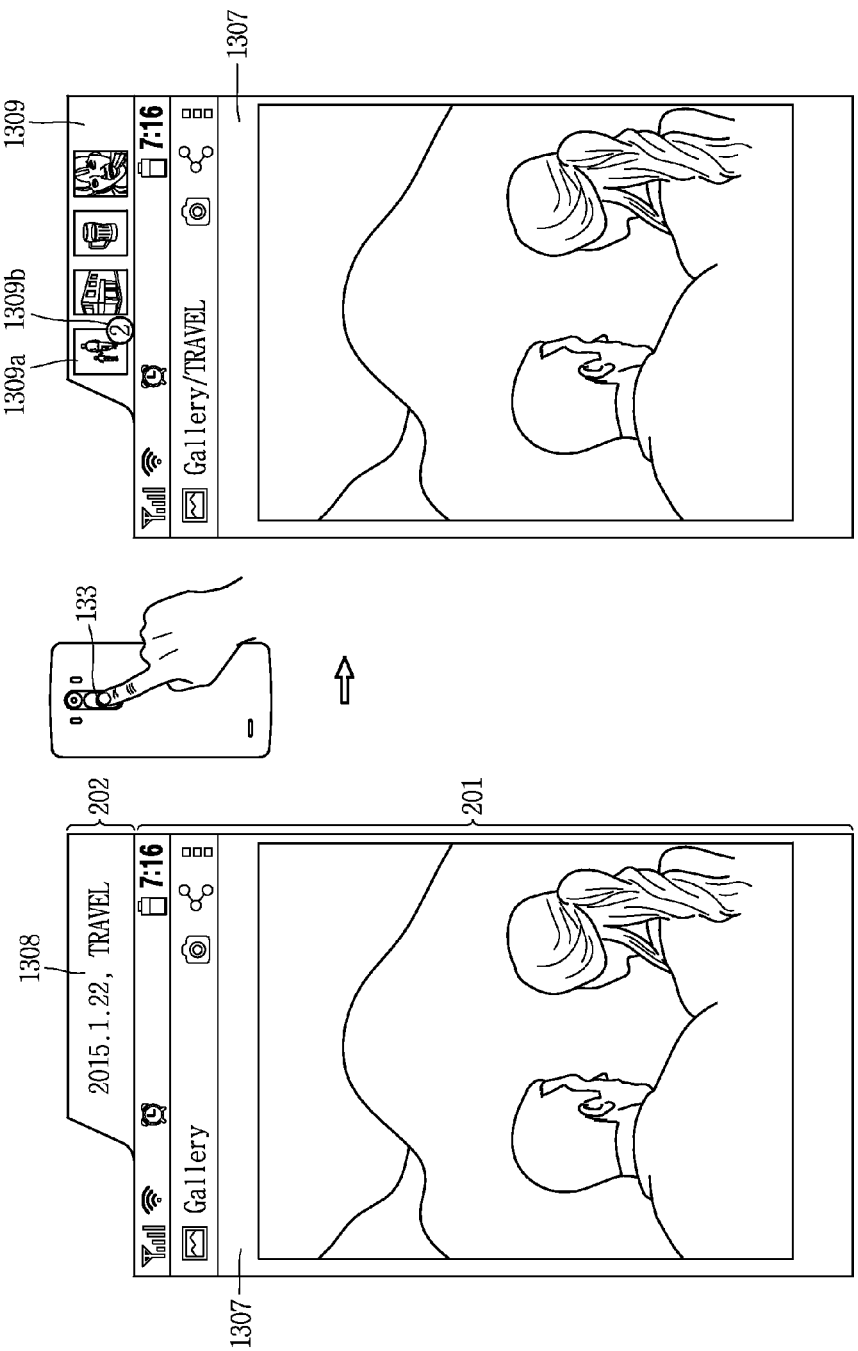

FIG. 13C shows that information 1308 related to a corresponding photograph image 1307, for instance, captured/stored time, title, stored folder, and the like are displayed on the second region 202 when a photograph image 1307 corresponding to execution of a gallery application is displayed on the first region 201. In this instance, when a fingerprint input is sensed at the rear input unit 133, thumbnails 1309 of the lock-set photograph image are displayed on the second region 202. On the thumbnail 1309a, an object 1309b indicating the number of transmissions of the corresponding photograph image may be closely displayed. When a touch applied to a specific thumbnail 1309a is dragged to the first region 201, the controller 180 can convert the photograph image 1307 into an image corresponding to a specific thumbnail 1309a or synthesize and display the photograph image 1307.

Figure 13D:
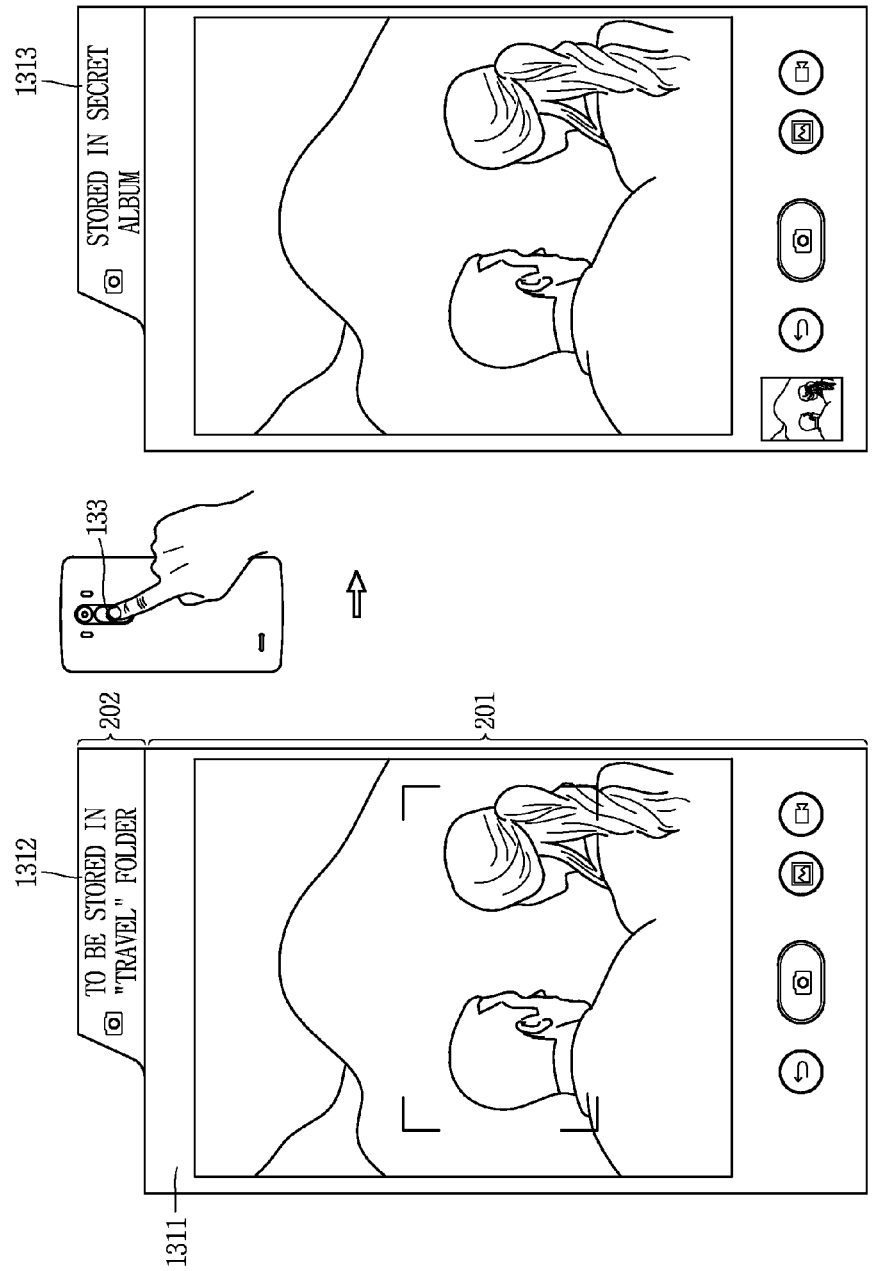

FIG. 13D shows that information 1312 guiding a position (for instance, 'travel' folder) where a capturing image 1311 is stored corresponding to execution of a camera application, is displayed on the second region 202 when a capturing image 1311 corresponding to execution of a camera application is displayed on the first region 201. In this instance, when a fingerprint input is applied to the rear input unit 133, the controller 180 can convert a position where the capturing image 1311 is stored into a lock-set region (for instance, secret album), and thereafter output text information indicating the conversion to the second region 202. Meanwhile, when the fingerprint input applied to the rear input unit 133 is released while the capturing image 1311 is stored, or a drag touch input or a flicking touch input in a preset direction (for instance, upper direction) is applied to the second region 202, a storage command to the lock-set region is cancelled, and the capturing image 1311 is stored at a position to be previously stored ('tour' folder).

FIG. 13E shows that contact list information 1315 that is frequently dialed is displayed on the second region 202 when a dial screen 1314 corresponding to execution of a phone application is displayed on the first region 201. In this instance, when a touch is applied to the contact list information 1315, the corresponding contact list 1315 is input to the first region 201, and when a touch is applied to a dialing icon included in the contact list information 1315, a call connection is executed to the corresponding contact list information 1315. When a fingerprint input is applied to the rear input unit 133 when frequently-called contact list information 1315 is output to the second region 202, additional information view menu 1316 of the other party corresponding to the corresponding contact list information 1315 is displayed on the second region 202. When a touch is applied to the additional information view menu 1316, the controller 180 can popup a list 1317 of records (for instance, reception/transmission information, SNS information, message information, and the like) stored in a terminal related to the other party (for instance, Tom), on the first region 201. A user can select a specific item of the list 1317 and quickly access a specific record related to Tom.

Figure 13F:
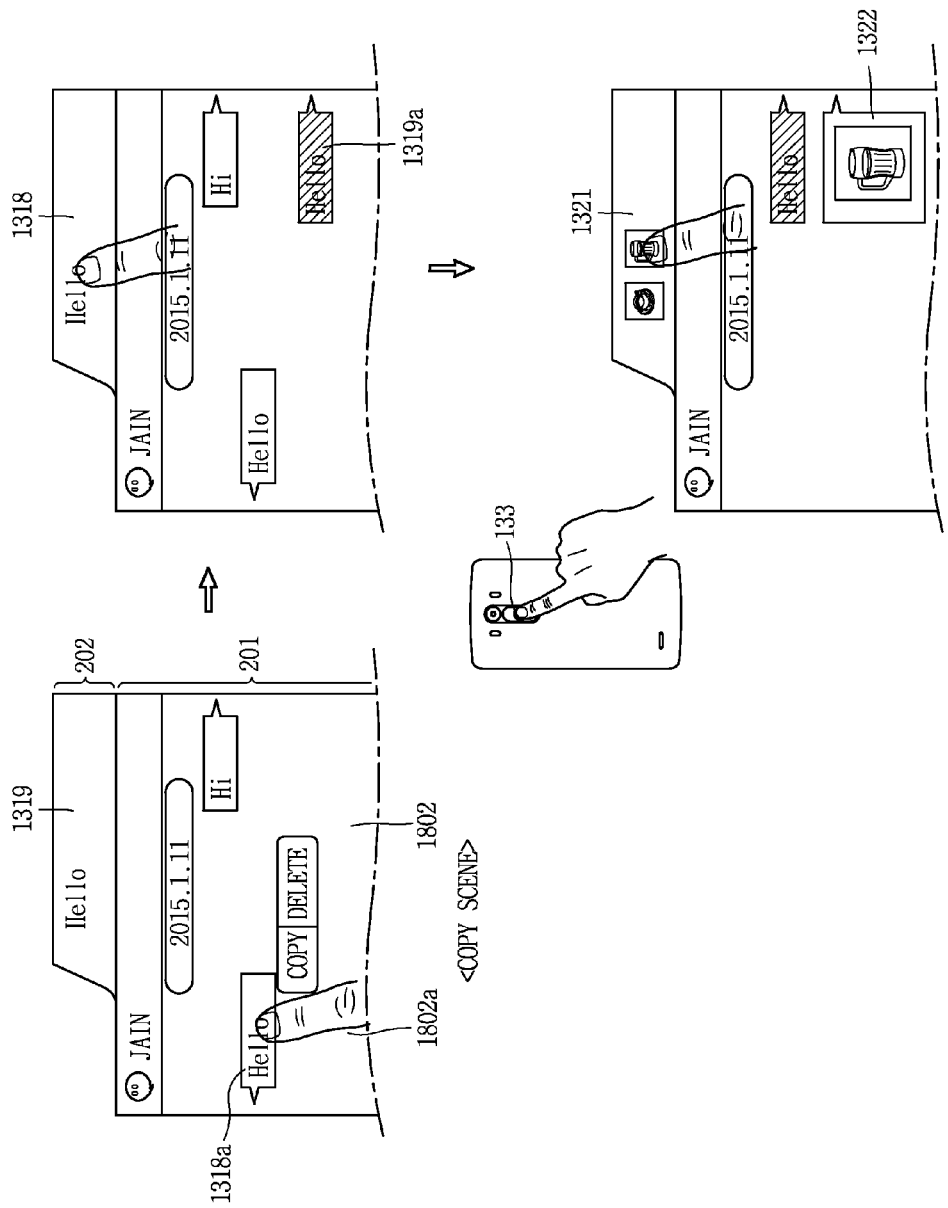

FIG. 13F shows that copied content (for instance, 'Hello') (1319) is displayed on the second region 202 when a message screen corresponding to execution of a message application is output to the first region 201 and a specific message (for instance, 'Hello') (1318a) is copied. That is, the second region 202 is used as a clipboard region. In such an instance, though the message screen output to the first region 201 is changed or converted into an execution screen of other applications, the content 1319 which has previously been copied is continuously displayed. In this instance, when the displayed content 1319 is touched, the content 1319 is pasted and displayed on an input position (for instance, a region where the cursor is displayed) of the first region 201, or transmitted to the other party's terminal and displayed (1319a). When the copied contents is formed in plurality, copied other contents can be selected by applying a drag touch input or flicking in left or right direction to the second region 202.

Meanwhile, when a fingerprint input is applied to the rear input unit 133 while the second region 202 is used as a clipboard region, the controller 180 can output lock-set content 1321 to the second region 202. When one of the displayed contents is touched, the controller 180 can paste the selected content to an input position (for instance, a position where the cursor is displayed) of the first input region 201, or directly transit it to the other party's terminal. When the paste or transmission is completed, the result is displayed on the second region 202, and the previously output screen information, for instance, status information of the terminal may be output to the second region 202.

Figure 14B:
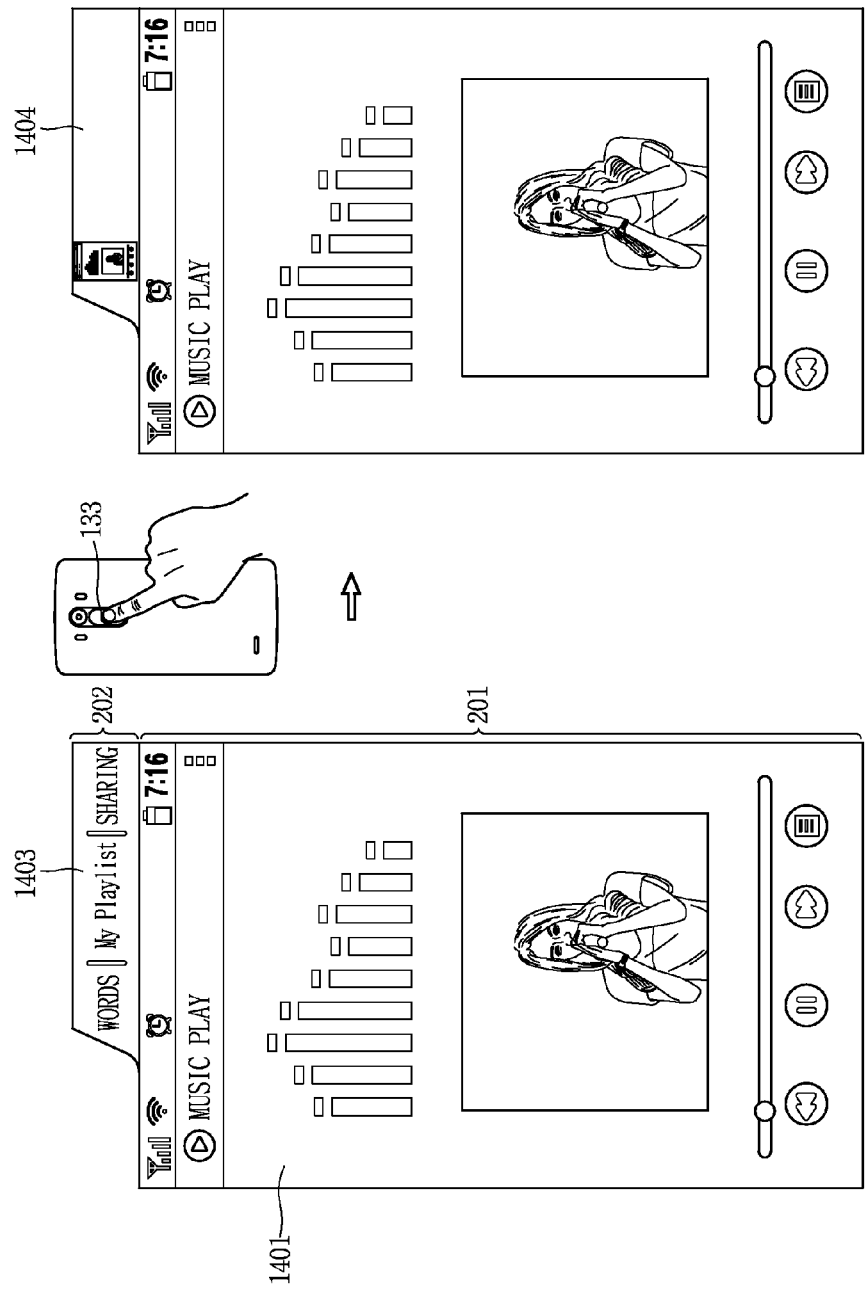

FIGS. 14A and 14B show examples of a method to control information displayed on the second region 202 through various types of touch with respect to the rear input unit 133. According to an embodiment of the present invention, when both the first and second regions are activated, interest information set by a user can be displayed on the second region 202, while screen information corresponding to execution of at least one application is displayed on the first region 201 in an entire window mode. In this instance, when an event is generated from at least one application, the controller 180 outputs information indicating the event or a notification icon to the second region 202 so that screen information displayed on the first region 201 may not be blocked.

Meanwhile, when a downward drag input or flicking is applied to the rear input unit 133 when interest information set by a user, for instance, news information (1402) is displayed, the controller 180 can convert the news information (1402) output to the second region 202 into App concierge information (for instance, a words view menu, a list view menu and sharing) (1403) corresponding to a screen of a sound source being played, the screen displayed on the first region 201. Here, the App concierge information may include all information supportable at an execution screen of a corresponding application, or guiding a frequently-executed function or providing a path for accessing to the function.

In this instance, when an upward drag input is applied to the rear input unit 133 or a predetermined time has elapsed, the controller 180 can convert the App concierge information being output to the second region 202 into the news information 1402.

When a long touch input is applied to the rear input unit 133 when interest information set by a user or App concierge information is displayed on the second region 202, as shown in FIG. 14B, the controller 180 can execute a frequently-used function, for instance, a capture function. Thus, it is possible to display a thumbnail (1404) of a captured image, after capturing the entire screen information displayed on the first region 201. In this instance, the captured image is automatically stored in a preset region (for instance, a region corresponding to a secret mode). When the storage is completed, the thumbnail (1404) displayed on the second region 202 disappears and then the interest information set by a user or the App concierge information is re-displayed.

Figure 15A:
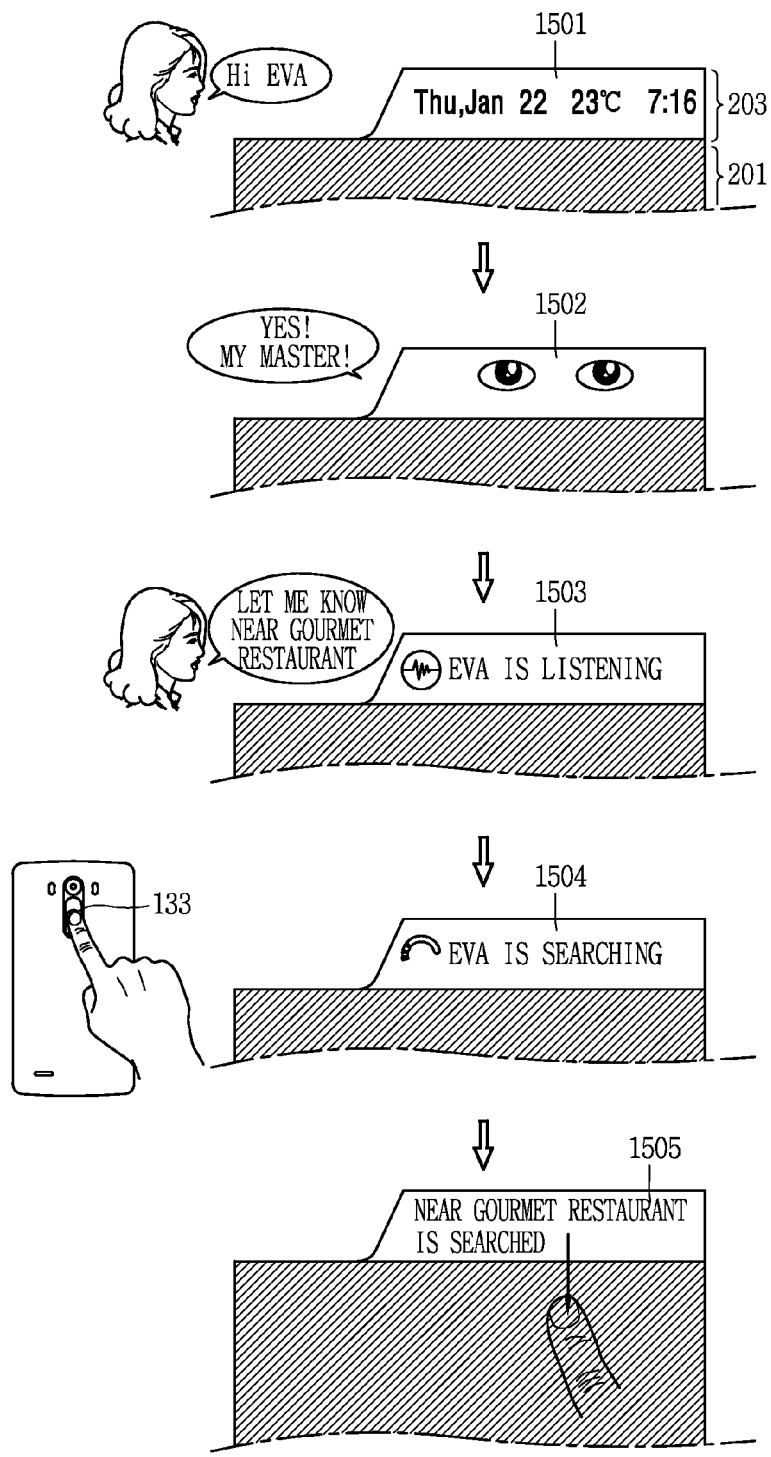

FIGS. 15A through 15C show examples to display feedback information corresponding to a user's voice input and feedback information corresponding to an information search result output to the first region 201 on the second region 202. As described hereinabove, the controller 180 can maintain an active state of a voice recognition function for recognizing a user's voice input, even when both the first region 201 and the second region 202 of the display unit 200 are inactivated.

When a voice command (for instance, 'Hi, EVA') for activating only the second region 202 is received, the controller 180 can recognize the voice command and convert only the second region 202 into an active state, while maintaining the first region 201 in an inactive state. As a result, as shown in FIG. 15A, when a voice command is input, a voice (for instance, 'Yes, my master') informing activation of the second region 202 can be output, and a preset animation (for instance, an eye opening animation) (1502) can be displayed on the second region 202.

Under the state, when a voice command (for instance, 'let us know nearby gourmet restaurants') requesting information search is received through the microphone 122, the controller 180 can output feedback information corresponding to the second region 202, for instance, a text (1503) such as 'EVA is listening', during recognition of the input voice command. When the recognition of the input voice command is completed, the controller 180 can execute an information search corresponding to the recognized voice command by executing a web application, and output feedback information corresponding to the second region 202, for instance, a text (1504) such as 'EVA is searching', during the information search. In this instance, though not shown, when information requesting a user's acceptance, such as a current position of the terminal, is required for the information search, a message requesting input of a user's fingerprint to the rear input unit 133 may be output to the second region 202.

When the information search is completed, feedback information (1505) informing that desired information search is completed is output to the second region 202. Thereafter, a drag input toward the first region 201 is applied to the feedback information (1505) or the feedback information (1505) is output, and when a predetermined time has lapsed, the search result is displayed on the second region 202.

Further, as shown in FIG. 15B, according to an embodiment of the present invention, it is possible to quickly access a specific web page through a voice command. For instance, when a voice command, 'Show me G-mail' is input through the microphone 122, corresponding feedback information (1503) is output to the second region 202 while the controller 180 recognizes the input voice command and a corresponding web page screen is displayed on the first region 201. In this instance, when a log-in is required on the corresponding webpage screen or other account information exists, feedback information with respect thereto, for instance, guide information (1507) such as, 'Please execute fingerprint recognition to see log-in information', or 'Please execute fingerprint recognition to see all accounts' can be output to the second region 202.

When such guide information (1507) is output and a fingerprint input is applied to the rear input unit 133, the controller 180 can output a webpage screen corresponding to all accounts to the first region 201 and display the execution result on the second region 202. Meanwhile, when a fingerprint recognition sensor is provided in the second region 202, it is possible to apply a fingerprint input to a portion where the guide information (1507) is displayed, rather than the rear input unit 133.

Meanwhile, when a voice command requesting information search is received, the controller 180 can extend a desired information search range, using the fingerprint input to the rear input unit 133. For instance, as shown in FIG. 15C, when a voice command requesting information search such as 'Find out Jackson' is input, the controller 180 searches information corresponding to the input voice command by executing a web application, and displays a search result on the first region 201. In this instance, on the second region 202, a guide message for extending an information search range, for instance, a text (1512) such as 'Please execute fingerprint recognition to see internal search results of the terminal' can be displayed. Accordingly, when a fingerprint input is applied to the rear input unit 133, the controller 180 further executes information search corresponding to the input voice command with reference to information stored in the terminal body. As a result, a first search result (1512a) according to an execution of the web application and a second search result (1512b) according to a search for internal information of the terminal may be distinguishably displayed on the first region 201.

Hereinafter, referring to FIGS. 16A and 16B, a method to change information output to the first region 201 and the second region 202 based on different types of touch input, will be described. Specifically, FIG. 16A and FIG. 16B show examples that information to be output becomes different according to a one-finger based touch input and a multi-finger based touch input.

First, when a one-finger based drag input is applied from the first region 201 to the second region 202 when an execution screen of at least one application, for instance, a stock information screen (1601) is output to the first region 201 and the second region 202 is in an inactive state, the controller 180 can output an icon of a function which is executable on the screen displayed on the first region 201, or an icon of a related application, to the second region 202.

Figure 16A:
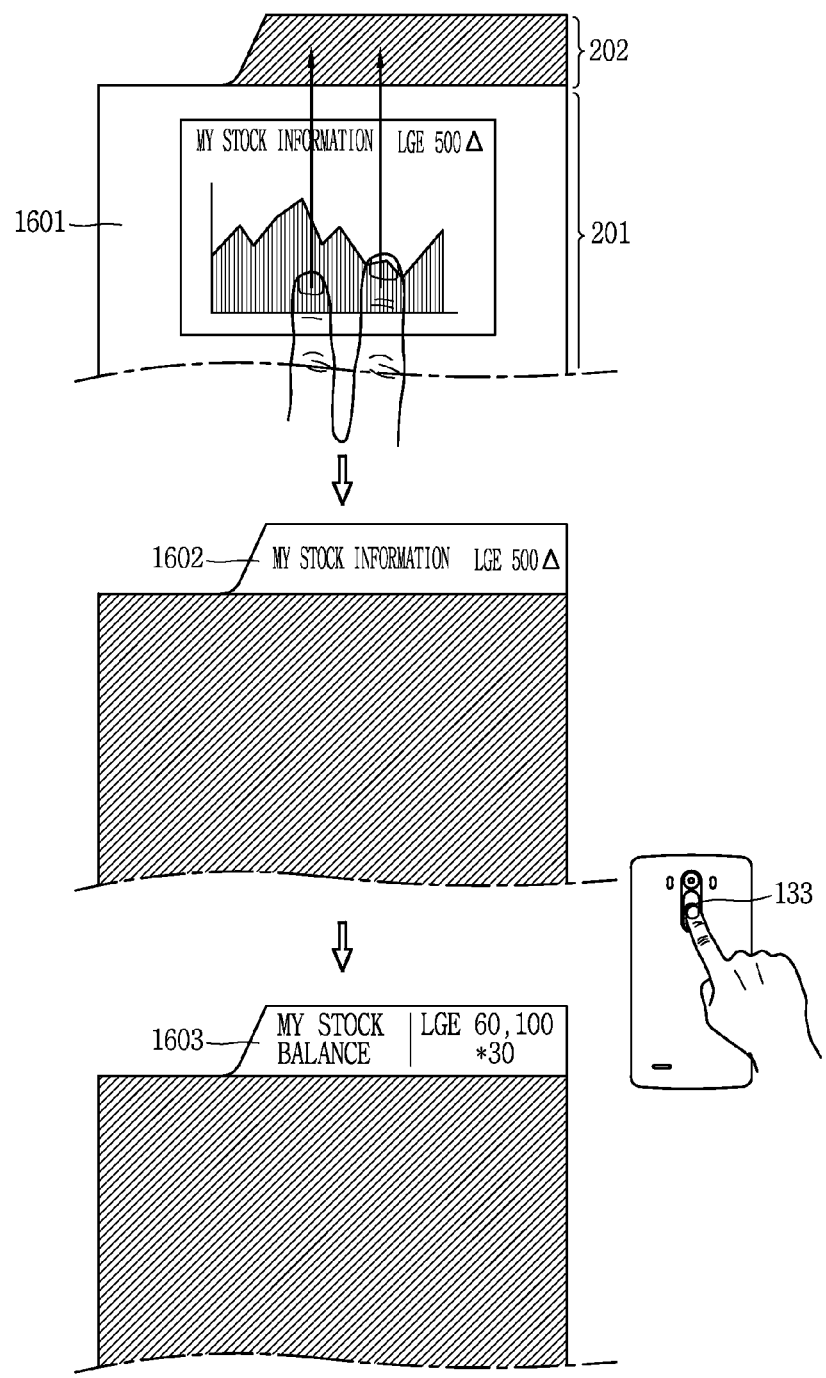
FIGS. 16A and 16B are views illustrating a method to change information to be output to a display unit, based on different types of touch inputs in a mobile terminal according to an embodiment of the present invention.

Meanwhile, as shown in FIG. 16A, when a two-finger based drag input is applied from the first region 201 to the second region 202, screen information output to the first region 201 is moved to the second region 202. In this instance, considering that the screen becomes smaller, summary information (1602) of the screen information which has been output to the first region 201 can be displayed on the second region 202, and the first region 201 may be converted into an inactive state with consideration of power consumption. That is, a user can see information that has been output to a large screen, on a small screen. In such a state, when a fingerprint input is sensed at the rear input unit 133, secret information related to the summary information (1602), for instance, the stock balance information (1603) can be output to the second region 202, while an inactive state of the first region 201 is maintained.

Figure 16B:
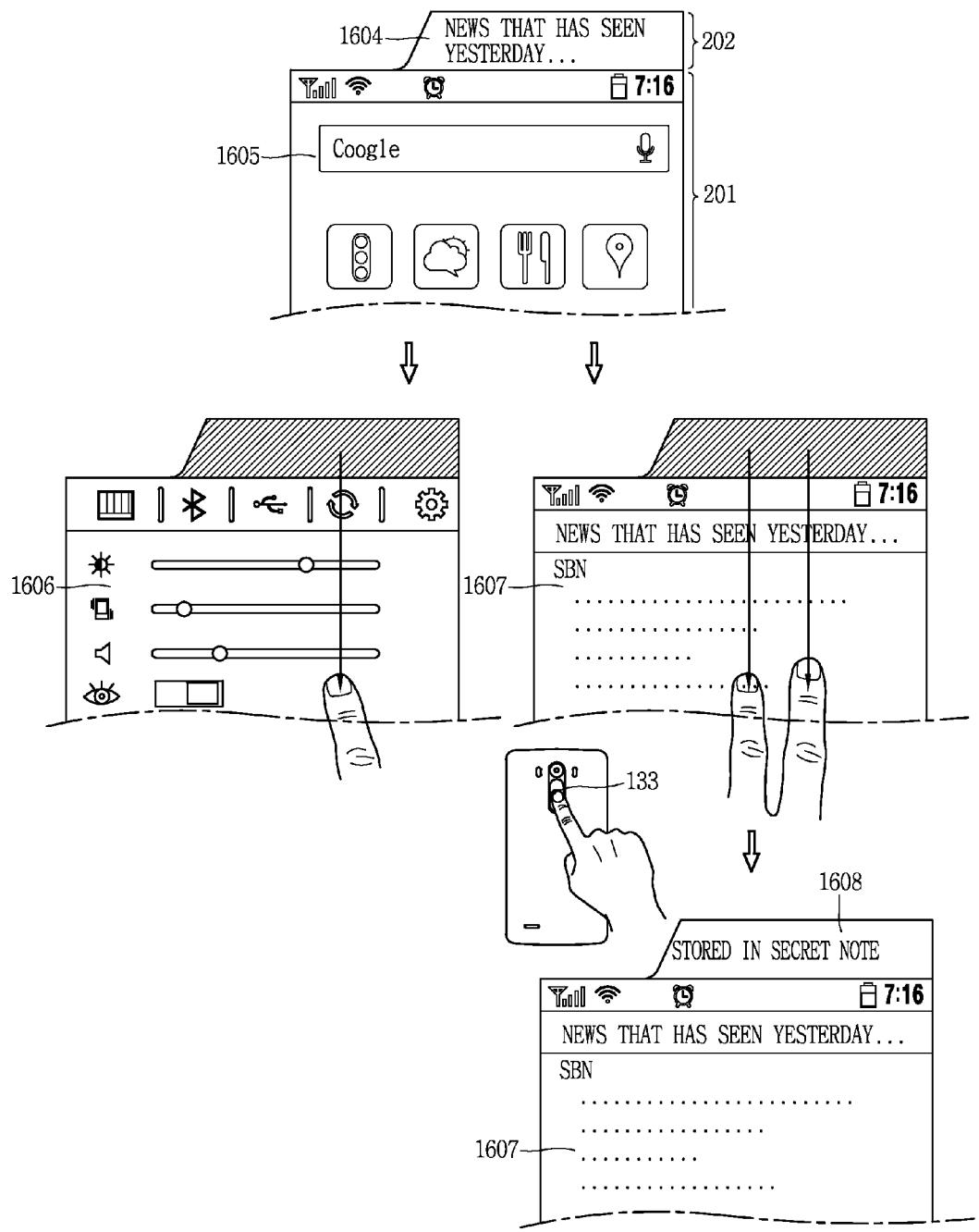

As an alternative example, FIG. 16B illustrates an example that a drag input toward the first region 201 from the second region 202 is applied, on the contrary to FIG. 16A, when both the first region 201 and the second region 202 are in an active state and interest information set by a user, for instance, news information (1604) which has been viewed yesterday is displayed on the second region 202.

In FIG. 16B, when a one-finger based drag input is applied from the second region 202 to the first region 201, the controller 180 can control a Notification Bar (1606) in which status information of the terminal and information of a received event are displayed to gradually move down along the drag, instead of a webpage (1605) output to the first region 201. Meanwhile, when a two-finger based drag input is applied from the second region 202 to the first region 201, the controller 180 can display the interest information which has been output to the second region 202, that is, the news information (1604) which has been viewed yesterday, on the first region 201. In this instance, considering that the screen is extended, more information (1607) than screen information that has been output to the second region 202 can be displayed on the first region 201.

Meanwhile, under such a state, when a fingerprint input or a long touch input is applied to the rear input unit 133, the screen information (1607) which has been output to the first region 201 is captured and stored in a specific region (for instance, a secret note). In this instance, feedback information (1608) indicating that the captured image is stored can be output to the second region 202. In addition, it is possible to provide information related to a next expected motion or function using the second region 202 while an execution screen of at least one application is output to the first region 201.

Figure 17:
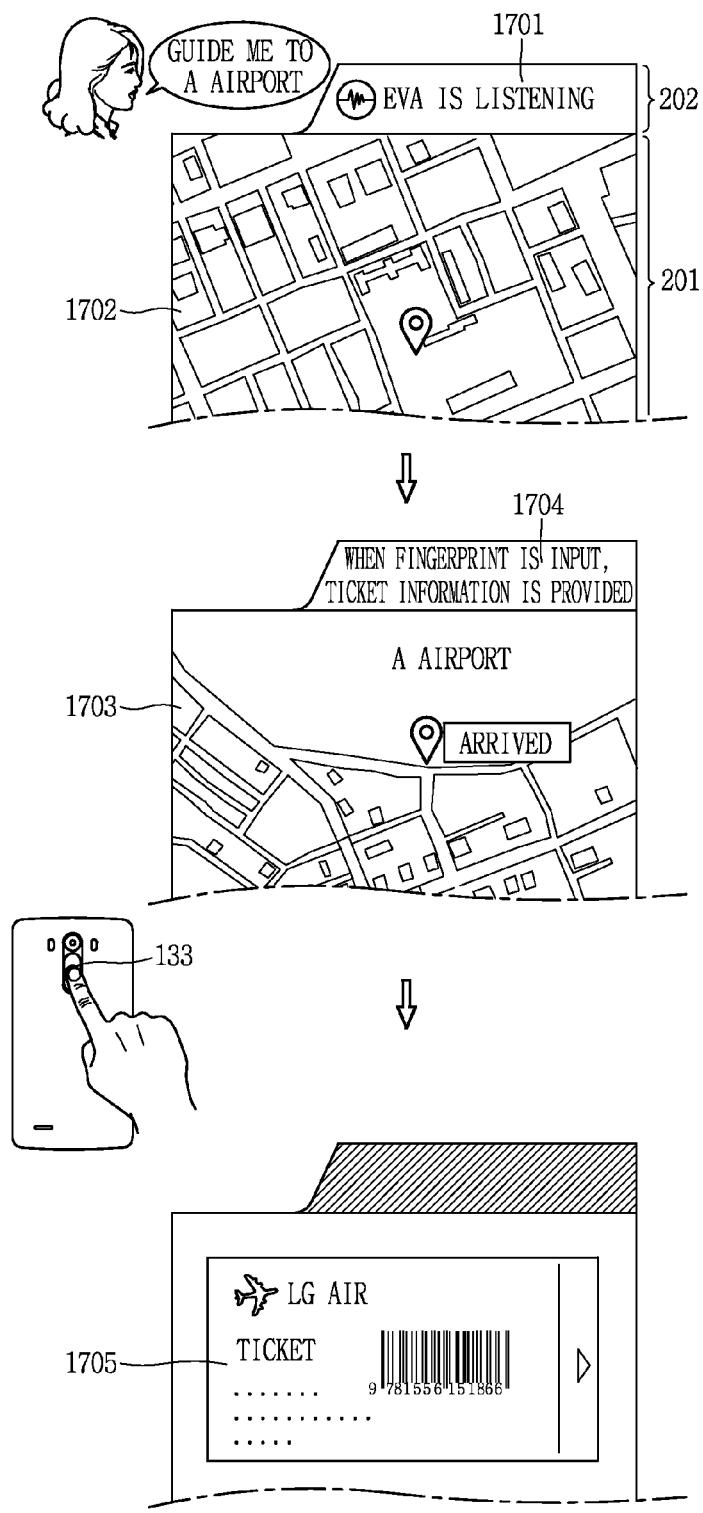

In this regard, FIGS. 17, 18, 19A and 19B show examples of a method to output information guiding a next executable motion to the second region 202, based on screen information output to the first region 201. In FIG. 17, when a map screen (1702) corresponding to execution of a navigation application is displayed according to a user's voice command, and when the user arrives at a destination (for instance, 'An airport') according to a route guide using the map screen (1702), it is possible to output useful information (for instance, a message informing that on-line ticket information exists) related to a user's next executable motion to the second region 202. In this instance, when the useful information requires a user authentication, as shown in FIG. 17, information guiding an additional motion for confirming the useful information, for instance, a text (1704) such as 'when your fingerprint is input, ticket information is provided' can be popped up on the display unit. As a result, when a fingerprint input is applied to the rear input unit 133, an on-line ticket (1705) stored in the terminal may be output to the first region 201.

Figure 18:
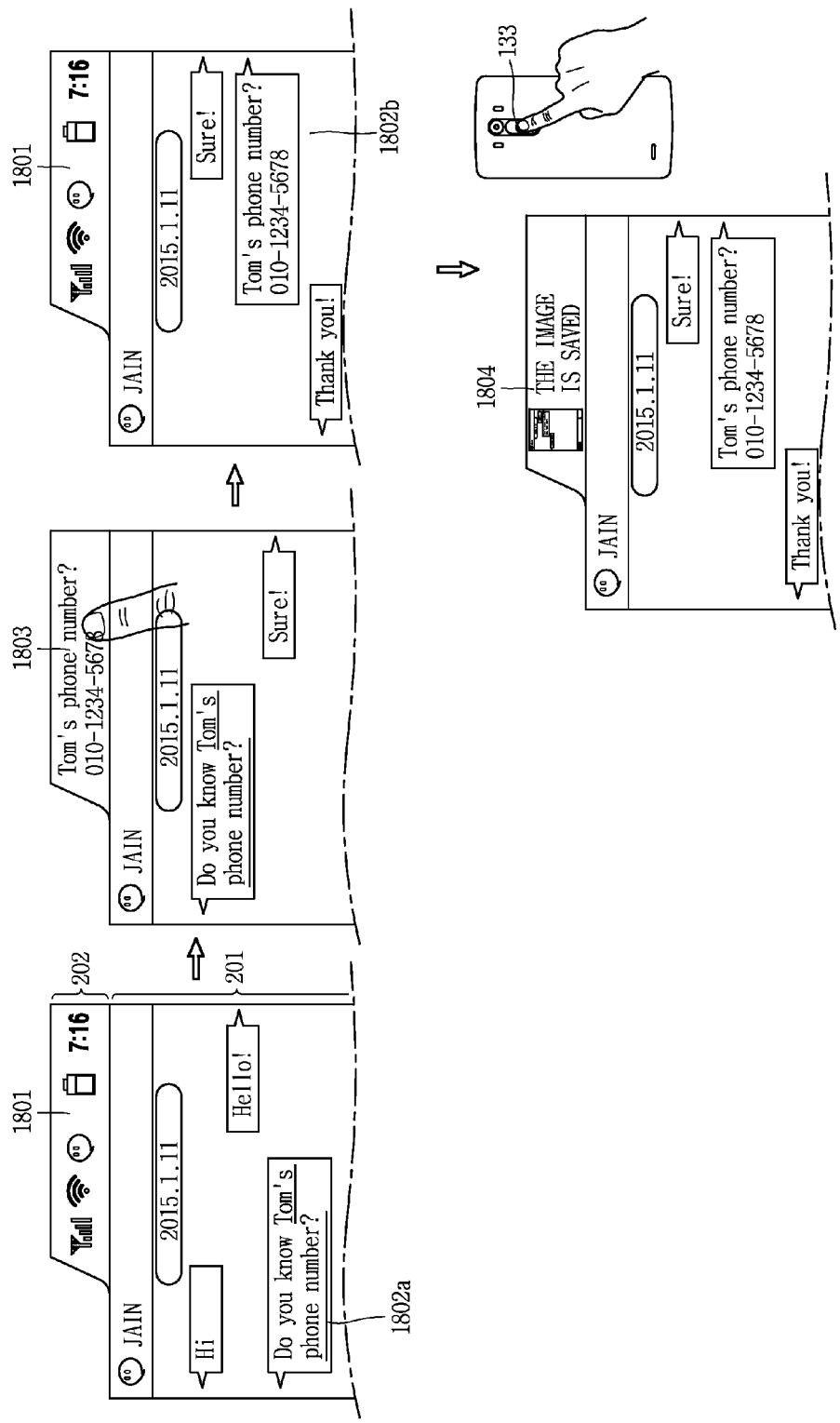

As another example, referring to FIG. 18, when a message screen corresponding to execution of a message application is output to the first region 201, the controller 180 can output an expectable reply or information to be referred to the second region 202 by analyzing content of a received message when the message received from the other party's terminal satisfies with a preset specified condition (for instance, an interrogative sentence). For instance, when a message such as 'Do you know Tom's phone number?' is received, the controller 180 can draft and output an expected reply message (1803), for instance, 'Tom's phone number? 010-1234-5678' to the second region 202, when Tom's contact list information is searched from the user's terminal. When the expected reply message (1803) is selected by a touch input, the selected expected reply message (1803) is transmitted to the other party's terminal and displayed on a transmission result message screen (1802b).

As a further example, as shown in FIG. 19A, when a sound source screen (1902) being played is displayed on the first region 201, information on the next song to be played may be pre-output to the second region 202. In this instance, when left and right drag inputs are applied to the second region 202, information (1902) on the next (or, previous) song can be displayed on the second region 202. When a touch is applied when desired sound source is displayed on the second region 202, the controller 180 can change the currently played sound source into a sound source corresponding to information (1902) displayed on the second region 202. Then, information (1904) of the song to be next played to the sound screen (1903) being played on the first region 201 can be displayed on the second region 202.

Meanwhile, when a specific object, for instance, singer's name information (1902a) is selected on the sound source screen (1902) being played, the controller 180 can output a sound source list (1911) of songs sung by the corresponding singer to the first region 201. As such, when the sound source screen (1902) of the first region 201 is converted into the sound source list (1911) of a specific singer, information (1912) of the next played song in the play list among the sound sources sung by the corresponding singer may be output to the second region 202. When a touch is applied to the information (1912) displayed on the second region 202, the controller 180 can jump to a sound source corresponding to the selected information (1912) and execute a play (back) operation. According to this, even when the reproducing list is very long, it is possible to quickly jump to a desired sound source without executing drag several times.

Figure 20:
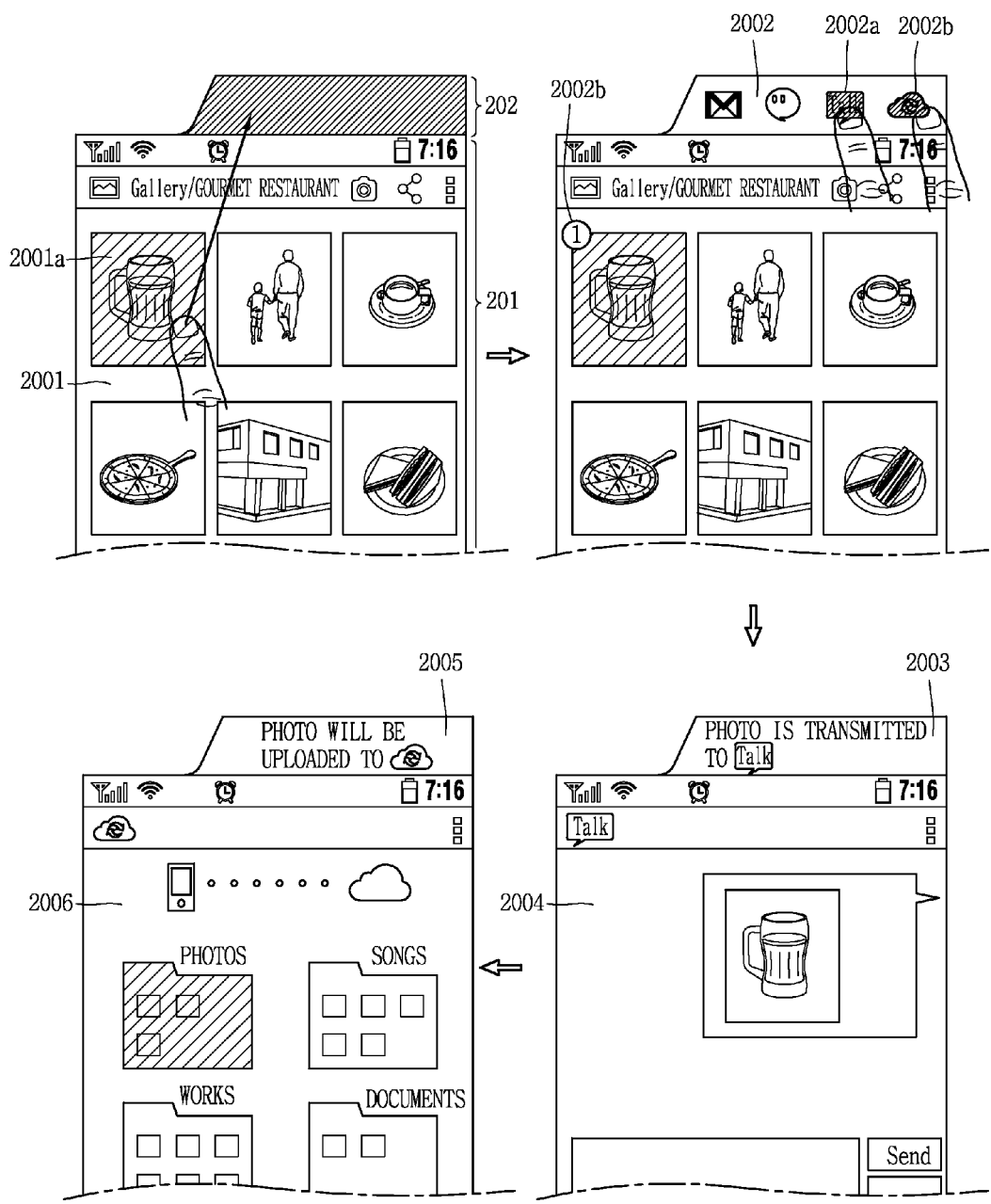
FIGS. 20 through 23 are views illustrating various examples of functions which are executable by using part of a display unit in a mobile terminal according to an embodiment of the present invention.

FIGS. 20 through 23 show various examples of useful functions which are executable using the second region 202. In FIG. 20, there is shown an example of a function to sequentially execute a plurality of desired tasking by an input only one time with respect to the second region 202. In one example, when a specific object is selected from the screen information displayed on the first region 201 and the selected object is dragged to the second region 202, the controller 180 can display an icon of at least one application for executing a function related to the selected object to the second region 202. For instance, when a photo image (2001a) selected from the first region 201 is dragged to the second region 202, icons (2002) of an application for executing a sharing function of the selected photo image (2002a) are displayed on the second region 202.

When at least one icon is selected from the second region 202, the controller 180 displays an execution screen of an application corresponding to the selected icon on the first region 201. In this instance, an execution result of a function (for instance, sharing function) related to the selected object is displayed on the execution screen of the application displayed on the first region 201.

Specifically, a user may select a plurality of icons, for instance, an icon (2002a) of an SNS application and an icon (2002b) of a cloud application, using a touch input. Then, the selected photo image (2001a) is shared at the corresponding applications, according to order that the plurality of icons (2002a and 2002b) are selected. That is, the controller 180 transmits the photo image (2001a) to a terminal of the other party who is on a current chat screen corresponding to the SNS application, and when the transmission is completed, uploads the photo image (2001a) to a server corresponding to the cloud application. The transmission and result of the upload of the selected photo image (2001a) are sequentially displayed (2004, 2006) on the first region 201, and information guiding a function being executed is displayed on the second region 202 in the corresponding order (2003, 2005).

Figure 21:
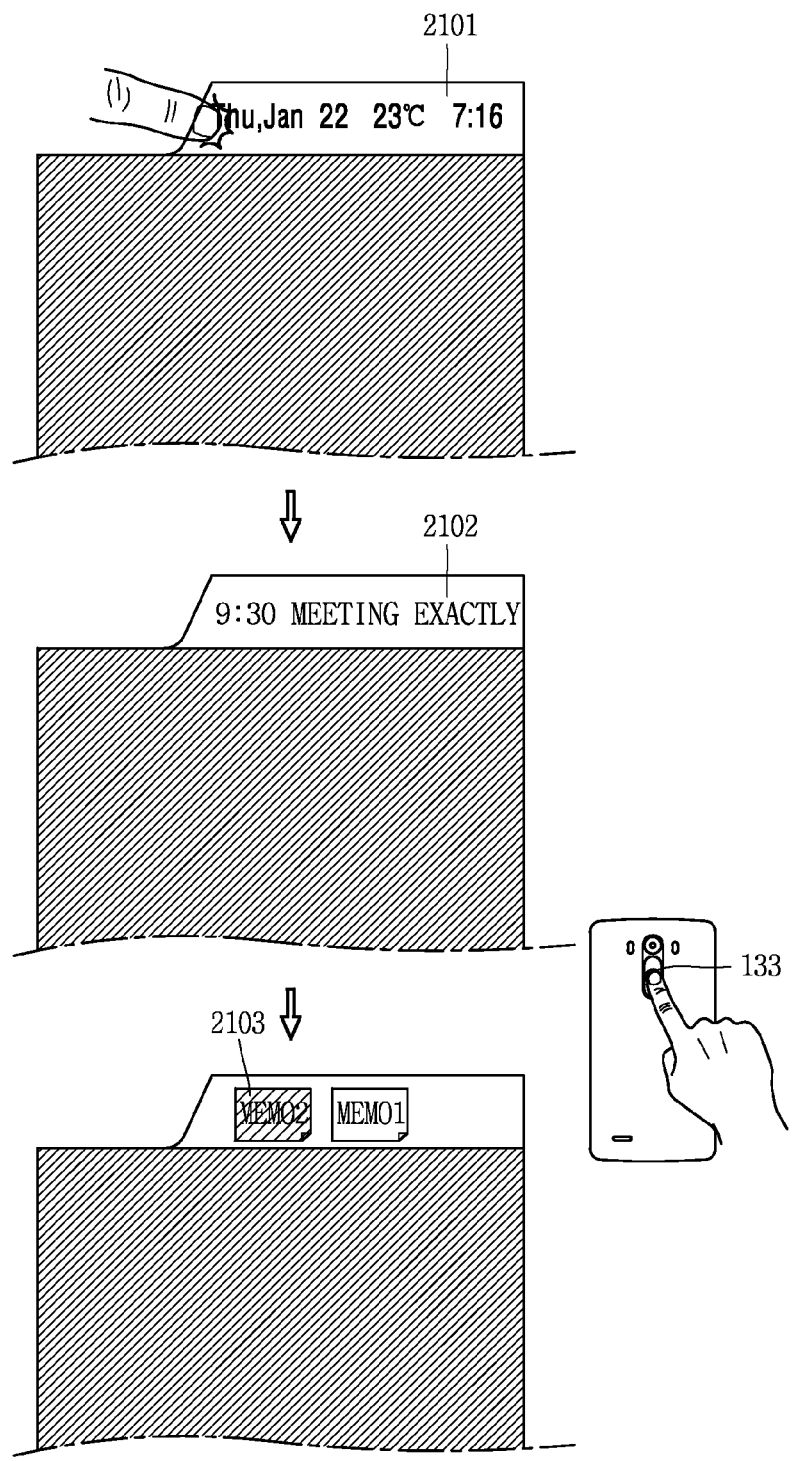

As another example, FIG. 21 shows an example of a post-it function of a memo recorded in the second region 202. When a plurality of taps are applied to the second region 202 in an inactivated state of the second region 202, the controller 180 can convert basic information (2101) (for instance, date, weather, time information, and the like) of the terminal displayed on the second region 202 into an input screen on which a user can write. When the input screen is output, a user may record a memo on the input screen using a touch object (for instance, a user's finger or a stylus pen). When a fingerprint input is applied to the rear input unit 133 when a memo (2102) recorded on the second region 202 is displayed, the controller 180 can store the recorded memo (2102) and convert it into a memo image (2103) such as a post-it, and output it to the second region 202. When a touch is applied to the output memo image (2103), the corresponding memo (2102) is displayed on the second region 202.

Figure 22:
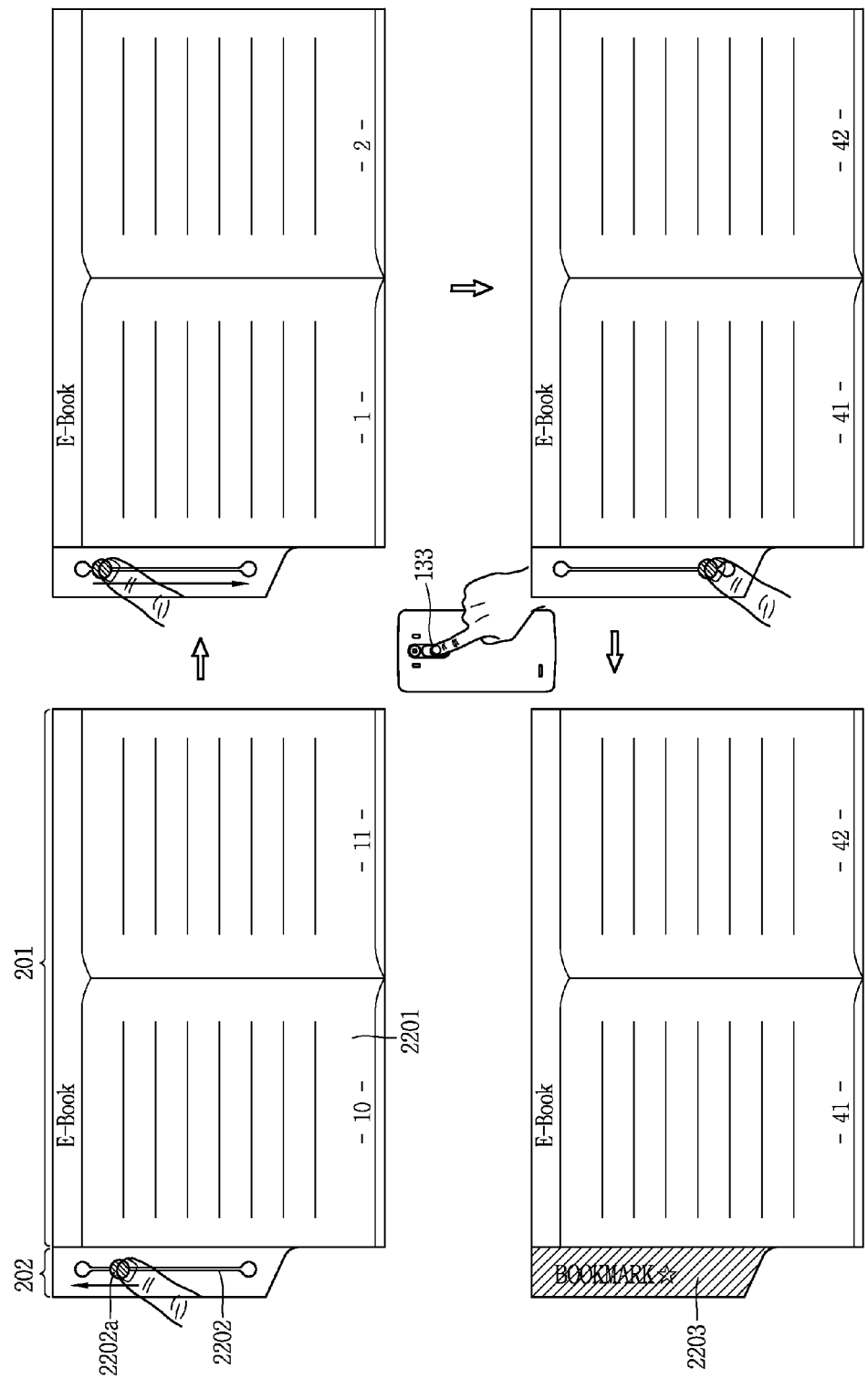

As a still another example, FIG. 22 shows an example of a menu function that the second region 202 selects a page displayed on the first region 201. When content including a plurality of pages, for instance, an e-book is output to the first region 201, and the terminal is used in a horizontal mode, a menu bar (2202) for controlling pages to be displayed on the first region 201 may be output to the second region 202. A user can control pages being output to the first region 201 by moving vertically a graphic object displayed on the menu bar 2202. Meanwhile, when a long touch input is applied to the rear input unit 133 when a specific page is displayed on the first region 201, a book mark function is executed, feedback information indicating that is output to the second region 202, and after a while the menu bar (2202) is re-output to the second region 202. Meanwhile, a user can immediately move to a bookmarked page by applying a plurality of taps to the second region 202.

Figure 23:
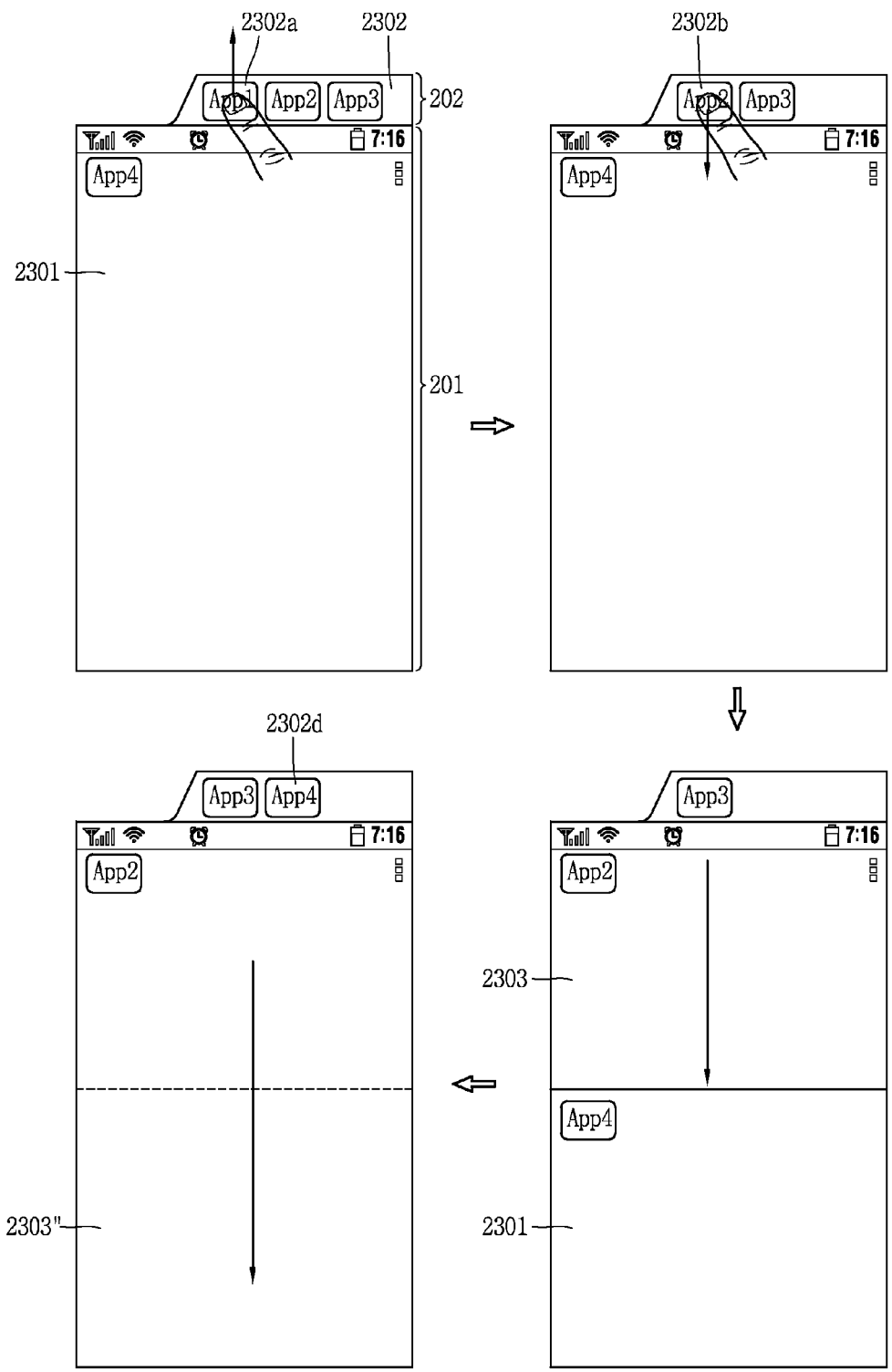

FIG. 23 shows an example that the second region 202 helps a multitasking function of an application being executed at a background of the first region 201. As shown, icons (2302) of applications being executed at the background of the first region 201 may be output to the second region 202 while an execution screen (2301) of a fourth application is output to the first region 201. In this instance, an upward flicking is applied to a displayed specific icon (for instance, an icon of a first application) (2302a), the first application is terminated, and the corresponding icon (2302a) disappears from the second region 202. Meanwhile, when another icon (for instance, an icon of a second application) (2302b) is dragged toward the first region 201, the controller 180 controls an execution screen (2303) corresponding to the selected icon (2302b) to be displayed, while blocking at least part of the execution screen (2301) previously displayed. In this instance, when the drag is continuously performed to a lower end of the first region 201, the execution screen (2301) of the fourth application disappears and an execution screen (2303") is output to the first region 201 as a full screen. And an icon (2302d) of the fourth application is added to the second region 202.

Figure 24B:
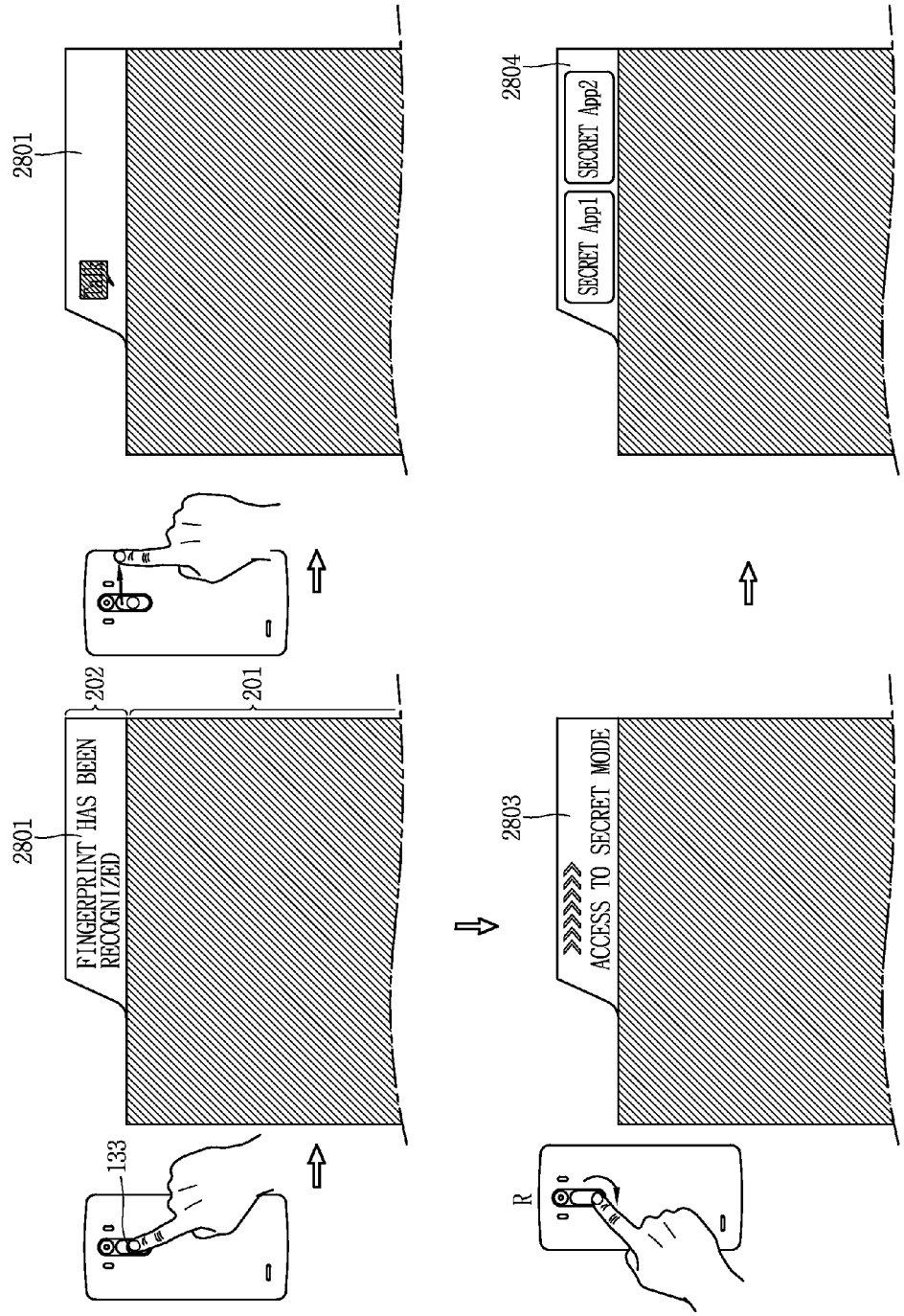

FIGS. 24A and 24B are views illustrating a method to output different information to the second region 202 according to a type, a position, an input method, and the like of a fingerprint sensed at the rear input unit 133 in the mobile terminal according to one embodiment of the present invention. According to an embodiment of the present invention, the controller 180 can control information to be differently output to the second region 202 according to various types of fingerprint inputs applied to the rear input unit 133.

As an example, referring to FIG. 24, when a fingerprint input of a thumb is sensed at the rear input unit 133, the controller 180 can output secret information (2402) corresponding to execution of a first secret mode relevant to the sensed fingerprint of the thumb to the second region 202. Alternatively, when a fingerprint input of a forefinger is sensed at the rear input unit 133, the controller 180 can output secret information (2403) corresponding to execution of a second secret mode relevant to the sensed fingerprint of the forefinger to the second region 202.

As another example, referring to FIG. 24B, when a fingerprint input sensed at the rear input unit 133 is released after lapse of a first time (for instance, 1 second), the controller 180 can output information of a 'low security level', for instance, an icon (2801) of a first type application to the second region 202. Meanwhile, when a fingerprint input sensed at the rear input unit 133 is released after lapse of a second time (for instance, 3 seconds), or when a rotation input is sensed at the rear input unit 133 after lapse of the first time, the controller 180 can sequentially output a message (2803) indicating access to a secret mode and information of a 'high security level', for instance, an icon (2804) of a second type application set as a secret mode, to the second region 202.

Hereinbelow, referring to FIGS. 25A through 25E, a new method of a transmission between the mobile terminal 100 and an external terminal 300 using a touch input to the second region 202 will be described. Here, it will be described in a condition that the mobile terminal 100 is paired with at least one external terminal 300 via a near distance communication network, such as Bluetooth.

Figure 25A:
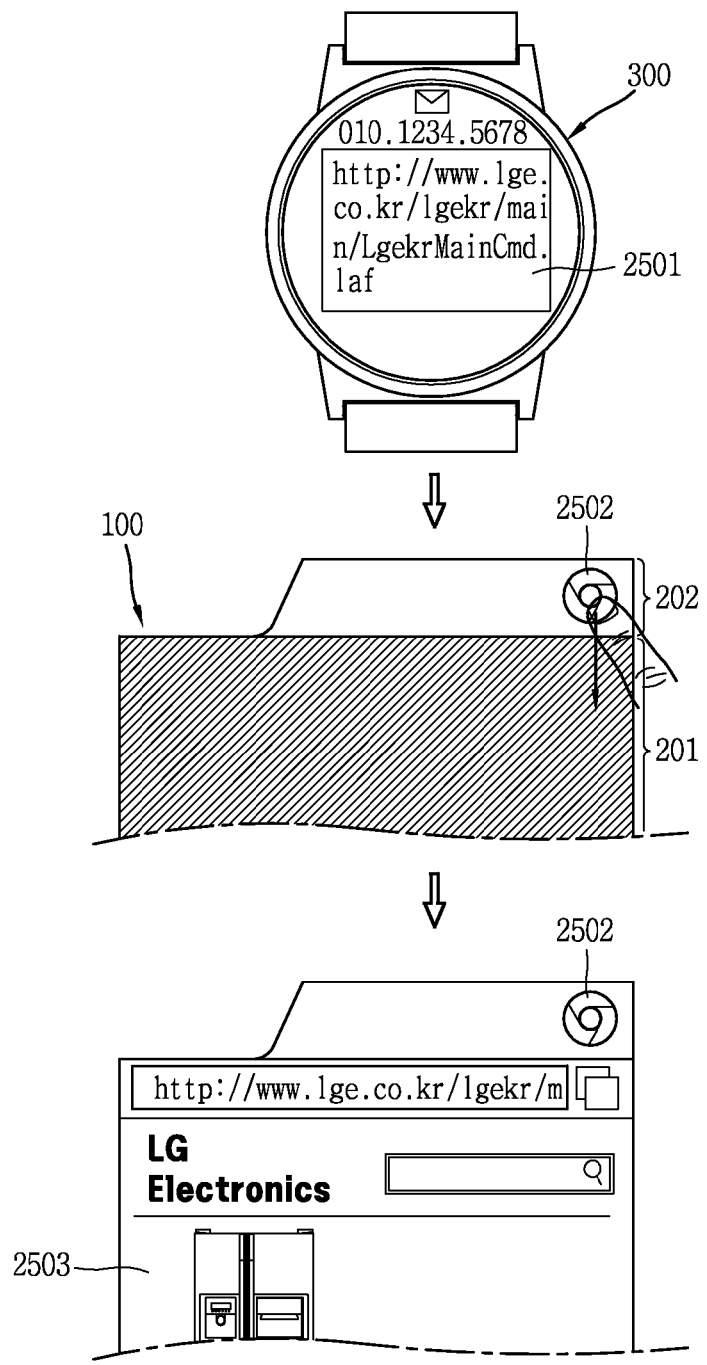
FIGS. 25A through 25E are views illustrating a method to communicate with an external interworked terminal, using a touch input to part of a display unit in a mobile terminal according to an embodiment of the present invention.

When the mobile terminal 100 according to one embodiment of the present invention is connected to at least one external terminal 300, the second region 200 may be used as an input region to transmit a specific control command between both terminals. Specifically, as shown in FIG. 25A, when link address information (2501) is displayed on an external terminal which is connected to the mobile terminal 100, for instance, a watch-type terminal 300, a user may wish to view the displayed information through the mobile terminal 100 because of a small-sized screen of the watch-type terminal 300. In this instance, when the link address information (2501) is displayed on the watch-type terminal 300, the controller 180 can recognize it and output a corresponding icon (2502) to the second region 202. When a touch applied to the output icon (2502) (including the link address information) is dragged to the first region 201, the controller 180 can display a webpage (2503) corresponding to the link address information (2501) on the first region 201. As a result, the user can quickly confirm desired information through a large-sized screen, rather than a small-sized screen of the terminal.

Figure 25B:
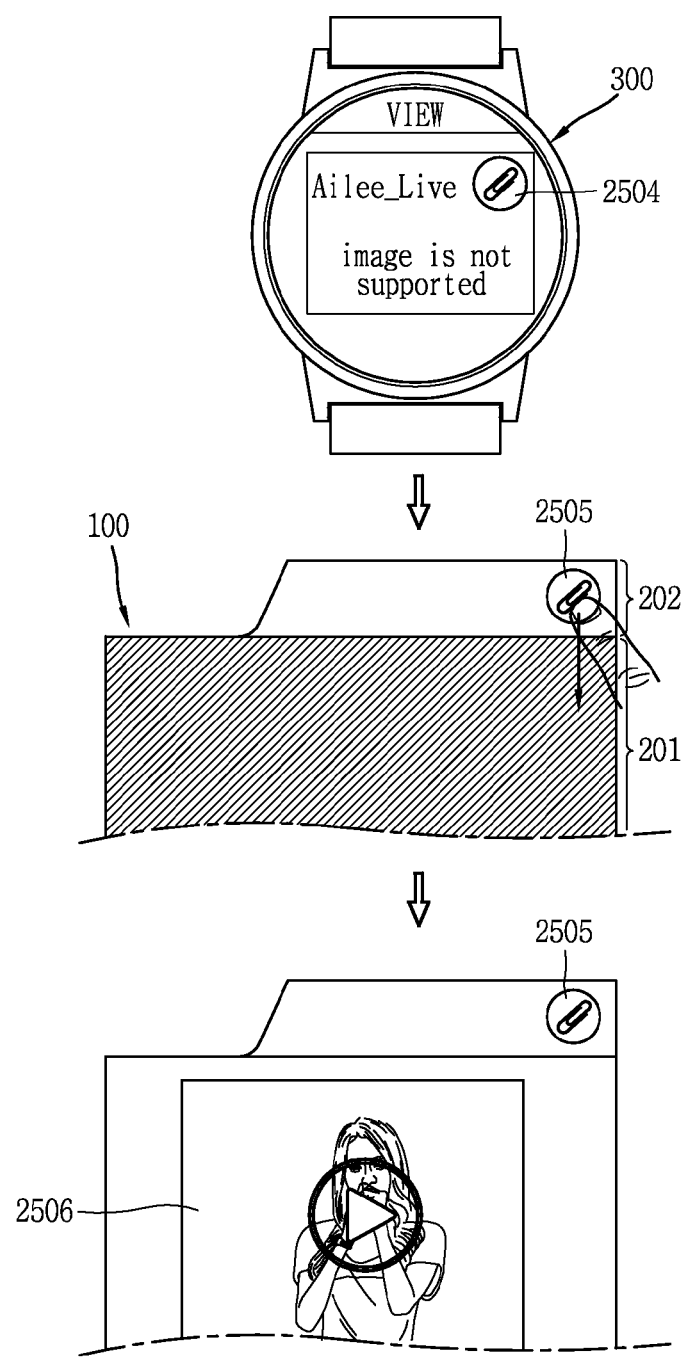

As another example, as shown in FIG. 25B, when the watch-type terminal 300 includes an attached file and the size of the attached file is large, it is possible to check content of the file through the mobile terminal, considering battery consumption or the amount of data used. That is, when the watch-type terminal 300 includes an attached file image (2504), the controller 180 can recognize it and display on the second region 202 in the form of an icon (2505). When a touch applied to the output icon (2505) is dragged to the first region 201, the controller 180 can open the attached file, that is, a video and play it on the first region 201.

Figure 25C:
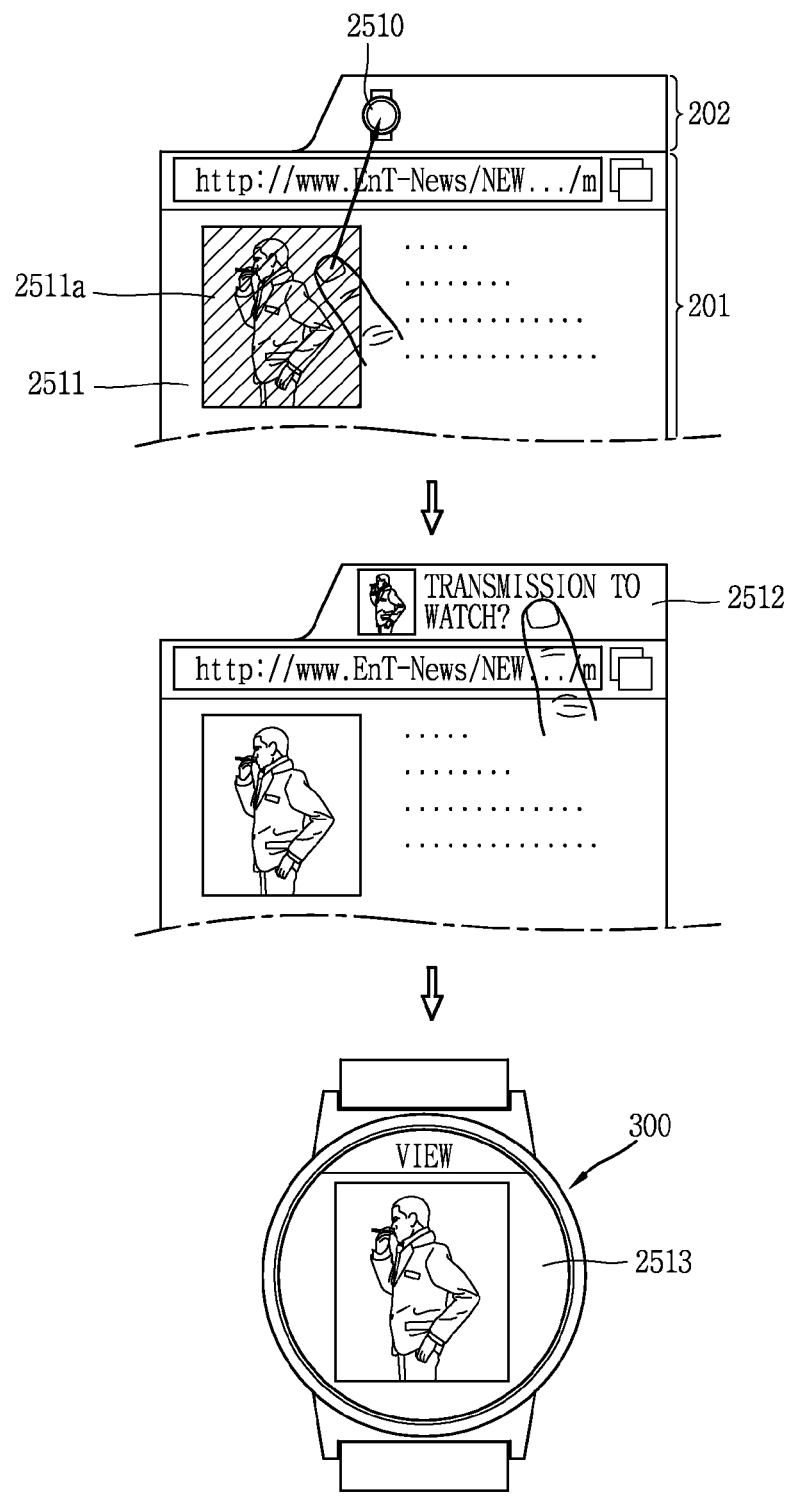

FIG. 25C shows an example of a method to easily transmit information displayed on the mobile terminal 100 to a watch-type terminal 300 connected thereto. When an object to be transmitted, for instance, a specific image (2511a) is selected at the first region 201 and the selected specific image (2511a) is dragged to the second region 202 or from the second region 202 to the watch image (2510), a message (2512) to check whether to transmit the selected specific image (2511a) to the watch-type terminal 300 is output to the second region 202. When the output message (2512) is touched, the corresponding image (2511a) is immediately output to the screen of the watch-type terminal 300.

Figure 25D:
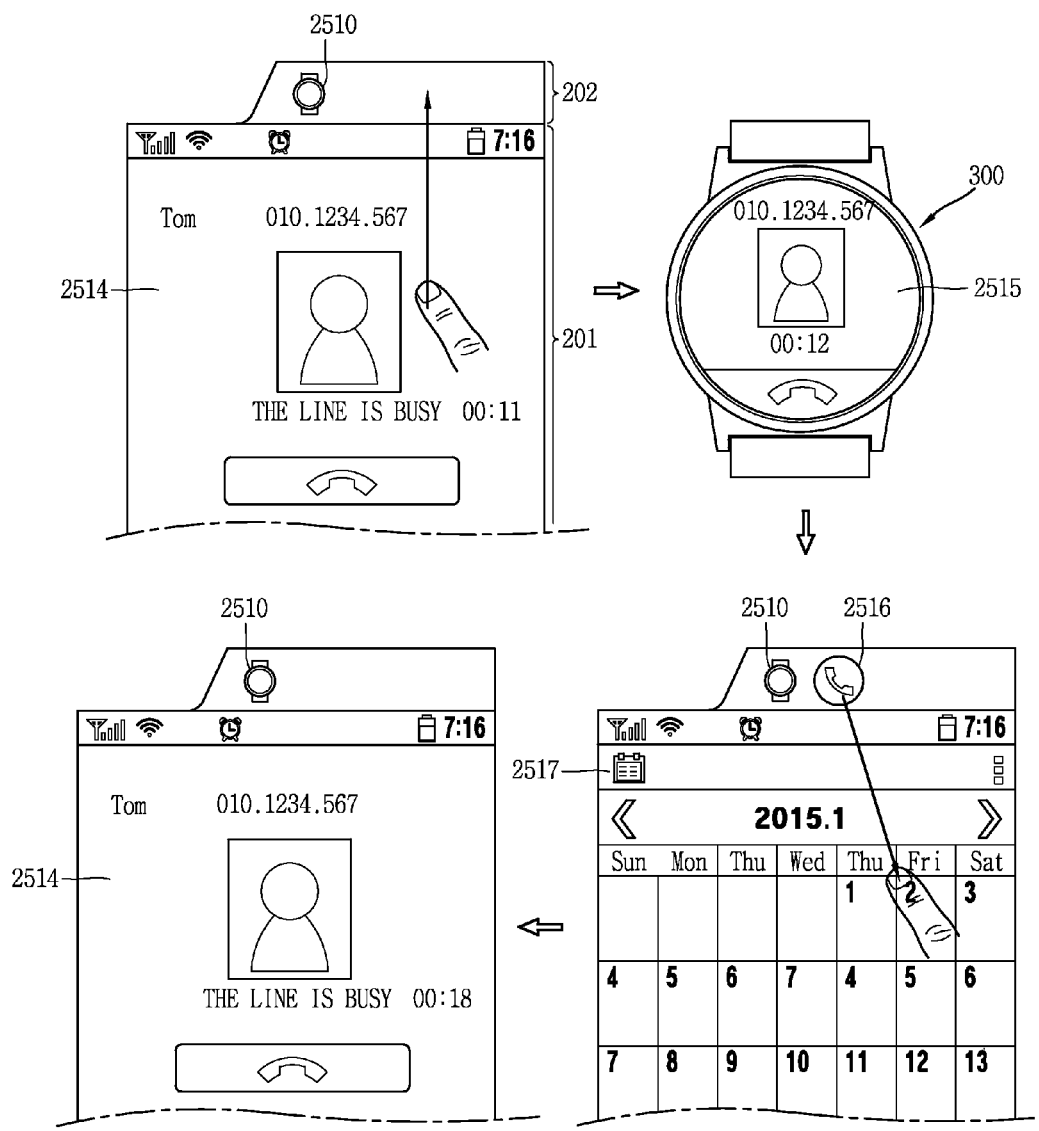

As another example, FIG. 25D shows a method to easily transfer a call from one of the mobile terminal 100 and the watch-type terminal 300 to another using a touch input to the second region 202. As shown, when a touch applied to a call screen (2514) is dragged up to the second region 202 while a call is executed through the mobile terminal 100, the call is transferred to the watch-type terminal 300, and an image (2516) indicating that a call is being executed at the watch-type terminal 300, is displayed on the second region 202. In this instance, when the corresponding image (2516) is dragged to the first region 201, the call being executed at the watch-type terminal 300 is retransferred to the mobile terminal 100.

Figure 25E:
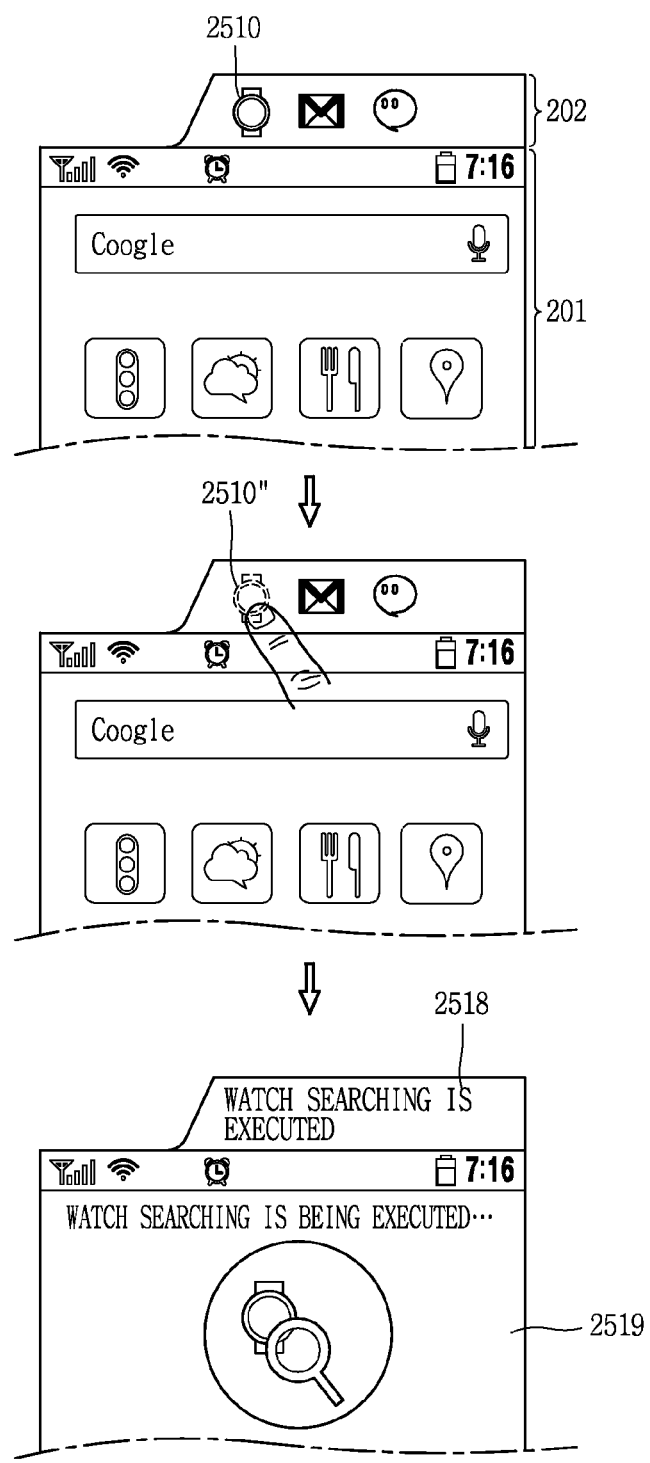

FIG. 25E shows an example to search a disconnected watch-type terminal using the second region 202. While the watch-type terminal 300 is connected, a watch image (2510) can be displayed in a dark color on the second region 202. In such a case, when a connection to the watch-type terminal 300 is released or has low intensity, the watch image (2510) is displayed in a dotted line and then faded out (2510"). In this instance, when a touch is applied to the corresponding image (2510") before the faded-out watch image (2510") completely disappears, the controller 180 can execute a watch-searching function and output feedback information (2518) indicating that to the second region 202.

Figure 26:
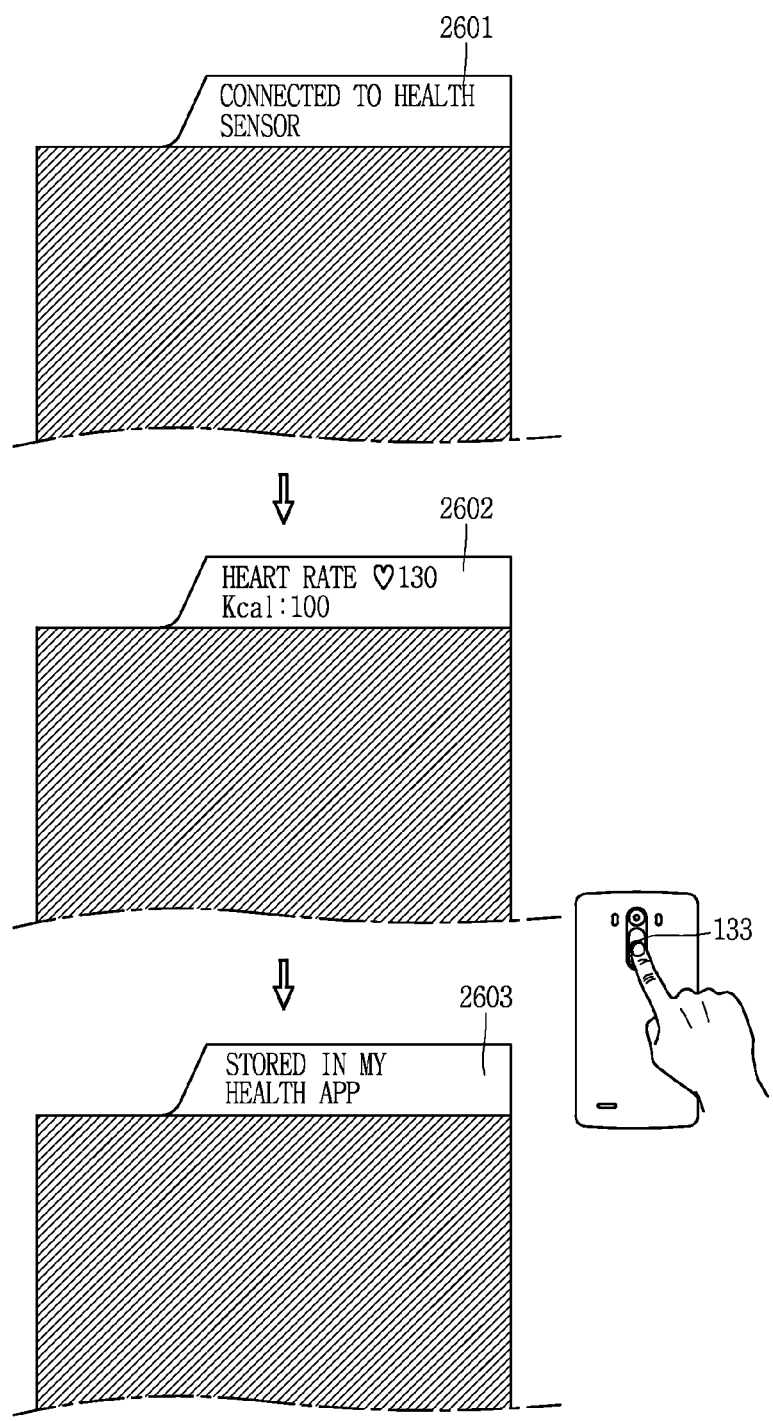
FIG. 26 is a view illustrating a method to process information received from an external interworked terminal on part of a display unit, using a touch input to a rear input unit in a mobile terminal according to an embodiment of the present invention.

FIG. 26 shows an example that information received from an interworked external terminal is processed at the second region 202 using a touch input to the rear input unit 133. When the mobile terminal 100 is connected to a health sensor, feedback information (2601) indicating such a connection is output to the second region 202, and a sensed result (2602) such as a heart rate is displayed is displayed real time on the second region 202. In this instance, when a fingerprint input is sensed at the rear input unit 133, information recorded in the connected health sensor is stored in the mobile terminal, and feedback information (2603) indicating a storage result is output to the second region 202.

Figure 27:
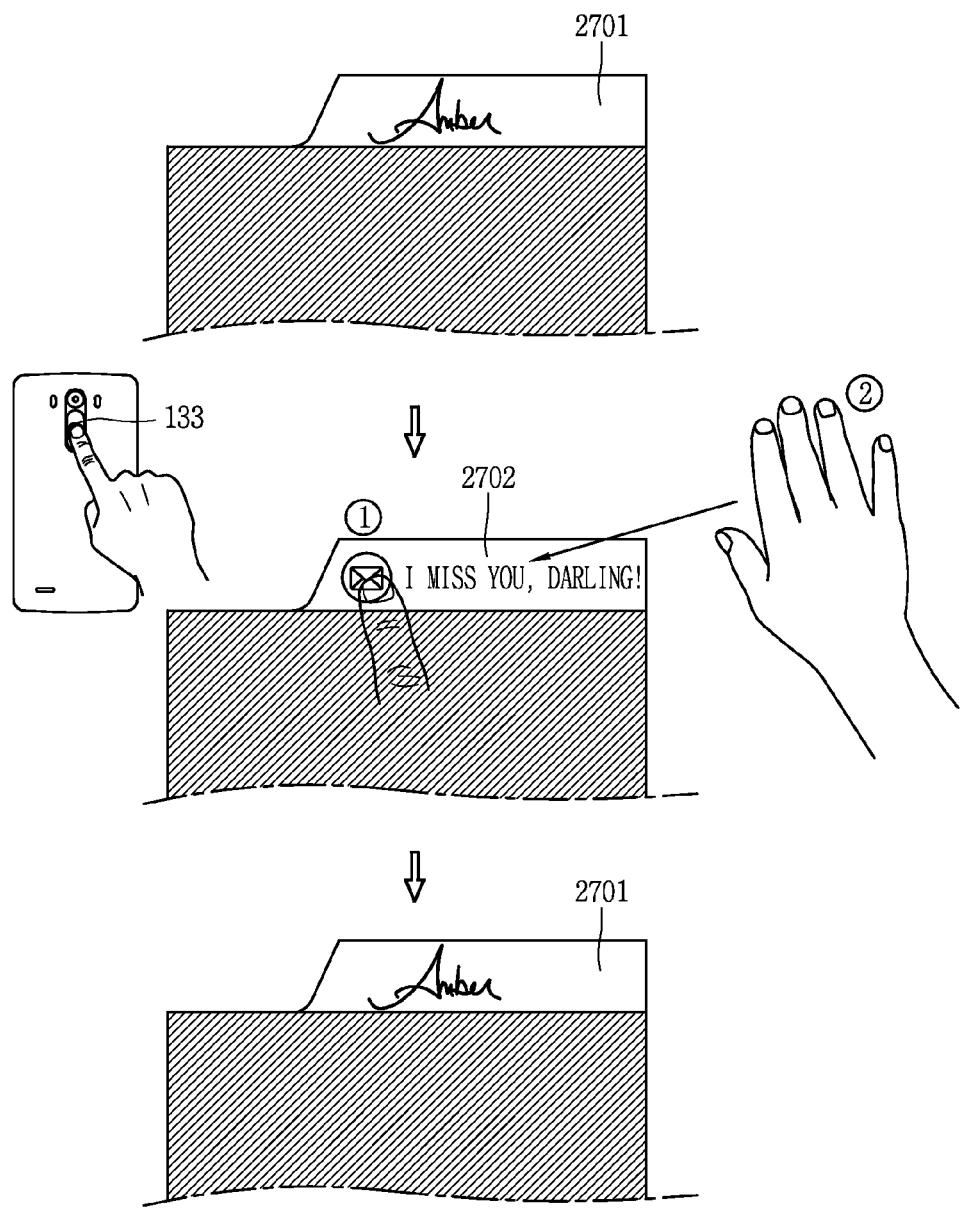
FIG. 27 is a view illustrating a method to change information which has been output to part of a display unit, based on a preset gesture motion in a mobile terminal according to an embodiment of the present invention.

FIG. 27 shows an example to quickly change information output to the second region 202 based on a preset gesture motion. When secret information (for instance, a message received from a specific person) (2702) is output to the second region 202 as a touch is applied to the rear input unit 133, there may be an occasion to quickly delete the output secret information (2702) as necessary. In such a case, when a gesture to cover the second region 202 is taken, the controller 180 can immediately change the secret information (2702) which is output to the second region 202 into a signature image (2701) which is previously output.

Figure 28:
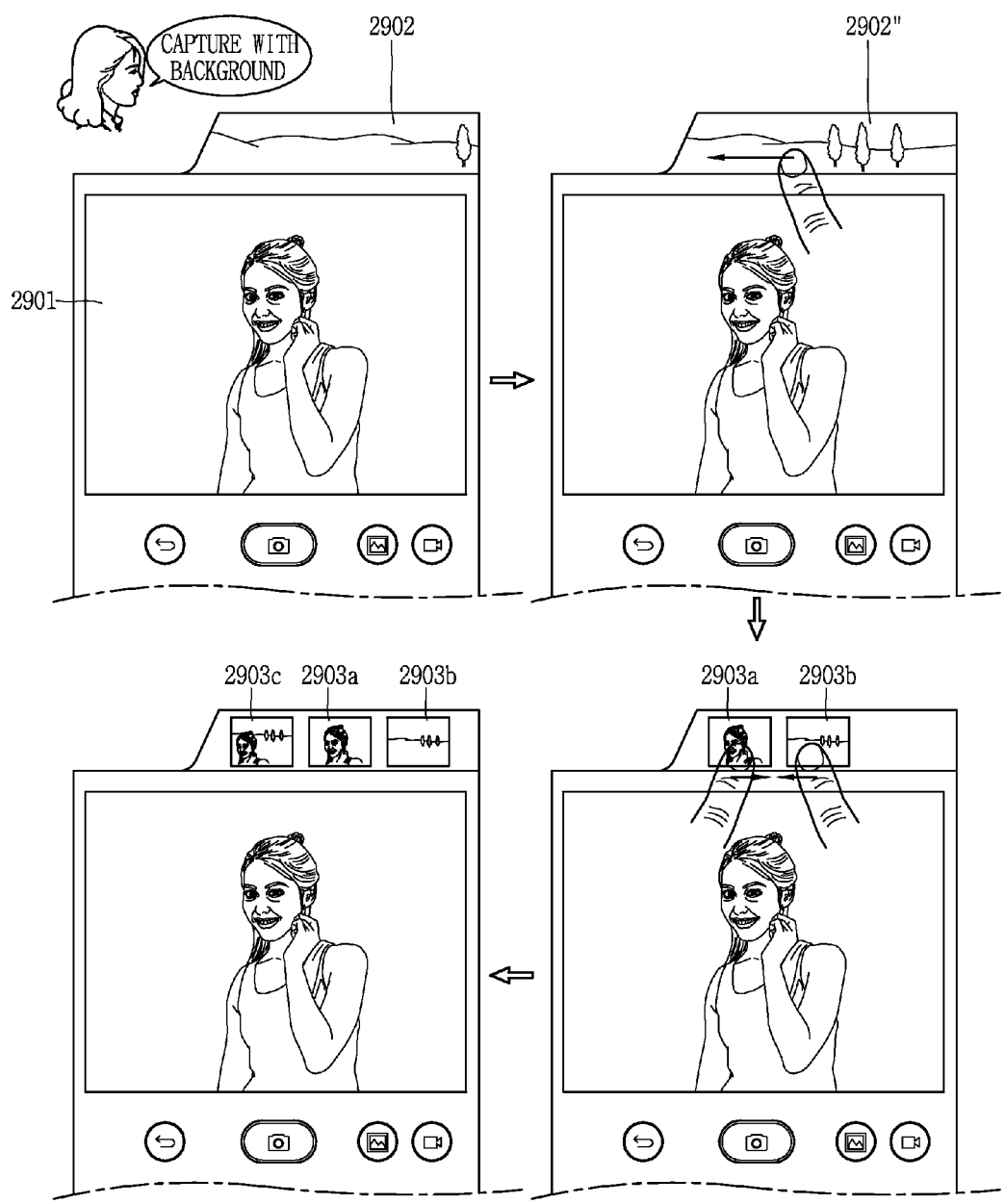
FIG. 28 is a view illustrating a method to execute a dual capturing mode using a main region and part of a display unit in a mobile terminal according to an embodiment of the present invention.

As another example, FIG. 28 is an exemplary view illustrating a method to execute a dual capturing mode simultaneously using both the first and second regions of the display unit. When a plurality of cameras 121*a* and 121*b* are installed to the mobile terminal and a dual capturing mode is executed, an image (2901) viewed through the first camera is displayed on the first region 201 and a background image (2902) viewed through the second camera is displayed on the second region 202. In this instance, the dual capturing mode may be executed through a voice command. Meanwhile, the controller 180 can change a viewed background image by adjusting an angle or a capturing range of the second camera, as a left or right drag touch input is applied to the second region 202 (2902").

Under the state, when a capturing is initiated through a voice command (for instance, 'click'), a plurality of captured images are displayed on the second region 202 with thumbnails (2903*a*, 2903*b*). In this instance, when a drag input directing from one thumbnail (for instance, 2903*a*) to another thumbnail (2903*b*) is applied, or a drag input is applied in a direction that the plurality of thumbnails (2903*a*, 2903*b*) come to close to each other, as shown in FIG. 28, the controller 180 can generate a synthesis image with respect to the plurality of thumbnails (2903*a*, 2903*b*) while maintaining a preview screen of the first region 201, and display the synthesis image as a thumbnail (2903*c*).

As described hereinbefore, according to the mobile terminal in accordance with the present invention, it is possible to reduce power consumption required to drive the display unit by independently activating part of the display unit to output necessary visual information. Further, when the main screen is used in an entire window mode, additional information such as a received event or battery information is displayed on part of the display unit so that user's sense of immersion can be enhanced. Further, since useful information related to an image being output to the main screen is displayed on the display unit, it is possible to quickly access to desired information so that user's convenience can be provided. Furthermore, it is possible to easily and quickly access to secret information set by a user through a fingerprint input to the rear input unit.

As the present features may be embodied in several forms without departing from the characteristics thereof, it should also be understood that the above-described embodiments are not limited by any of the details of the foregoing description, unless Alternatively specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
  a terminal body including a front surface and a rear surface;
  a display unit disposed on the front surface and including a first region and a second region extended from the first region, the first and second regions configured to be independently converted from one of an active state and an inactive state to another;
  a rear input unit disposed on the rear surface and configured to sense a fingerprint input; and
  a controller configured to: convert the second region into the active state while maintaining the inactive state of the first region and display preset first screen information on the second region, in response to a preset input being received in the inactive state of the first and second regions, and
  convert the first screen information displayed on the second region into second screen information corresponding to an execution of a secret mode while maintaining the inactive state of the first region, in response to the preset input being received and the fingerprint input being sensed by the rear input unit corresponding to a preset fingerprint.

2. The mobile terminal of claim 1, wherein the second screen information includes an icon indicating an event received from a contact list set in the secret mode, and
  wherein the controller is further configured to display information related to the event on the second region while maintaining the inactive state of the first region, in response to a touch input being applied to the icon.

3. The mobile terminal of claim 1, wherein the rear input unit is configured to sense a touch input, and
  wherein the controller is further configured to convert the second screen information into other screen information set in the secret mode, in response to at least one of a left or right drag touch input being applied to the rear input unit when the second screen information is displayed on the second region.

4. The mobile terminal of claim 3, wherein the controller is further configured to:
move the second screen information or the other screen information from one of the first region and the second region to the other while the fingerprint pre-stored in the rear input unit is sensed, in response to at least one of an up or down drag touch input being applied to the rear surface input unit when the second screen information is displayed on the second region.

5. The mobile terminal of claim 1, wherein the controller is further configured to:
filter at least part of information related to the event and display the filtered information on a window popped up on the first region, in response to a drag touch input toward the first region being applied to the second region when the second screen information is displayed on the second region.

6. The mobile terminal of claim 5, wherein the rear surface input unit is configured to sense a touch input, and
wherein the controller is further configured to control at least one of a position of the popped up window or display of the filtered information based on a direction of a drag touch input applied to the rear surface input unit.

7. The mobile terminal of claim 1, wherein the controller is further configured to:
compare the sensed fingerprint with pre-stored fingerprint information, and display feedback information corresponding to a comparison result on the second region, in response to the fingerprint input being sensed at the rear surface input unit.

8. The mobile terminal of claim 1, wherein the controller is further configured to:
change differently the secret information being displayed on the second region, according to a time that the fingerprint input is sensed at the rear surface input unit.

9. The mobile terminal of claim 1, wherein the controller is further configured to:
maintain an active state of a voice recognition function that senses a voice input in the inactivated state of the first region and the second region, and
convert the second region into an active state and display feedback information corresponding to the received voice command on the second region, in response to a preset voice command being received.

10. The mobile terminal of claim 1, wherein the controller is further configured to:
convert both the first and second regions into the active state,
display first visual information related to screen information displayed on the first region on the second region, and
display second visual information, which is set as a secret mode among information related to the screen information displayed on the first region on the second region, in response to the sensed fingerprint input matching with pre-stored fingerprint information.

11. The mobile terminal of claim 10, wherein the controller is further configured to:
convert the first visual information into third visual information related to an application being executed along a dragged direction.

12. The mobile terminal of claim 10, wherein while the first region is used as an entire window mode, the controller is further configured to display visual information indicating status information of the terminal body or a notification icon indicating an event generated at least one application only on the second region.

13. The mobile terminal of claim 10, wherein the controller is further configured to:
display information indicating a function being executed on the second region while at least one function related to screen information displayed on the first region is executed based on a user's input, and
display an execution result of the function on the second region, in response to the execution of the at least one function being completed.

14. The mobile terminal of claim 13, wherein the controller is further configured to:
sense a pre-stored fingerprint input while information indicating a function being executed is displayed on the second region,
store an execution result of the function being executed in a region corresponding to the secret mode, and
display a storage result on the second region.

15. The mobile terminal of claim 10, wherein the controller is further configured to:
display screen information corresponding to execution of a preset application on the first region,
sense a pre-stored fingerprint input convert the first visual information displayed on the second region into an input screen for providing secret information to the first region, and
display secret information related to the screen information displayed on the first region one the second region, in response to plural touch inputs corresponding to a preset reference being applied to the input screen.

16. The mobile terminal of claim 15, wherein the controller is further configured to:
control the secret information to be input to a region on the first region where a graphic object indicating an input position of a text is displayed, in response to a touch input being applied to the output secret information.

17. The mobile terminal of claim 16, wherein the controller is further configured to:
convert the secret information displayed on the second region into visual information which has been displayed previously, in response to a touch input being applied to the output secret information.

18. The mobile terminal of claim 10, wherein the controller is further configured to:
display secret information corresponding to the second visual information on a corresponding position of the first region, in response to a drag touch input being applied to the first region from the second region when the second visual information set as the secret mode is displayed on the second region.

19. The mobile terminal of claim 1, wherein the controller is further configured to:
convert user setting information displayed on the second region into visual information related to screen information displayed on the first region, in response to a drag touch input in a preset direction being applied to the rear surface input unit when the first region is converted into the active state and screen information is displayed on the first region.

20. The mobile terminal of claim 19, wherein the controller is further configured to:
capture an image displayed on at least one of the first region and the second region, and output information indicating that the captured image has been stored to the second region, in response to the sensed fingerprint input matching with pre-stored fingerprint information while visual information related to screen information displayed on the first region is displayed on the second region.

21. The mobile terminal of claim 1, wherein the controller is further configured to:
receive an input requesting information search when at least the second region is converted into the active state as a preset voice command is received,
execute an information search corresponding to the received input by executing a web application, and
execute information search corresponding to the received input based on information stored in the terminal body, in response to the input requesting the information search being received and the sensed fingerprint input matching with pre-stored fingerprint information.

22. The mobile terminal of claim 1, wherein the controller is further configured to:
receive a touch input selecting at least one object included in screen information displayed on the first region in the active state of the first region,
receive a drag touch input directed toward the second region applied to the selected at least one object,
display an icon of at least one application for executing a function related to the selected object on the second region, and
display an execution screen of an application corresponding to the selected icon on the first region, in response to the icon being selected on the second region.

23. The mobile terminal of claim 22, wherein the controller is further configured to:
display an execution result of a function related to the selected object on the execution screen of the application which has been displayed on the first region, as the icon is selected.

* * * * *